United States Patent
Kim et al.

(10) Patent No.: US 10,093,224 B2
(45) Date of Patent: Oct. 9, 2018

(54) LIGHTING APPARATUS FOR VEHICLE AND VEHICLE HAVING THE SAME

(71) Applicant: LG ELECTRONICS INC., Seoul (KR)

(72) Inventors: Ana Kim, Seoul (KR); Geunhyeong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/596,897

(22) Filed: May 16, 2017

(65) Prior Publication Data

US 2018/0009374 A1    Jan. 11, 2018

(30) Foreign Application Priority Data

May 16, 2016    (KR) .................. 10-2016-0059532

(51) Int. Cl.
  *B60Q 1/50*    (2006.01)
  *G03B 21/20*   (2006.01)
  (Continued)

(52) U.S. Cl.
  CPC .......... *B60Q 1/503* (2013.01); *B60Q 1/2607* (2013.01); *B60Q 1/525* (2013.01); *G03B 21/008* (2013.01);
  (Continued)

(58) Field of Classification Search
  CPC .... B60Q 1/503; B60Q 2400/50; B60Q 1/525; B60K 2350/2052; G03B 21/147
  (Continued)

(56) References Cited

U.S. PATENT DOCUMENTS 5,823,654 A * 10/1998 Pastrick ............... B60Q 1/2665
                                                      362/494
6,396,217 B1 * 5/2002 Weindorf ............ G09G 3/3406
                                                      315/169.1
(Continued)

FOREIGN PATENT DOCUMENTS

DE    102015009442    3/2016
EP      2689966       1/2014
(Continued)

OTHER PUBLICATIONS

Korean Notice of Allowance in Korean Application No. 10-2016-0059532, dated Jul. 27, 2016, 8 pages (with English translation).
(Continued)

*Primary Examiner* — John A Tweel, Jr.
(74) *Attorney, Agent, or Firm* — Fish & Richardson P.C.

(57) ABSTRACT

A lighting apparatus for a vehicle may include a light output unit; an interface unit; and at least one processor. The at least one processor may be configured to control the light output unit to generate light that illuminates an exterior of the vehicle. The at least one processor may also be configured to receive first information via the interface unit; and control the light output unit to display, via the light that illuminates the exterior of the vehicle, a visual image corresponding to the received first information. The at least one processor may further be configured to receive second information via the interface unit; and control the light output unit based on the received second information to change the visual image displayed by the light that illuminates the exterior of the vehicle.

25 Claims, 63 Drawing Sheets

(51) Int. Cl.
*G03B 21/14* (2006.01)
*G03B 21/00* (2006.01)
*B60Q 1/26* (2006.01)
*B60Q 1/52* (2006.01)
*F21Y 115/10* (2016.01)

(52) U.S. Cl.
CPC ......... *G03B 21/147* (2013.01); *G03B 21/206* (2013.01); *G03B 21/2013* (2013.01); *G03B 21/2053* (2013.01); *G03B 21/2066* (2013.01); *B60K 2350/2052* (2013.01); *B60Q 2400/50* (2013.01); *F21Y 2115/10* (2016.08)

(58) Field of Classification Search
USPC ....................................................... 340/464
See application file for complete search history.

(56) References Cited

U.S. PATENT DOCUMENTS

| | | | | | |
|---|---|---|---|---|---|
| 7,738,678 | B2* | 6/2010 | Breed | ...................... | B60J 10/00 382/100 |
| 9,341,307 | B2* | 5/2016 | Seal | ...................... | G09F 13/02 |
| 9,475,422 | B2* | 10/2016 | Hillis | ...................... | B60Q 1/26 |
| 9,481,287 | B2* | 11/2016 | Marti | ...................... | B60Q 1/503 |
| 2012/0025964 | A1* | 2/2012 | Beggs | ................... | B60Q 1/2673 340/435 |
| 2012/0194356 | A1* | 8/2012 | Haines | .................... | G08G 1/161 340/933 |
| 2014/0267415 | A1 | 9/2014 | Tang et al. | | |
| 2017/0225611 | A1* | 8/2017 | Kim | ..................... | B60Q 1/1423 |

FOREIGN PATENT DOCUMENTS

| | | |
|---|---|---|
| GB | 2517790 | 3/2015 |
| JP | 2014153868 | 8/2014 |
| KR | 10-2013-0117992 | 10/2013 |
| KR | 10-2016-0034059 | 3/2016 |
| WO | 0204247 | 1/2002 |
| WO | 2010075629 | 7/2010 |

OTHER PUBLICATIONS

Korean Notice of Non-Final Rejection in Korean Application No. 10-2016-0059532, dated May 1, 2017, 28 pages (with English translation).

Extended European Search Report in European Application No. 17000426.1, dated Oct. 27, 2017, 9 pages (with English translation).

* cited by examiner

FIG. 1
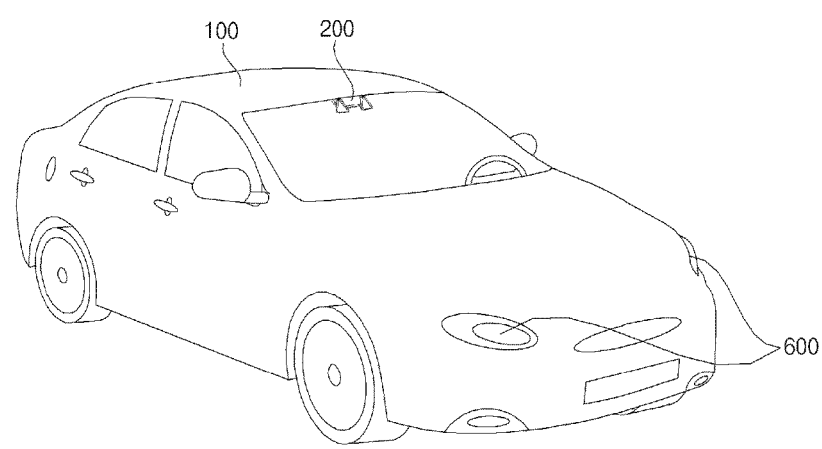
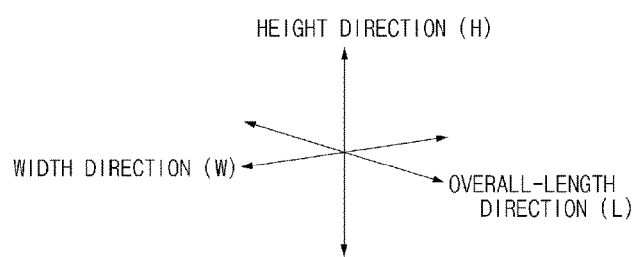

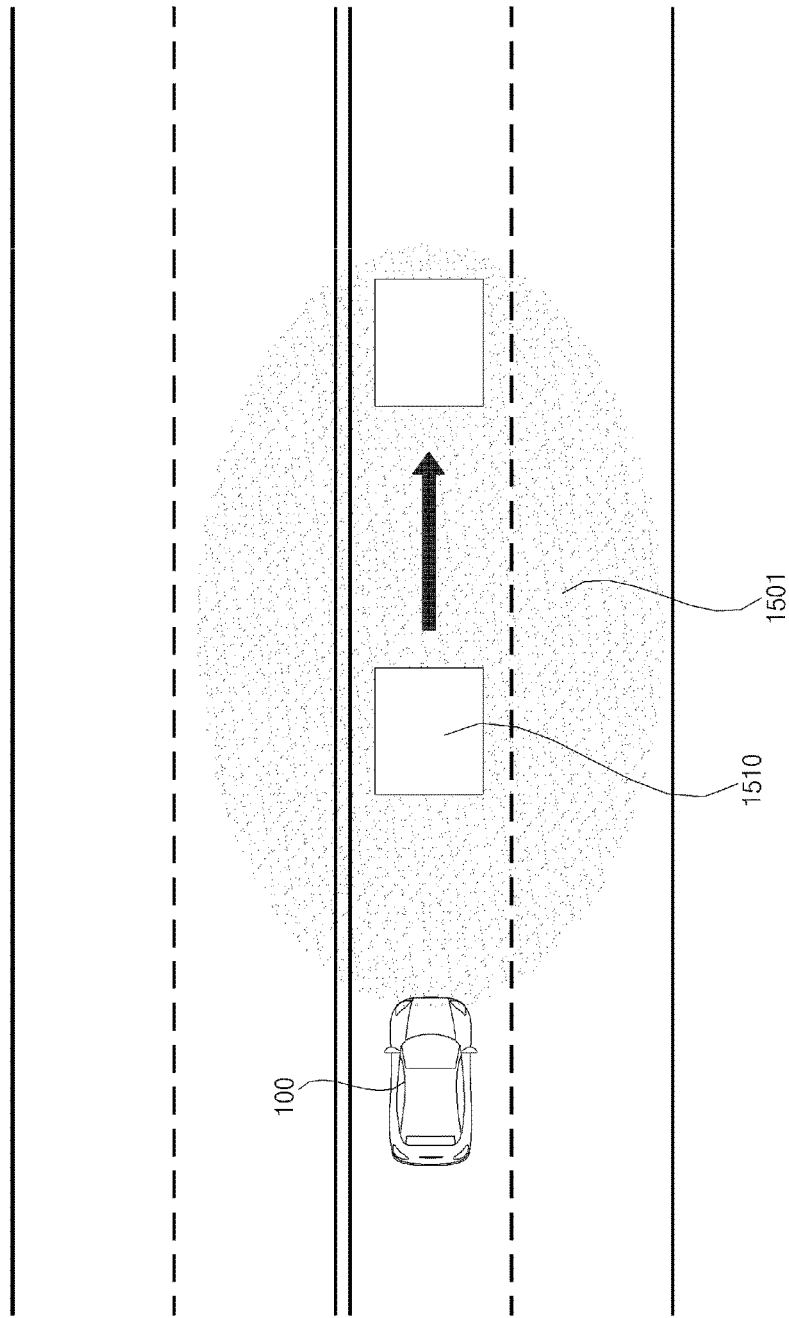

FIG. 16
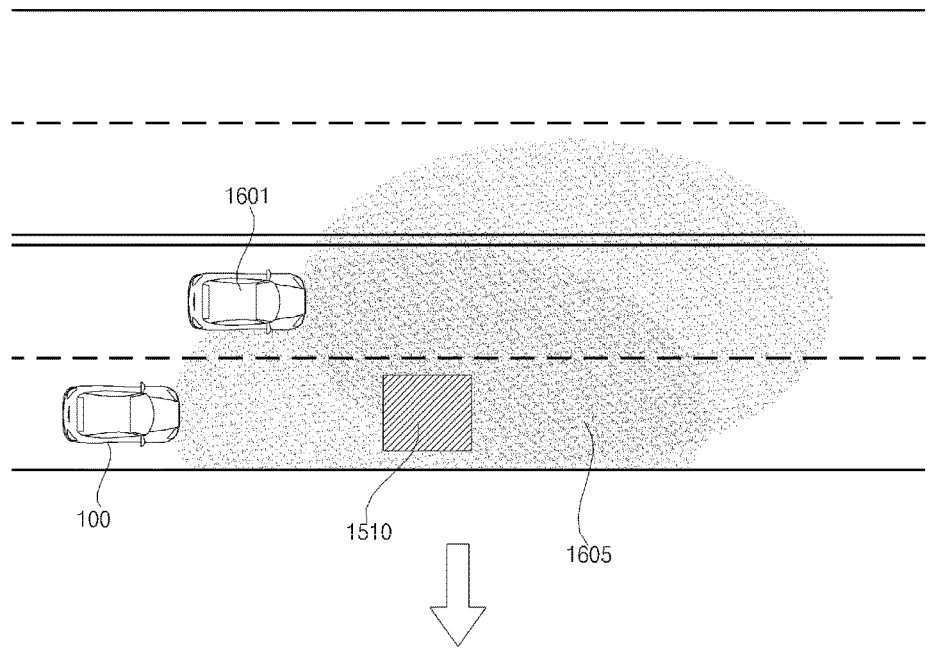
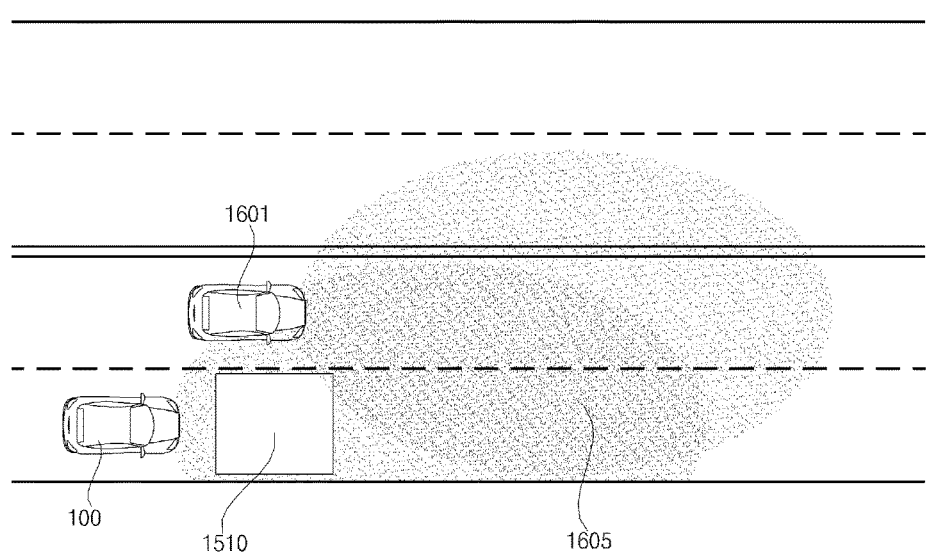

4650

4950

5050

LIGHTING APPARATUS FOR VEHICLE AND VEHICLE HAVING THE SAME

CROSS-REFERENCE TO RELATED APPLICATIONS

Pursuant to 35 U.S.C. § 119(a), this application claims an earlier filing date and right of priority to Korean Patent Application No. 10-2016-0059532, filed on May 16, 2016 in the Korean Intellectual Property Office, the contents of which is incorporated herein by reference in its entirety.

TECHNICAL FIELD

The present disclosure relates to a lighting apparatus for vehicles and a vehicle having the same.

BACKGROUND

A vehicle is an apparatus that is moved in a desired direction by a user riding therein. A typical example of the vehicle is an automobile.

Some vehicles are equipped with sensors and electronic devices to provide user convenience. For example, research has been actively conducted on an advanced driver assistance system (ADAS) to provide user convenience for various operations in driving. Further, autonomous vehicles have been developed that control some operations of a vehicle without a user's active control.

Vehicles typically include a lighting apparatus such as a headlamp, a rear combination lamp, a turn signal lamp, and a dome light. A lighting apparatus typically functions to provide a view inside or outside of a vehicle or to convey a signal to other vehicles.

SUMMARY

Systems and techniques are disclosed that enable a lighting apparatus for a vehicle that provides illumination for an inside or outside of the vehicle, and uses that illumination to display visual images corresponding to information regarding the vehicle. The lighting apparatus further changes the visual images that are displayed by the illumination according to changes in a driving situation of the vehicle.

In one aspect, a lighting apparatus for a vehicle may include a light output unit; an interface unit; and at least one processor. The at least one processor may be configured to control the light output unit to generate light that illuminates an exterior of the vehicle. The at least one processor may also be configured to receive first information via the interface unit; and control the light output unit to display, via the light that illuminates the exterior of the vehicle, a visual image corresponding to the received first information. The at least one processor may further be configured to receive second information via the interface unit; and control the light output unit based on the received second information to change the visual image displayed by the light that illuminates the exterior of the vehicle.

In some implementations, the lighting apparatus may further include a beam pattern unit configured to change a pattern of the light that illuminates the exterior of the vehicle. The at least one processor may further be configured to control the beam pattern unit to change the visual image displayed by the light that illuminates the exterior of the vehicle.

In some implementations, the beam pattern unit may include a Digital Micro-mirror Device (DMD) or a Micro Electro Mechanical System (MEMS) scanner.

In some implementations, the DMD may include a plurality of micro-mirrors, and the at least one processor may be further configured to change the visual image displayed by the light that illuminates the exterior of the vehicle by controlling a position of each of the plurality of micro-mirrors in the DMD.

In some implementations, the MEMS scanner may be configured to create a scanning path, and the at least one processor may be further configured to generate a pattern of the light that is output onto the scanning path; and change the visual image displayed by the light that illuminates the exterior of the vehicle by controlling the scanning path created through the MEMS scanner and the pattern of the light output onto the scanning path.

In some implementations, the light output unit may include a plurality of micro light emitting diodes (LEDs), and the at least one processor may be configured to change the visual image displayed by the light that illuminates the exterior of the vehicle by controlling the plurality of the micro LEDs.

In some implementations, the at least one processor may be configured to display the visual image by adjusting a color or an intensity of the light that illuminates the exterior of the vehicle.

In some implementations, the first information may include at least one of travel speed information of the vehicle, detected object information, navigation information, turn signal information, or on-board diagnostics (OBD) information.

In some implementations, the at least one processor may be further configured to, based on the travel speed information of the vehicle, adjust a display region for the visual image or a color of the visual image.

In some implementations, the second information may include at least one of road information, external light information, or information about another vehicle located around the vehicle.

In some implementations, the at least one processor may be further configured to receive vehicle position information via the interface unit; and change a display region for the visual image further based on the vehicle position information received via the interface unit.

In some implementations, the at least one processor may be further configured to determine a lane in which the vehicle travels; and control the light that illuminates the exterior of the vehicle to display the visual image outside the vehicle within the lane in which the vehicle travels.

In some implementations, the at least one processor may be further configured to control the light that illuminates the exterior of the vehicle to display the visual image outside the vehicle within a region corresponding to a width of the vehicle.

In some implementations, the at least one processor may be further configured to control the light that illuminates the exterior of the vehicle to change a display region in which the visual image is displayed to be within a range of field of the light.

In some implementations, the at least one processor may be further configured to control the light that illuminates the exterior of the vehicle to display the visual image to be gradually changed according to the second information.

In some implementations, the at least one processor may be further configured to determine whether external light is emitted onto the display region of the visual image; and based on a determination that the external light is emitted onto the display region of the visual image, control the light that illuminates the exterior of the vehicle to display the visual image in an area outside a region that is subjected to the emitted external light.

In some implementations, the at least one processor may be further configured to receive curved section information via the interface unit; and control the light that illuminates the exterior of the vehicle to control the display region for the visual image according to the received curved section information.

In some implementations, the at least one processor may be further configured to control the light output unit based on the second information to change a shape, a color, a size, or a brightness of the visual image.

In some implementations, the at least one processor may be further configured to control the light output unit based on the second information to change the shape, the color, the size, or the brightness of the visual image in a gradual manner.

In some implementations, the at least one processor may be further configured to determine whether external light is emitted onto a display region for the visual image; and based on a determination that the external light is emitted onto the display region for the visual image, control the light that illuminates the exterior of the vehicle to display the visual image with greater brightness or in a color different from a color of the external light.

In some implementations, the at least one processor may be further configured to receive, via the interface unit, information about other vehicles around the vehicle; determine, based on the received information about other vehicles around the vehicle, whether another vehicle is travelling in a lane next to a lane in which the vehicle travels and approaches the vehicle from behind; and based on a determination that another vehicle is travelling in the lane next to the lane in which the vehicle travels and approaches the vehicle from behind, control the light that illuminates the exterior of the vehicle to display the visual image with greater brightness or in a color different from the color of the external light.

In some implementations, the at least one processor may be further configured to receive, via the interface unit, light intensity information regarding light that is output from a lighting apparatus of the another vehicle; and control a brightness of the visual image according to the received light intensity information.

In some implementations, the at least one processor may be further configured to receive, via the interface unit, distance information regarding another vehicle that is ahead of the vehicle; and control the light that illuminates the exterior of the vehicle to change a display region for the visual image according to the received distance information.

In some implementations, the at least one processor may be further configured to determine whether a distance between the vehicle and the another vehicle is within a first threshold distance; and based on a determination that the distance between the vehicle and the another vehicle is within the first threshold distance, control the light that illuminates the exterior of the vehicle to display the visual image on a body of the another vehicle.

In some implementations, the at least one processor may be further configured to receive distorted display information regarding the visual image via the interface unit; determine, based on the distorted display information, whether the visual image is distorted and displayed; and based on a determination that the visual image is distorted and displayed, adjust a display position or size of the visual image on the body of the another vehicle.

In some implementations, the at least one processor may be further configured to receive information regarding a flat region of the body of the another vehicle via the interface unit; and based on the received information regarding the flat region of the body of the another vehicle, control the light that illuminates the exterior of the vehicle to display the visual image in the flat region.

In some implementations, the at least one processor may be further to configured to receive distorted display information regarding the visual image via the interface unit; and perform a control operation based on the received distorted display information to correct the visual image that is displayed by the light that illuminates the exterior of the vehicle.

In some implementations, the at least one processor may be further configured to control the light that illuminates the exterior of the vehicle such that a first width corresponding to a first point of the visual image is less than a second width corresponding to a second point of the visual image on a longitudinal line of the visual image.

In some implementations, the at least one processor may be further configured to control the light that illuminates the exterior of the vehicle to adjust a length and a width of the visual image based on a distance between the vehicle and a display region for the visual image.

In some implementations, the lighting apparatus may further include a communication unit, and the at least one processor may be further configured to control the light that illuminates the exterior of the vehicle to change the visual image further based on information received via the communication unit.

In another aspect, a vehicle includes a sensing unit configured to acquire first information and second information; and a lighting apparatus. The lighting apparatus may include an interface unit; and at least one processor. The at least one processor may be configured to generate light that illuminates an exterior of the vehicle; control the light that illuminates the exterior of the vehicle to display a visual image corresponding to the first information received via the interface unit; and control the light that illuminates the exterior of the vehicle to change the displayed visual image based on the second information received via the interface unit.

BRIEF DESCRIPTION OF THE DRAWINGS

FIG. 1 is a diagram illustrating an example of an exterior of a vehicle according to an implementation;

FIGS. 15 to 17 are diagrams illustrating examples of operations performed to change a display region for a visual image according to some implementations;

DETAILED DESCRIPTION

Figure 2:
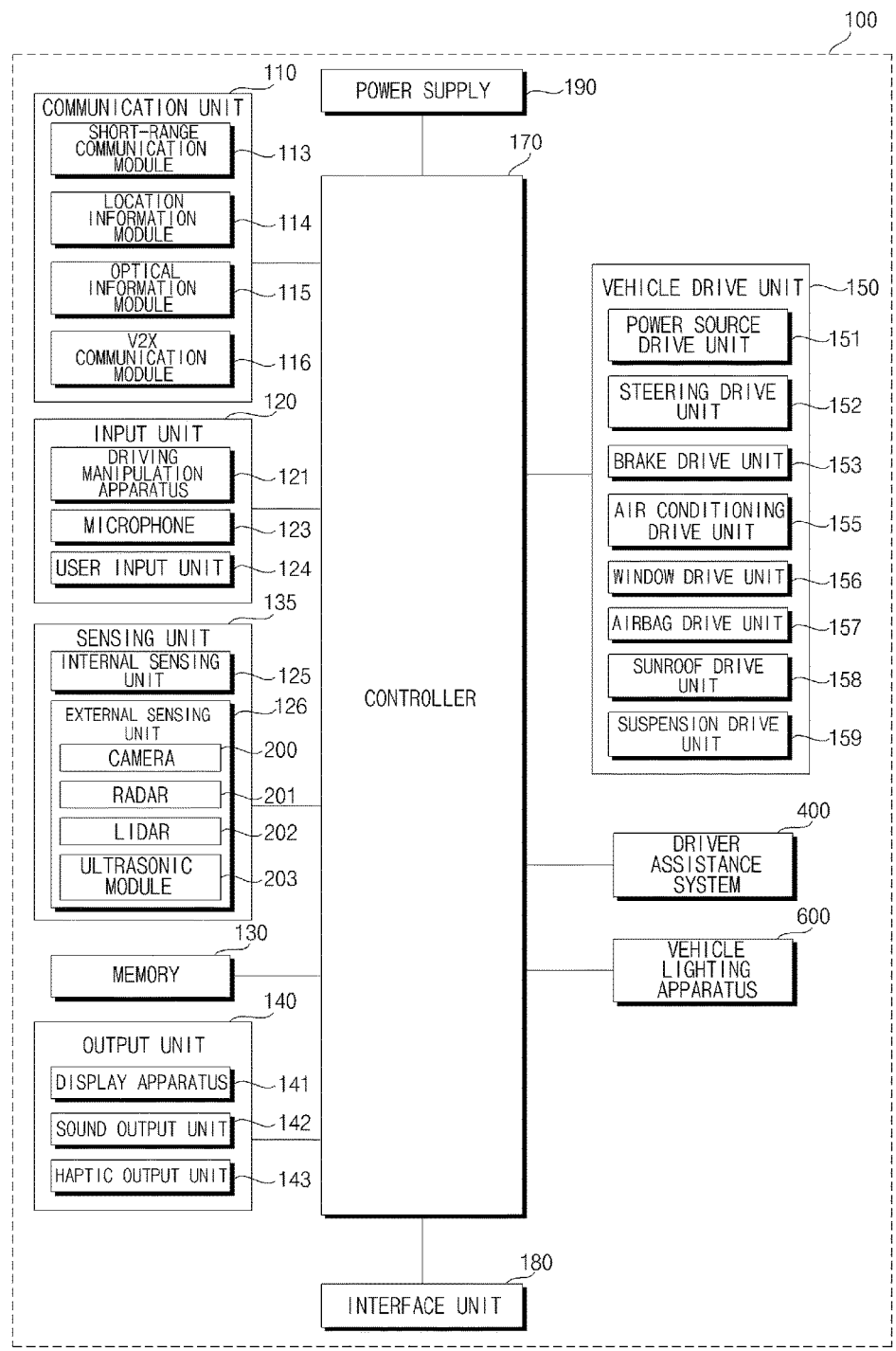
FIG. 2 is a block diagram illustrating an example of a vehicle according to an implementation.

Systems and techniques are disclosed herein that provide a lighting apparatus for a vehicle. The lighting apparatus, in addition to providing basic functionality of lighting for a vehicle, also performs functions of conveying information to the driver of a vehicle, to other drivers, and to pedestrians.

In some implementations, the lighting apparatus provides a display of information according to a driving situation of the vehicle, thus performing both the basic functions of providing illumination for the vehicle as well as conveying information regarding the driving situation of the vehicle. For example, the lighting apparatus may generate light that provides illumination inside or outside the vehicle, while simultaneously using the generated illumination to display changing information regarding the vehicle.

The term "vehicle" employed in this disclosure may include an automobile, a motorcycle, or any suitable motorized transport apparatus. Hereinafter, description will be given mainly focusing on an automobile.

Vehicles described in this disclosure may include a vehicle equipped with an internal combustion engine as a power source, a hybrid vehicle equipped with both an engine and an electric motor as a power source, an electric vehicle equipped with an electric motor as a power source, or any suitable source of power.

In the description below, the left side of the vehicle refers to the left side with respect to the travel direction of the vehicle and the right side of the vehicle refers to the right side with respect to the travel direction of the vehicle.

FIG. 1 shows the exterior of a vehicle according to an implementation.

Referring to FIG. 1, a vehicle 100 may include wheels rotated by a power source and a steering input apparatus for adjusting the travel direction of the vehicle 100.

According to the implementation, the vehicle 100 may be an autonomous vehicle. In the case where the vehicle 100 is an autonomous vehicle, the vehicle may be switched between an autonomous driving mode and a manual mode according to user input. When the vehicle is switched to the manual mode, the autonomous vehicle 100 may receive steering input, acceleration input, brake input through a driving manipulation apparatus.

The vehicle 100 may include a driver assistance system 400. The driver assistance system 400 is an apparatus for assisting the driver based on information acquired through various sensors. The driver assistance system 400 may be referred to as an advanced driver assistance system (ADAS).

The vehicle 100 may include a lighting apparatus 600 for vehicles. The lighting apparatus 600 may be any suitable lighting apparatus for a vehicle, such as a headlamp, a brake lamp, a tail lamp, a turn signal lamp, or a room lamp.

In the following description, a headlamp will be mainly described as the lighting apparatus 600. However, implementations are not limited thereto, the lighting apparatus 600 may be, for example, a rear accommodation lamp. The rear combination lamp may include a brake lamp and a tail lamp.

In some implementations, the lighting apparatus 600 may receive information, signals or data from a controller 170, a sensing unit 135 or the driver assistance system 400. The lighting apparatus 600 may control output light based on the received information, signals or data. The lighting apparatus 600 may use light to display a visual image that corresponds to the received information, signal or data. Furthermore, the lighting apparatus 600 may change the displayed visual image apparatus based on the received information, signals or data.

The sensing unit 135 of the vehicle 100 may include an internal sensing unit 125 and an external sensing unit 126.

The overall length refers to the length of the vehicle 100 from the front to back of the vehicle, the width refers to the width of the vehicle 100, and the height refers to the distance from the lower portion of wheels to the roof of the vehicle. In the description below, the overall-length direction L may indicate a direction in which measurement of overall length of the vehicle 100 is performed, the width direction W may indicate a direction in which measurement of width of the vehicle 100 is performed, and the height direction H may indicate a direction in which measurement of height of the vehicle 100 is performed.

FIG. 2 is a reference block diagram illustrating a vehicle according to an implementation.

Referring to FIG. 2, the vehicle 100 may include a communication unit 110, an input unit 120, a sensing unit 135, a memory 130, an output unit 140, a vehicle drive unit 150, a controller 170, an interface unit 180, a power supply 190, a driver assistance system 400, and a lighting apparatus 600 for vehicles.

The communication unit 110 may include a short-range communication module 113, a location information module 114, an optical communication module 115, and a V2X communication module 116.

The communication unit 110 may include one or more radio frequency (RF) circuits or devices for communication with other devices.

The short-range communication module 113, which is intended for short range communication, may support short range communication using at least one of Bluetooth™, Radio Frequency Identification (RFID), Infrared Data Association (IrDA), ultra wideband (UWB), ZigBee, Near Field Communication (NFC), Wi-Fi, Wi-Fi Direct, and Wireless Universal Serial Bus (Wireless USB) technologies.

The short-range communication module 113 may establish a wireless local area network to implement short-range communication between the vehicle 100 and at least 1 external device. For example, the short-range communication module 113 may wirelessly exchange data with a mobile terminal. The short-range communication module 113 may receive weather information and traffic situation information (e.g., TPEG (Transport Protocol Expert Group)) from the mobile terminal. For example, once a user enters the vehicle 100, the mobile terminal of the user may be paired with the vehicle 100 automatically or by execution of an application by the user.

A typical example of the location information module 114, which serves to acquire the location of the vehicle 100, is a global positioning system (GPS) module. For example, if the vehicle utilizes the GPS module, the location of the vehicle may be acquired using a signal from a GPS satellite.

According to an implementation, the location information module 114 may be a constituent included in the sensing unit 135 rather than in the communication unit 110.

An optical communication module 115 may include a light transmitter and a light receiver.

The light receiver may convert a light signal into an electrical signal to receive information. The light receiver may include a photodiode (PD) for receiving light. The PD may convert light into an electrical signal. For example, the light receiver may receive information on a preceding vehicle through light emitted from a light source included in the preceding vehicle.

The light transmitter may include at least one light emitting device for converting an electrical signal into a light signal. Preferably, the light emitting device is a light emitting diode (LED). The light transmitter converts an electrical signal into a light signal and transmits the light signal outside. For example, the light transmitter transmits a light signal by blinking a light emitting device at a predetermined frequency. According to some implementations, the light transmitter may include an array of a plurality of light emitting devices. According to some implementations, the light transmitter may be integrated with a lamp provided to the vehicle 100. For example, the light transmitter may be at least one of a headlight, a taillight, a stop lamp, a turn signal lamp and a sidelight. For example, the optical communication module 115 may exchange data with other vehicles through optical communication.

The V2X communication module 116 serves to perform wireless communication with a server or other vehicles. The V2X communication module 116 may include an RF circuit or device capable of implementing a vehicle-to-vehicle communication (V2V) protocol or a vehicle-to-infrastructure communication (V2I) protocol. The vehicle 100 may perform wireless communication with an external server or other vehicles through the V2X communication module 116.

The input unit 120 may include a driving manipulation unit 121, a microphone 123 and a user input unit 124.

The driving manipulation device 121 receives user input for driving the vehicle 100. The driving manipulation device 121 may include a steering input device, a shift input device, an acceleration input device, and a brake input device.

The steering input device receives a travel direction input of the vehicle 100 from the user. Preferably, the steering input device is formed in the shape of a wheel to allow steering input through rotation. According to some implementations, the steering input device may include a touchscreen, a touch pad, or a button.

The shift input device receives, from the user, inputs for Park (P), Drive (D), Neutral (N) and Reverse (R) of the vehicle 100. Preferably, the shift input device is formed in the shape of a lever. According to some implementations, the shift input device may include a touchscreen, a touch pad, or a button.

The acceleration input device receives an input for accelerating the vehicle 100 from the user. The brake input device receives an input for decelerating the vehicle 100 from the user. Preferably, the acceleration input device and the brake input device are formed in the shape of a pedal. According to some implementations, the acceleration input device or the brake input device may include a touchscreen, a touch pad, or a button.

The microphone 123 may process an external sound signal to create electrical data. The data created through processing may be utilized for various purposes according to functions being executed by the vehicle 100. The microphone 123 may convert a voice command from the user into electrical data. The electrical data may be delivered to the controller 170.

According to an implementation, the microphone 123 may be a constituent included in the sensing unit 125 rather than in the input unit 120.

The user input unit 124 is intended to receive information input by the user. When information is input through the user input unit 124, the controller 170 may control operation of the vehicle 100 in accordance with the input information. The user input unit 124 may include a touch input unit or a mechanical input unit. According to some implementations, the user input unit 124 may be disposed in one area of the steering wheel. In this case, the driver may manipulate the user input unit 124 with fingers while holding the steering wheel.

The sensing unit 135 may sense the state of the vehicle 100 and a situation outside the vehicle. The sensing unit 135 may include an internal sensing unit 125 and an external sensing unit 126.

The internal sensing unit 135 senses the state of the vehicle 100. The internal sensing unit 125 may include position sensors (e.g., a yaw sensor, a roll sensor, a pitch sensor), a collision sensor, a wheel sensor), a spin sensor, a speed sensor, a tilt sensor, a weight sensor, a heading sensor, a yaw sensor, a gyro sensor, a position module, a vehicle drive/reverse sensor, a battery sensor, a fuel sensor, a tire sensor, a steering sensor based on turning of the steering wheel, a vehicle interior temperature sensor, a vehicle interior humidity sensor, an ultrasonic sensor, a illumination sensor, an accelerator pedal position sensor, and a brake pedal position sensor.

The internal sensing unit 125 may acquire sensing signals for vehicle condition information, vehicle collision information, vehicle direction information, vehicle location information (GPS information), vehicle orientation information, vehicle speed information, vehicle acceleration information, vehicle inclination information, vehicle drive/reverse information, battery information, fuel information, tire information, vehicle lamp information, vehicle interior temperature information, vehicle interior humidity information, a steering wheel rotation angle, the luminance of the exterior of the vehicle, the pressure applied to the accelerator pedal, a pressure applied to the brake pedal, and the like.

The internal sensing unit 125 may further include an accelerator pedal sensor, a pressure sensor, an engine speed sensor, an airflow sensor (AFS), an intake air temperature sensor (ATS), a water temperature sensor (WTS), a throttle position sensor (TPS), a TDC sensor, and a crankshaft angle sensor (CAS).

The external sensing unit 126 may sense a situation outside the vehicle. The external sensing unit 126 may sense objects positioned outside the vehicle. Herein, the objects may include a lane, another vehicle, a pedestrian, light, a traffic signal, a road, a structure, a speed bump, a landmark, and an animal.

The lane may be a drive lane or a lane next to the drive lane. The lane may conceptually include left and right lines defining the lane.

The other vehicle may be a vehicle traveling near the vehicle 100. The other vehicle may be a vehicle located within a predetermined distance from the vehicle 100. The other vehicle may be a vehicle travelling before or after the vehicle 100. The other vehicle may be a vehicle travelling in a lane next to the drive lane of the vehicle 100. The other vehicle may be a vehicle travelling through an intersection where the other vehicle travels in a direction crossing the travel direction of the vehicle 100.

The pedestrian may be a human being located on a sidewalk or a straight.

The light may be light generated from a lamp provided to another vehicle. The light may be light generated from a streetlamp. The light may be sunlight.

The traffic signal may include a traffic light, a traffic sign, and a pattern or text marked on a road surface.

The road may include a road surface, a curve, and a slope such as an ascent or a descent.

The structure may be an object located around the road and fixed to the ground. For example, the structure may include a streetlamp, a street tree, a building, an electric pole, and a traffic light pole.

The landmark may include a mountain and a hill.

Objects may be divided into mobile objects and fixed objects. For example, the mobile objects may conceptually include other vehicles and pedestrians. The fixed objects may conceptually include, for example, a traffic signal, a road and a structure.

The external sensing unit 126 may include a camera 200, a radar 201, a lidar 202, and an ultrasonic sensor 203.

The camera 200 may be referred to as a camera apparatus for vehicles. The camera 200 may include the mono camera 200*a* of FIGS. 3A to 3C and the stereo camera 200*b* of FIGS. 3D to 3F.

The camera 200 may be positioned at a proper place on the exterior of the vehicle to acquire an image of the outside of the vehicle.

For example, the camera 200 may be disposed close to the front windshield 10 in the vehicle in order to acquire a front view of the vehicle. Alternatively, the camera 200 may be disposed around the front bumper or radiator grille.

For example, the camera 200 may be disposed close to the rear glass in the vehicle in order to acquire an image of the rear view of the vehicle. Alternatively, the camera 200 may be disposed around a rear bumper, trunk or tailgate.

For example, the camera 200 may be disposed close to at least one of the side windows of the vehicle in the vehicle in order to acquire an image of the side view of the vehicle. Alternatively, the camera 200 may be disposed around a side view mirror, fender or door.

The radar 201 may include an electromagnetic wave transmitter, an electromagnetic wave receiver, and a processor. The radar 201 may be implemented using a pulse radar technique or a continuous wave radar technique according to the electromagnetic wave radiation principle. In addition, the radar 201 employing the continuous wave radar technique may adopt a frequency modulated continuous wave (FMCW) scheme or a frequency shift keying (FSK) scheme according to a signal waveform.

The radar 201 may detect an object based on a transmitted electromagnetic wave and then detect the distance and the relative speed of the object.

The radar 201 may provide the acquired object information to the controller 170, the driver assistance system 400 or the lighting apparatus 600. Herein, the object information may include distance-to-object information.

The radar 201 may be positioned at a proper place on the exterior of the vehicle in order to sense objects positioned ahead of, behind or to a side of the vehicle.

The lidar 202 may include a laser transmitter, a laser receiver, and a processor. The lidar 202 may adopt a Time of Flight (TOF) technique or a phase-shift technique.

The lidar 202 adopting the TOF technique emits a laser pulse signal and receives a reflected pulse signal which is reflected by an object. The lidar 202 may measure the distance to the object based on the time at which the laser pulse signal is emitted and the time at which the reflected pulses signal is received. In addition, the lidar module 202 may measure the relative speed of the object based on change of the distance over time.

The lidar 202 adopting the phase-shift technique may emit a laser beam that is continuously modulated at a specific frequency, and measure time and the distance to the object based on the amount of phase shift of the signal which is reflected by the object and returns. In addition, the lidar 202 may measure the relative speed of the object based on change of the distance over time.

The lidar 202 may detect the object based on the transmitted laser and then detect the distance and relative speed of the detected object.

The lidar 202 may provide the acquired object information to the controller 170, the driver assistance system 400 or the lighting apparatus 600. Herein, the object information may include distance-to-object information.

The lidar 202 may be positioned at a proper place on the exterior of the vehicle in order to sense objects positioned ahead of, on the back of or on sides of the vehicle.

The ultrasonic sensor 203 may include an ultrasound transmitter, an ultrasound receiver, and a processor. The ultrasonic sensor 203 may detect an object based on transmitted ultrasound and then detect the distance and relative speed of the detected object.

The ultrasonic sensor 203 may provide the acquired object information to the controller 170, the driver assistance system 400 or the lighting apparatus 600. Herein, the object information may include distance-to-object information.

The ultrasonic sensor 203 may be positioned at a proper place on the exterior of the vehicle in order to sense objects positioned ahead of, on the back of or on sides of the vehicle.

The memory 130 is electrically connected to the controller 170. The memory 130 may store basic data for each unit, control data for controlling operation of each unit, and input/output data. When implemented through hardware, the memory 130 may include various storage devices such as a ROM, RAM, EPROM, flash drive, and hard drive. The memory 130 may store various kinds of data for overall operation of the vehicle 100 including a program for processing or controlling operation of the controller 170.

The output unit 140, which serves to output information processed by the controller 170, may include a display apparatus 141, a sound output unit 142 and a haptic output unit 143.

The display apparatus 141 may display various graphic objects. For example, the display apparatus 141 may display vehicle-related information. Herein, the vehicle-related information may include vehicle control information for controlling the direction of the vehicle or vehicle driving assistance information for assisting the driver in driving the vehicle. The vehicle-related information may also include vehicle condition information indicating the current condition of the vehicle or vehicle driving information related to driving.

The display apparatus 141 may include at least one of a liquid crystal display (LCD), a thin film transistor-liquid crystal display (TFT LCD), an organic light-emitting diode (OLED) display, a flexible display, a 3D display and an e-ink display.

The display apparatus 141 may form a layered architecture together with a touch sensor or be integrated with the touch sensor, thereby implementing a touchscreen. Such touchscreen may function as the user input unit 124 providing an input interface between the vehicle 100 and the user and also as an output interface between the vehicle 100 and the user. In this case, the display apparatus 141 may include a touch sensor for sensing touch applied to the display apparatus 141 in order to receive a control command in a touch manner. Thereby, when the display apparatus 141 is touched, the touch sensor may sense the touch, and the controller 170 may generate a control command corresponding to the touch. Content input through touch may include characters, numbers, or menu items which can be indicated or specified in various modes.

The display apparatus 141 may include a cluster to allow the driver to check the vehicle condition information or vehicle driving information during driving. The cluster may be positioned on the dashboard. In this case, the driver can check the information displayed on the cluster while looking forward.

According to an implementation, the display apparatus 141 may be implemented as a head up display (HUD). In this case, the display apparatus 141 may output information through a transparent display provided to the front windshield 10. Alternatively, the display apparatus 160 may be provided with a projection module, thereby outputting information through an image projected onto the front windshield 10.

According to an implementation, the display apparatus 141 may include a transparent display. In this case, the transparent display may be attached to the front windshield 10.

The transparent display may have predetermined transparency and display a predetermined screen. To obtain transparency, the transparent display may include at least one of a transparent thin film electroluminescent (TFEL) display, a transparent organic light-emitting diode (OLED) display, a transparent liquid crystal display (LCD), a transmissive transparent display, and a transparent light emitting diode (LED) display. Transparency of the transparent display may be adjusted.

According to an implementation, the display apparatus 141 may function as a navigation system.

The sound output unit 142 converts an electrical signal from the controller 170 into an audio signal and outputs the audio signal. To this end, the sound output unit 142 may be provided with a speaker. The sound output unit 142 may output sound corresponding to operation of the user input unit 124.

The haptic output unit 143 generates haptic output. For example, the haptic output unit 143 may vibrate the steering wheel, a seat belt and a seat to allow the user to recognize the output.

The vehicle drive unit 150 may control operation of various vehicular devices. The vehicle drive unit 150 may include a power source drive unit 151, a steering drive unit 152, a brake drive unit 153, an air conditioning drive unit 155, a window drive unit 156, an airbag drive unit 157, a sunroof drive unit 158 and a suspension drive unit 159.

The power source drive unit 151 may perform electronic control of the power source in the vehicle 100.

For example, if the power source is a fossil fuel-based engine, the power source drive unit 151 may perform electronic control of the engine. Thereby, the output torque of the engine may be controlled. If the power source drive unit 151 is an engine, the output torque of the engine may be controlled by the controller 170 to limit the speed of the vehicle.

As another example, if the power source is an electric motor, the power source drive unit 151 may control the motor. Thereby, the rotational speed and torque of the motor may be controlled.

The steering drive unit 152 may perform electronic control of the steering apparatus in the vehicle 100. Thereby, the steering drive unit 152 may change the travel direction of the vehicle.

The brake drive unit 153 may perform electronic control of a brake apparatus in the vehicle 100. For example, by controlling the operation of the brakes disposed on the wheels, the speed of the vehicle 100 may be reduced. In another example, the brake disposed on a left wheel may be operated differently from the brake disposed on a right wheel in order to adjust the travel direction of the vehicle 100 to the left or right.

The air conditioning drive unit 155 may perform electronic control of an air conditioner in the vehicle 100. For example, if the temperature of the interior of the vehicle is high, the air conditioning drive unit 155 may control the air conditioner to supply cool air to the interior of the vehicle.

The window drive unit 156 may perform electronic control of a window apparatus in the vehicle 100. For example, the window drive unit 156 may control opening or closing of the left and right windows on both sides of the vehicle.

The airbag drive unit 157 may perform electronic control of an airbag apparatus in the vehicle 100. For example, the unit may control the airbag apparatus such that the airbags are inflated when the vehicle is exposed to danger.

The sunroof drive unit 158 may perform electronic control of a sunroof apparatus in the vehicle 100. For example, the sunroof drive unit 158 may control opening or closing of the sunroof.

The suspension drive unit 159 may perform electronic control of a suspension apparatus in the vehicle 100. For example, when a road surface is uneven, the suspension drive unit 159 may control the suspension apparatus to attenuate vibration of the vehicle 100.

According to an implementation, the vehicle drive unit 150 may include a chassis drive unit. Herein, the chassis drive unit may conceptually include the steering drive unit 152, the brake drive unit 153 and the suspension drive unit 159.

The controller 170 may control overall operations of the respective units in the vehicle 100. The controller 170 may be called an electronic control unit (ECU).

The controller 170 may be implemented as hardware using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The interface unit 180 may serve as a path to various kinds of external devices connected to the vehicle 100. For example, the interface unit 180 may be provided with a port connectable to a mobile terminal, thus being connected to the mobile terminal through the port. In this case, the interface unit 180 may exchange data with the mobile terminal.

The interface unit 180 may also serve as a path through which electrical energy is supplied to the mobile terminal connected thereto. If the mobile terminal is electrically connected to the interface unit 180, the interface unit 180 may provide the mobile terminal with electrical energy supplied from the power supply 190 according to control of the controller 170.

The power supply 190 may be controlled by the controller 170 to supply electric power necessary for operation of respective constituents. In particular, the power supply 190 may receive power from, for example, a battery in the vehicle.

The driver assistance system 400 may assist the driver in driving the vehicle. According to an implementation, the external sensing unit 126 may be classified as a constituent of the driver assistance system 400. For example, the driver assistance system 400 may include the camera 200. The camera 200 may include the mono camera 200a of FIGS. 3A to 3C and the stereo camera 200b of FIGS. 3D to 3F.

The driver assistance system 400 may provide an autonomous emergency braking (AEB) system, an adaptive cruise control (ACC) system, a cross traffic alert (CTA) system, a lane change assistant (LCA) system, a forward collision warning (FCW) system, a lane departure warning (LDW) system, a lane keeping assist (LKA) system, a speed assist system (SAS), a traffic sign recognition (TSR) system, a high beam assist (HBA) system, a blind spot detection (BSD) system, an autonomous emergency steering (AES) system, a curve speed warning system (CSWS), a smart parking assist system (SPAS), a traffic jam assist (TJA) system and an around view monitor (AVM) system.

The lighting apparatus 600 may output light to illuminate an inside or outside of the vehicle and thus provide a clearer view. The lighting apparatus 600 may also output light to provide information. For example, the lighting apparatus 600 may output a visual image corresponding to the acquired information, signal or data using light, and change the visual image based on the acquired information, signal or data.

Figure 3A:
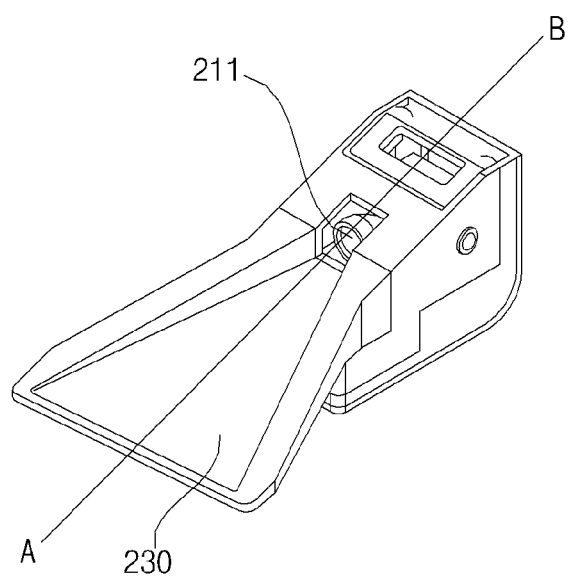
FIG. 3A is a diagram illustrating a perspective view of an example of a camera for vehicles according to an implementation.
Figure 3B:
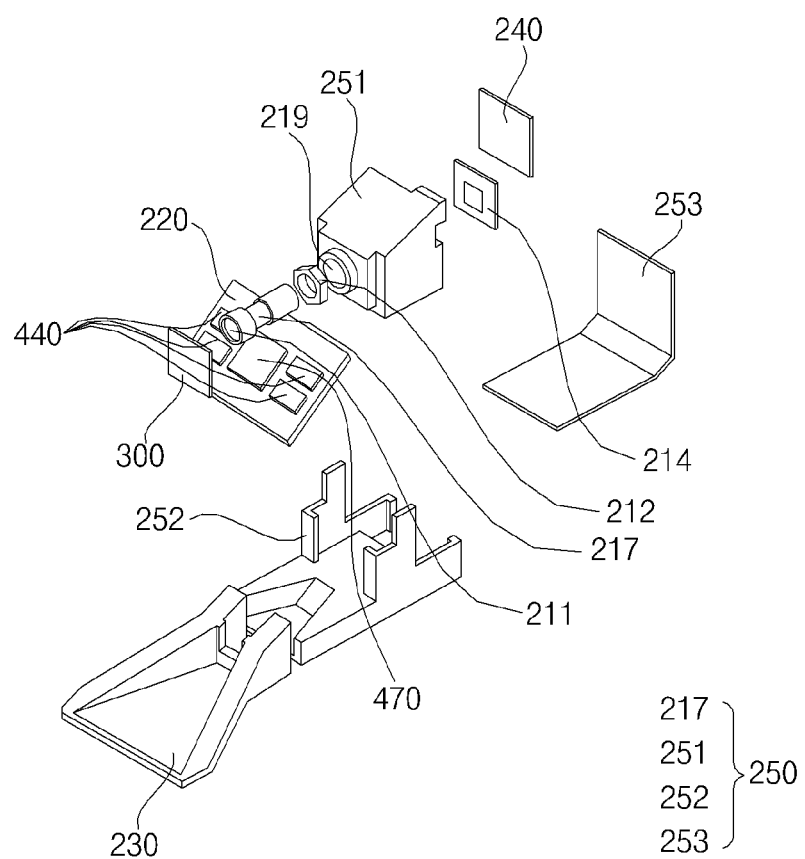
FIG. 3B is a diagram illustrating an exploded perspective view of an example of a camera for vehicles according to an implementation.
Figure 3C:
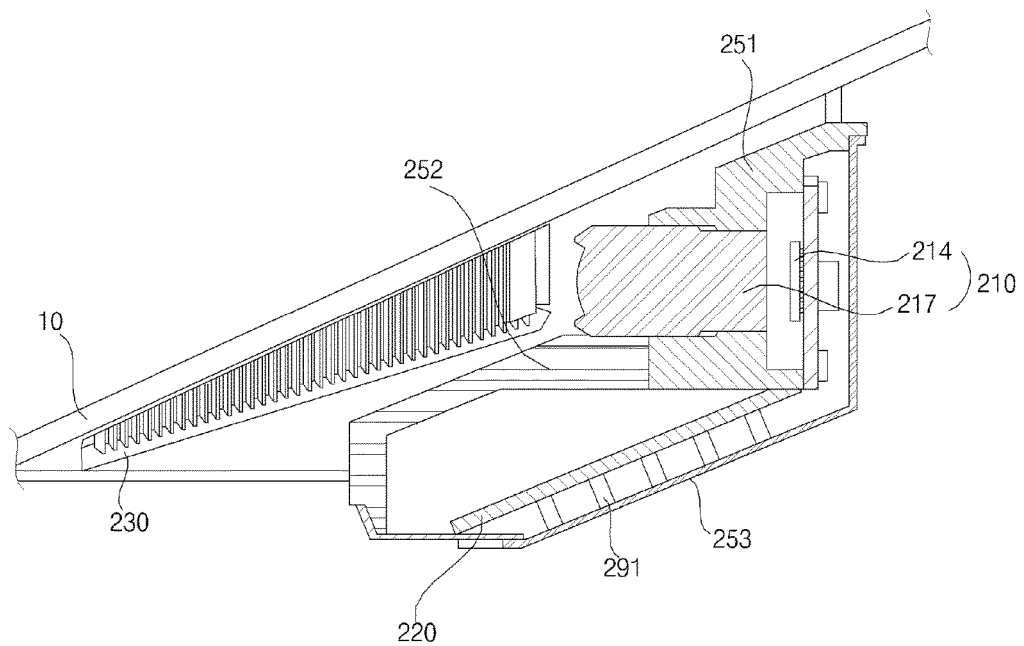
FIG. 3C is a diagram illustrating a cutaway side view of an example of the camera for vehicles, taken along line A-B of FIG. 3A.

FIG. 3A is a perspective view illustrating a camera for vehicles according to an implementation. FIG. 3B is an exploded perspective view illustrating the camera for vehicles according to an implementation. FIG. 3C is a cutaway side view of the camera for vehicles, taken along line A-B of FIG. 3A.

The camera 200 for vehicles described below with reference to FIGS. 3A to 3C is a single camera 200a.

The camera 200a may include a lens 211, an image sensor 214 and a processor 470.

According to an implementation, the camera 200a may further include a processing board 220, a light shield 230, a heat dissipation member 240, a housing 250, or a combination thereof.

The housing 250 may include a first housing 251, a second housing 252, and a third housing 253.

The lens 211 may be fastened, for example by a nut 212, to be seated in a hole 219 formed in one part of the first housing 251 while being accommodated in a lens housing 217.

The image sensor 214 may include at least one photovoltaic conversion device capable of converting a light signal into an electrical signal. For example, the image sensor 214 may be CCD (charge-coupled device) or CMOS (complimentary metal-oxide semiconductor).

The image sensor 214 may be positioned at a proper place outside or inside the vehicle in order to acquire an image of the external view or internal view of the vehicle.

For example, the image sensor 214, may be disposed close to the front windshield 10 in the vehicle in order to acquire an image of the front view of the vehicle. Alternatively, the image sensor 214 may be disposed around the front bumper or radiator grille.

For example, the image sensor 214, may be disposed close to the rear glass in the vehicle in order to acquire an image of the rear view of the vehicle. Alternatively, the image sensor 214 may be disposed around the rear bumper, trunk or tailgate.

For example, the image sensor 214 may be disposed close to at least one of the side windows of the vehicle in the vehicle in order to acquire an image of the side view of the vehicle. Alternatively, the image sensor 214 may be disposed around a side view mirror, fender or door.

The image sensor 214 may be disposed at the rear end of the lens 211 in order to acquire an image based on light introduced through the lens 211. For example, the image sensor 214 may be disposed perpendicular to the ground while being spaced a predetermined distance from the lens 211.

The processor 470 may be electrically connected to the image sensor 214. The processor 470 may perform comparing processing on the image acquired through the image sensor 214. The processor 470 may control the image sensor 214.

The processor 470 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The processor 470 may be mounted on the processing board 220.

A processor 270 and a memory 440 may be mounted on the processing board 220.

The processing board 220 may be disposed to be inclined in the overall-length direction. For example, the processing board 220 may be disposed such that the front surface or rear surface thereof faces the front windshield 10. For example, the processing board 220 may be disposed in parallel with the front windshield 10.

The front windshield 10 provided to the vehicle 100 generally extends inclinedly from the hood to the roof of the vehicle 100 at a predetermined angle with respect to the ground. In this case, as the processing board 220 is disposed to be inclined in the overall-length direction, the camera 200a becomes smaller than when the processing board 220 is disposed vertically or horizontally. As the camera 200a is reduced in size, a space corresponding to the reduced volume of the camera may be further secured in the vehicle 100.

A plurality of devices or electronic components may be mounted on the processing board 220. In this case, heat may be generated from the processing board 220 due to the plurality of devices or electronic components.

The processing board 220 may be disposed spaced from an image sensor 214. As the processing board 220 is disposed spaced from the image sensor 214, heat generated by the processing board 220 may be prevented from affecting the performance of the image sensor 214.

The processing board 220 may be disposed at an optimum position such that heat generated from the processing board 220 does not affect the image sensor 214. Specifically, the processing board 220 may be disposed at the lower end of the image sensor 214. Alternatively, the processing board 220 may be disposed at the front end of the image sensor 214.

One or more memories 440 may be mounted on the processing board 220. The memories 440 may store images acquired through the image sensor 214, various application data, data for control of the processor 470 or data processed by the processor 470. The memory 440 is one of the major heat generating devices including the processor 470. The memories 440 may be disposed around the processor 470 with the processor 470 disposed at the center of the processing board 220. For example, one or more memories 440 may be disposed to surround the processor 470 which is placed at the center. In this case, the processor 470 and the memories 440, which are the heat generating devices, may be disposed as far from the image sensor 214 as possible.

The processor 470 may be electrically connected to the controller 170. The processor 470 may be controlled by the controller 170.

The light shield 230 may be disposed at the front end of the lens 211. The light shield 230 may prevent light unnecessary for image acquisition from reaching the lens 211. For example, the light shield 230 may block light reflected from the windshield 10, dashboard of the vehicle or the like. In addition, the light shield 230 may block light generated by an undesired light source.

The light shield 230 may have the structure of a screen. For example, the light shield 230 may have the structure of a lower screen.

The shape of the light shield 230 may vary among types of vehicles. For example, the curvature of the windshield and the angle between the windshield and the ground may vary among the types of vehicles. Accordingly, the light shield 230 may have a shape corresponding to the type of the vehicle on which the camera 200a is mounted. To this end, the light shield 230 may have a detachable structure.

The heat dissipation member 240 may be disposed at the rear end of the image sensor 214. The heat dissipation member 240 may contact an image sensor board on which the image sensor 214 or the image sensor 214 is mounted. The heat dissipation member 240 may dissipate heat of the image sensor 214.

As described above, the image sensor 214 is sensitive to heat. The heat dissipation member 240 may be disposed between the image sensor 214 and the third housing 253. The heat dissipation member 240 may be disposed to contact the image sensor 214 and the third housing 253. In this case, the heat dissipation member 240 may dissipate heat through the third housing 253.

For example, the heat dissipation member 240 may be either a thermal pad or thermal grease.

The housing 250 may include the lens housing 217 the first housing 251, the second housing 252 and the third housing 253.

The lens housing 217 may accommodate at least one lens 211 and protect the lens 211 from external shock.

The first housing 251 may be formed to surround the image sensor 214. The first housing 251 may include a hole 219. The lens 211 may be connected to the image sensor 214 while being seated in the hole 219 when accommodated in the lens housing.

The first housing 251 may be formed to have a thickness which increases as the housing extends toward the image sensor 214. For example, the first housing 251 may be die-cast. In this case, to prevent performance of the processor 470 from being degraded by heat, a proximal part of the first housing 251 close to the image sensor 214 has greater thickness than the other part thereof.

The first housing 251 may have greater thickness than the third housing 253. As thickness of the housing increases, the heat transfer rate is lowered. Accordingly, if the first housing 251 is thicker than the third housing 253, heat generated from the inside of the camera 200a may be dissipated through the third housing 253 rather than the first housing 251 which is disposed close to the front windshield 10 and thus has difficulty dissipating heat.

According to an implementation, the lens housing 217 and the first housing 251 may be integrated with each other.

The second housing 252 may be disposed at the front end of the processing board 220. The second housing 252 may be fastened to the first housing 251 and the third housing 253 by a predetermined fastening.

The second housing 252 may be provided with an attachment to which the light shield 230 is attachable. The light shield 230 may be attached to the second housing 252 through the attachment.

The first and second housings 252 and 253 may be formed of a synthetic resin.

The third housing 253 may be fastened to the first housing 251 and the third housing 253 by a predetermined fastening.

According to an implementation, the first, second and third housings 251, 252, 253 may be integrated with each other.

The third housing 253 may be formed to surround the processing board 220. The third housing 253 may be positioned at the rear end or lower end of the processing board 220. The third housing 253 may be formed of a thermally conductive material. For example, the third housing 253 may be formed of metal such as aluminum. As the third housing 253 is formed of a thermally conductive material, heat dissipation may be efficiently implemented.

If the first housing 251 and the second housing 252 are formed of a synthetic resin and the third housing 253 is formed of a thermally conductive material, heat from the inside of the camera for vehicles may be dissipated through the third housing 253 rather than the first and second housings 251 and 252. That is, if the camera 200a is mounted on the windshield, the first and second housings 251 and 252 are positioned close to the windshield, and thus heat cannot be dissipated through the first and second housings 251 and 252. In this case, heat may be efficiently dissipated through the third housing 253.

Forming the third housing 253 with aluminum may be advantageous in protecting the internal components (e.g., the image sensor 214 and the processor 470) from electromagnetic compatibility (EMC) and electrostatic discharge (ESC).

The third housing 253 may contact the processing board 220. In this case, the third housing 253 may transfer heat through a portion thereof contacting the processing board 220. Thereby, heat may be efficiently dissipated.

The third housing 253 may further include a heat dissipation unit 291. For example, the heat dissipation unit 291 may include at least one of a heat sink, a heat dissipation fin, a thermal pad and thermal grease.

The heat dissipation 291 may dissipate heat generated inside of the camera 200a. For example, the heat dissipation unit 291 may be disposed between the processing board 220 and the third housing 253. The heat dissipation unit 291 may contact the processing board 220 and the third housing 253, thereby dissipating heat generated from the processing board 220.

The third housing 253 may further include an air discharge hole. The air discharge hole serves to discharge hot air from the camera 200a to the outside of the camera 200a. An airflow portion connected to the air discharge hole may be included in the camera 200a. The airflow portion may guide hot air from inside the camera 200a to the air discharge hole.

The camera 200a may further include a damp proofing portion. The damp proofing portion may be formed in the shape of a patch and attached to the air discharge portion. The damp proofing portion may be formed of a Gore-Tex material. The damp proofing portion may discharge moisture from the camera 200a. The damp proofing portion may prevent external moisture from being introduced into the camera 200a.

Figure 3D:
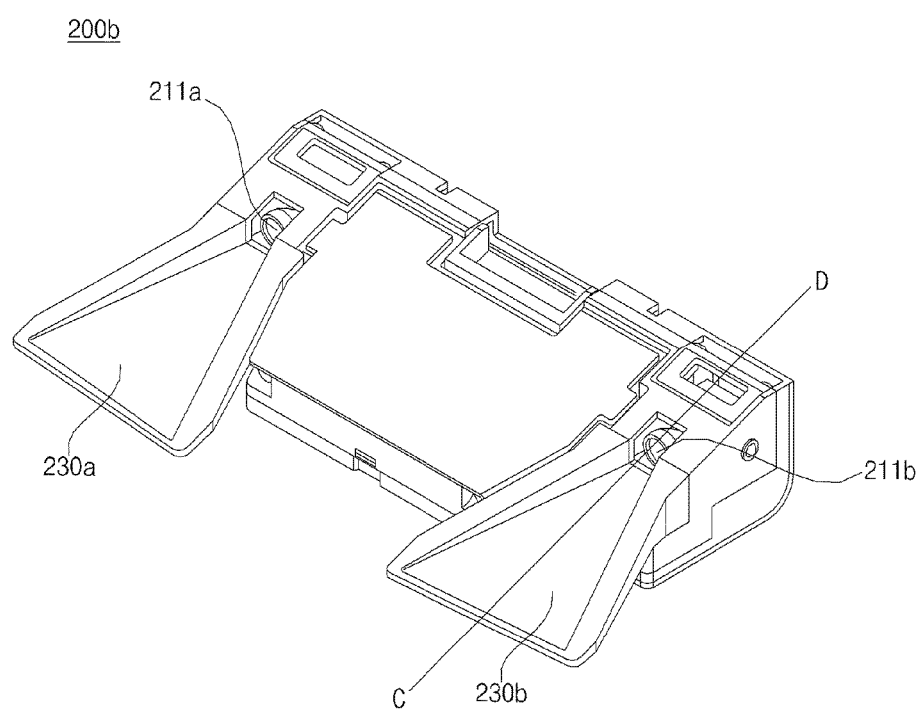
FIG. 3D is a diagram illustrating an example of a camera for vehicles according to an implementation.
Figure 3E:
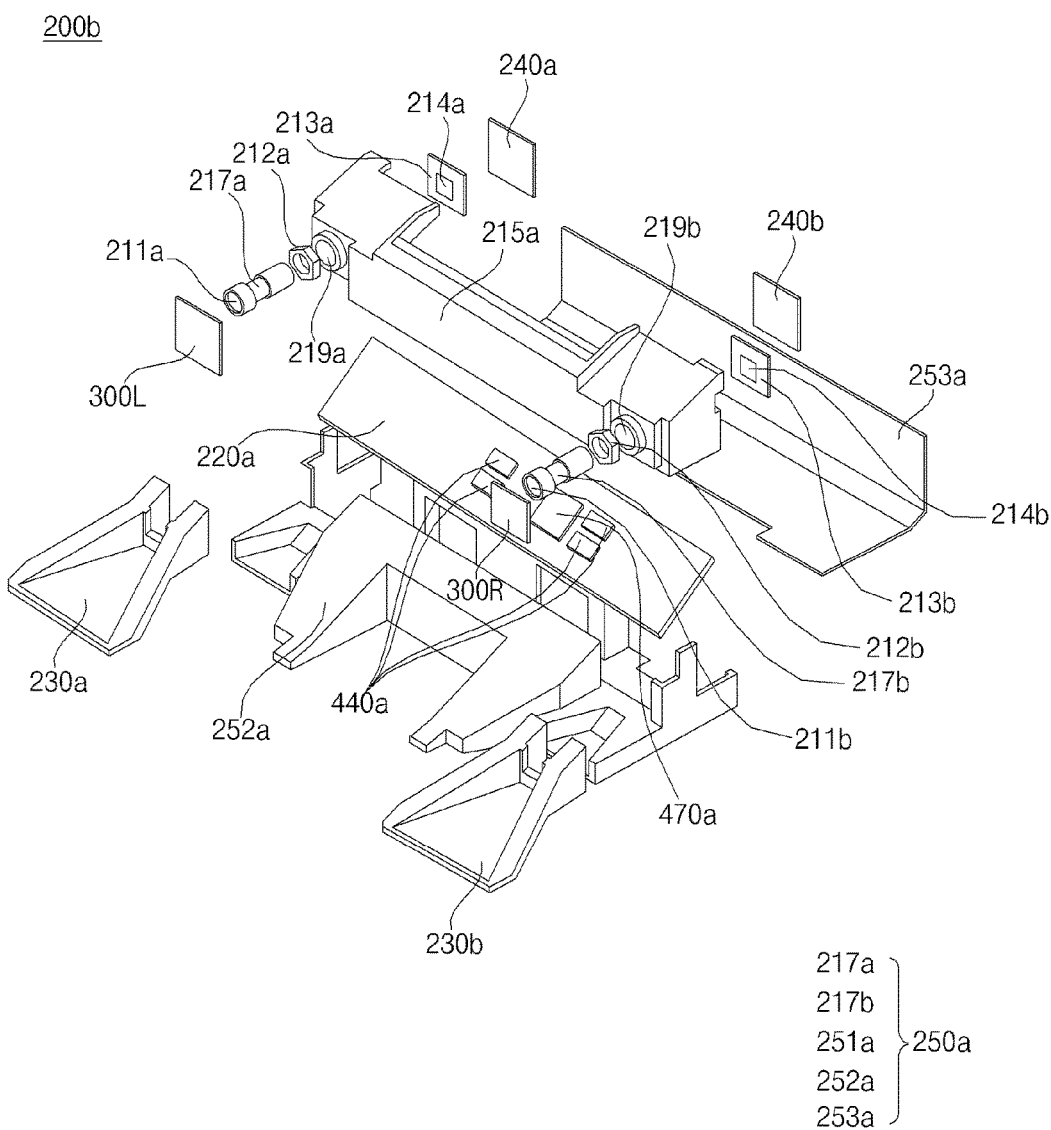
FIG. 3E is diagram illustrating an example of a camera for vehicles according to an implementation.
Figure 3F:
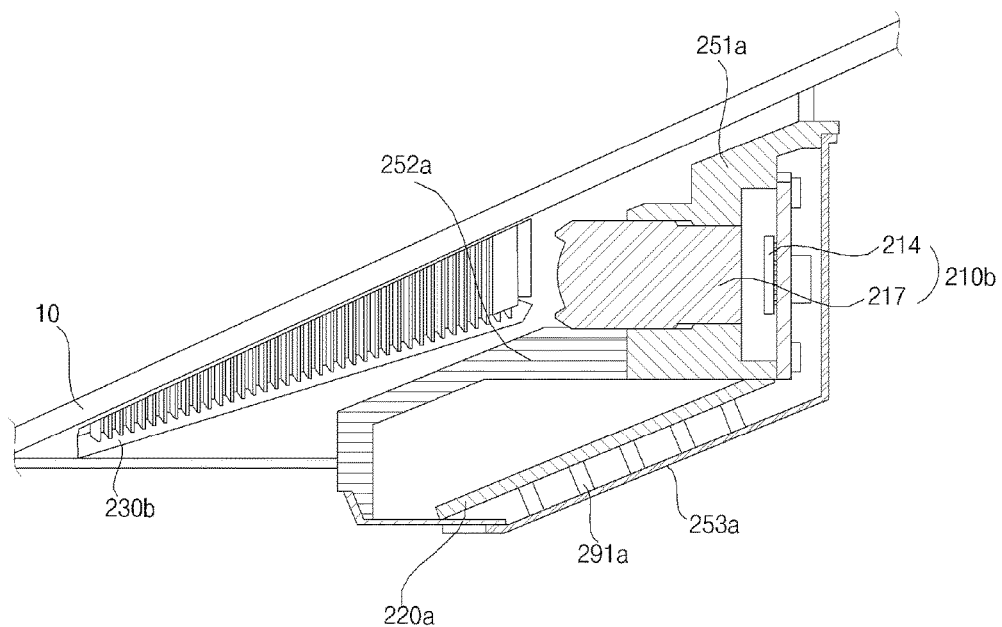
FIG. 3F is a diagram illustrating an example of a cutaway side view of the camera for vehicles, taken along line C-D of FIG. 3D.

FIG. 3D is a perspective view illustrating a camera for vehicles according to an implementation. FIG. 3E is an exploded perspective view illustrating the camera for vehicles according to an implementation. FIG. 3F is a cutaway side view of the camera for vehicles, taken along line C-D of FIG. 3D.

The camera 200 described below with reference to FIGS. 3D to 3F is a stereo camera 200b.

All the details of the single camera 200a described above with reference to FIGS. 3A to 3C may be applied to the stereo camera 200b. That is, the first and second cameras included in the stereo camera 200b may be the cameras described above with reference to FIG. 3A to 3C.

The stereo camera 200b may include a first lens 211a, a second lens 211b, a first image sensor 214a, a second image sensor 214b and a processor 470a.

According to an implementation, the camera 200b may include a processing board 220a, a first light shield 230a, a second light shield 230b, a housing 250a, or a combination thereof.

The housing may include a first lens housing 217a, a second lens housing 217b, a first housing 251a, a second housing 252a, and a third housing 253a.

The details of the image sensor 214 described above with reference to FIGS. 3A to 3C may be applied to the first image sensor 214a and the second image sensor 214b.

The details of the image sensor 214 of FIGS. 3A to 3C may be applied to the first image sensor 214a and the second image sensor 214b.

A module including the first lens 211a and the first image sensor 214a may be referred to as a first image acquisition module. In addition, a module including the second lens 211b and the second image sensor 214b may be referred to as a second image acquisition module.

The processor 470a may be electrically connected to the first image sensor 214a and the second image sensor 214b. The processor 470a may perform computer processing on images acquired through the first image sensor 214a and the second image sensor 214b. In this case, the processor 470a may establish a disparity map or perform an operation for disparity based on the images acquired through the first image sensor 214a and the second image sensor 214b.

The processor 470 may be implemented using at least one of application specific integrated circuits (ASICs, digital signal processors (DSPs, digital signal processing devices (DSPDs, programmable logic devices (PLDs, field programmable gate arrays (FPGAs, processors, controllers, microcontrollers, microprocessors, and electric units for performing other functions.

The processor 470a may be mounted on the processing board 220a.

The details of the processing board 220 of FIGS. 3A to 3C may be applied to the processing board 220a.

The details of the light shield 230 of FIGS. 3 to 5 may be applied to the first light shield 230a and the second light shield 230b.

The details of the lens housing 217 of FIGS. 3 to 5 may be applied to the first lens housing 217a and the second lens housing 217b.

The details of the first housing 251 of FIGS. 3A to 3C may be applied to the first housing 251a.

The details of the second housing 252 of FIGS. 3A to 3C may be applied to the second housing 252a.

The details of the third housing 253 of FIGS. 3A to 3C may be applied to the third housing 253a.

Figure 4A:
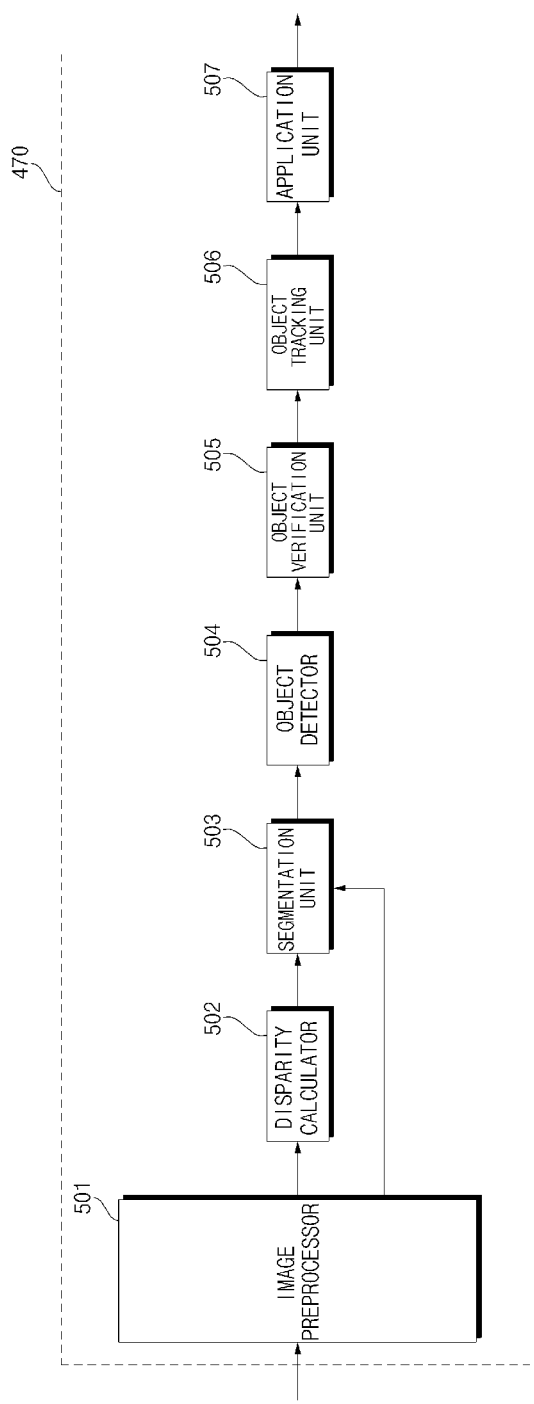
FIGS. 4A and 4B are block diagrams illustrating examples of the processor of FIGS. 3A to 3F.
Figure 4B:
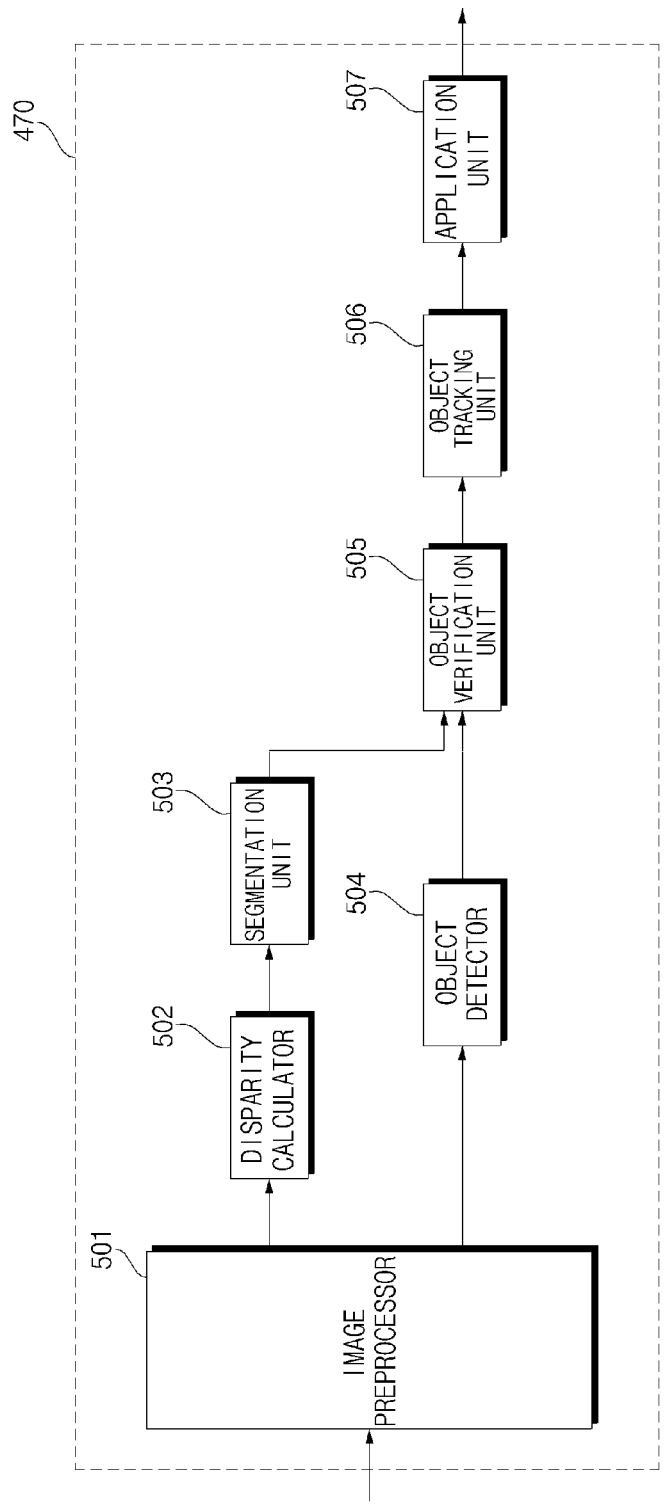

FIGS. 4A and 4B are exemplary internal block diagrams of the processor of FIGS. 3A to 3F, and FIGS. 5A to 5D illustrate operation of the processor of FIGS. 4A and 4B.

Referring to FIG. 4A, the processor 470 may include an image preprocessor 501, a disparity calculator 502, an object detector 504, an object tracking unit 506, and an application unit 507.

The image preprocessor 501 may receive images from the camera 200 and perform preprocessing thereof.

Specifically, the image preprocessor 501 may perform noise reduction, rectification, calibration, color enhancement, color space conversion (CSC), interpolation and camera gain control for the images. Thereby, an image clearer than the stereo image captured by the camera 200 may be acquired.

The disparity calculator 502 may receive images signal-processed by the image preprocessor 501, perform stereo matching upon the received images, and acquire a disparity map according to the stereo matching. That is, the disparity calculator 502 may acquire disparity information on a stereo image of the front view of the vehicle.

Herein, the stereo matching may be performed in a pixel unit or a predetermined block unit of the stereo images. The disparity map may represent a map indicating numerical values representing binocular parallax information about the stereo images, namely left and right images.

The segmentation unit 503 may perform segmentation and clustering on at least one of the images based on the disparity information from the disparity calculator 502.

Specifically, the segmentation unit 503 may separate the background from the foreground in at least one of stereo images based on the disparity information.

For example, a region of the disparity map which has disparity information less than or equal to a predetermined value may be calculated as the background and removed. Thereby, the foreground may be separated from the background.

As another example, a region having disparity information greater than or equal to a predetermined value in the disparity map may be calculated as the foreground and the corresponding part may be extracted. Thereby, the foreground may be separated from the background.

By separating, the foreground from the background based on the disparity information extracted based on the stereo images, signal-processing speed may be increased and signal-processing load may be reduced in the subsequent object detection operation.

Next, the object detector 504 may detect an object based on an image segment from the segmentation unit 503.

That is, the object detector 504 may detect an object in at least one of the images based on the disparity information.

Specifically, the object detector 504 may detect an object in at least one of the images. For example, the object detector 504 may detect an object in the foreground separated through image segmentation.

The object detector 504 may perform lane detection (LD), vehicle detection (VD), pedestrian detection (PD), bright spot detection (BD), traffic sign recognition (TSR), and road surface detection.

Next, the object verification unit 505 may classify and verify the separated object.

To this end, the object verification unit 505 may use an identification technique employing a neural network, a support vector machine (SVM) technique, an identification technique based on AdaBoost using Haar-like features or the histograms of oriented gradients (HOG) technique.

Meanwhile, the object verification unit 505 may verify an object by comparing the detected object with objects stored in the memory 440.

For example, the object verification unit 505 may verify a nearby vehicle, a lane, a road surface, a signboard, a dangerous area, a tunnel, and the like which are positioned around the vehicle.

The object-tracking unit 506 may track the verified object. For example, the object-tracking unit 506 may sequentially perform verification of an object in the acquired stereo images, computation of the motion or motion vectors of the verified object, and tracking of movement of the object based on the computed motion or motion vector. Thereby, the object tracking unit 506 may track a nearby vehicle, a lane, a road surface, a signboard, a dangerous area, a tunnel, and the like which are positioned around the vehicle.

Next, the application unit 507 may calculate dangerousness to the vehicle 100 based on various objects positioned near the vehicle, for example, another vehicle, a lane, a road surface, a signboard, and the like. In addition, the application unit 507 may calculate possibility of collision with a preceding vehicle and slippage of the vehicle.

In addition, the application unit 507 may output a message for delivering information such as the calculated dangerousness, collision possibility or slippage as driving assistance information. Alternatively, the application unit 507 may generate a control signal for controlling the position or movement of the vehicle 100 as a vehicle control information.

According to an implementation, the processor 470 may include only some of the imaging preprocessor 501, the disparity calculator 502, the segmentation unit 503, the object detector 504, the object verification unit 505, the object tracking unit 506 and the application unit 507. For example, if the camera 200 is a mono camera, the disparity calculator 502 may not be provided. According to an implementation, the segmentation unit 503 may not be provided.

FIG. 4B is another exemplary internal block diagram of the processor.

Referring to FIG. 4B, the processor 470 of FIG. 4B has the same internal constituent units as those of the processor 470 of FIG. 4A, but has a different signal processing sequence. Hereinafter, the different signal processing sequence will be described.

The object detector 504 may receive stereo images and detect an object in at least one of the stereo images. In contrast with the example of FIG. 4A, the object may be directly detected in the stereo images rather than being detected in a segmented image based on the disparity information.

Next, the object verification unit 505 classifies and verifies an object detected and separated based on an image segment from the segmentation unit 503 and objects detected by the object detector 504.

To this end, the object verification unit 505 may use an identification technique employing a neural network, the support vector machine (SVM) technique, an identification technique based on AdaBoost using Haar-like features, or the histograms of oriented gradients (HOG) technique.

Figure 5A:
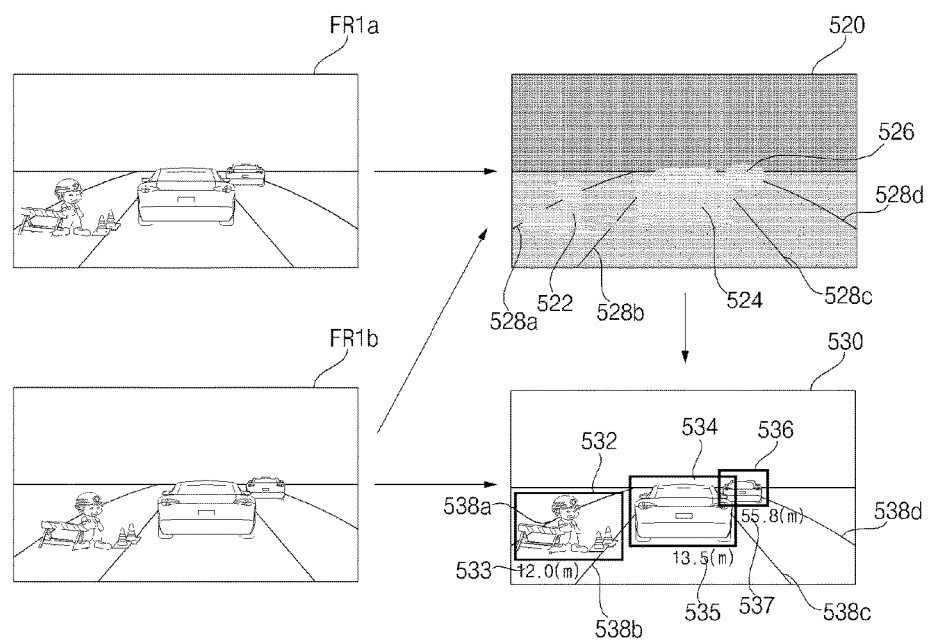
FIGS. 5A to 5D are diagrams of examples of operations of the processor of FIGS. 4A and 4B.
Figure 5B:
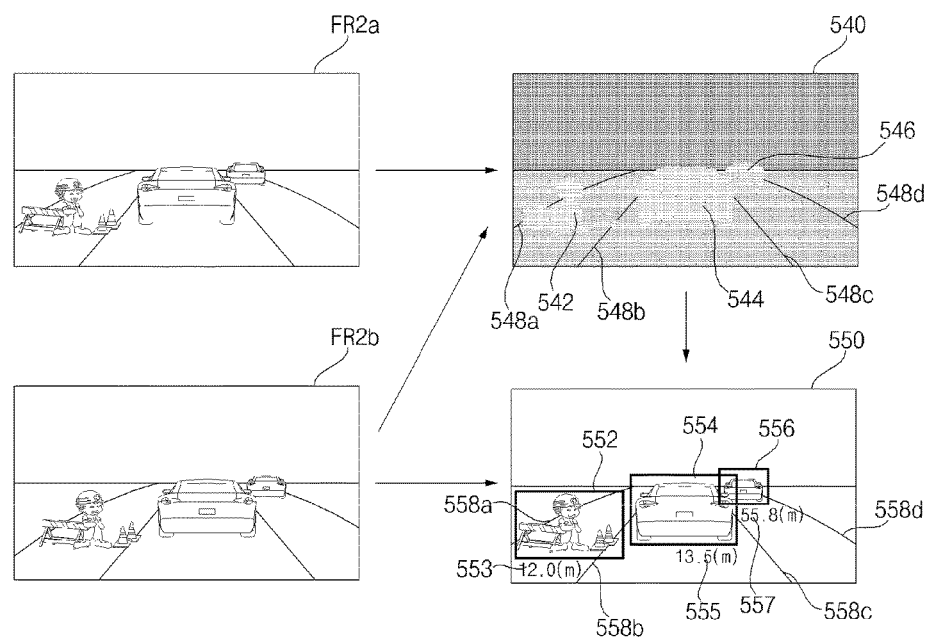

FIGS. 5A and 5B illustrate operation of the processor 470 of FIGS. 4A to 4C based on stereo images acquired in first and second frame intervals, respectively.

Referring to FIG. 5A, the stereo camera 200*b* acquires a stereo image during the first frame interval.

The disparity calculator 502 in the processor 470 receives stereo images FR1*a* and FR1*b* signal-processed by the image preprocessor 501, and performs stereo matching for the received stereo images FR1*a* and FR1*b*, thereby acquiring a disparity map 520.

The disparity map 520 provides levels of disparities between the stereo images FR1*a* and FR1*b*. The disparity level may be inversely proportional to the distance to the vehicle.

When the disparity map is displayed, high brightness may be provided to a high disparity level and a low brightness may be provided to a low disparity level.

In FIG. 5A, first to fourth lines 528*a*, 528*b*, 528*c* and 528*d* have corresponding disparity levels and a construction area 522, a first preceding vehicle 524 and a second preceding vehicle 526 have corresponding disparity levels in the disparity map 520.

The segmentation unit 503, the object detector 504, and the object verification unit 505 perform segmentation, object detection and object verification for at least one of the stereo images FR1a and FR1b based on the disparity map 520.

In the example illustrated in the figure, object detection and verification are performed for the second stereo image FR1b using the disparity map 520.

That is, object detection and verification may be performed for the first to fourth lines 538a, 538b, 538c and 538d, the construction area 532, the first preceding vehicle 534, and the second preceding vehicle 536.

Next, referring to FIG. 5B, the stereo camera 200b acquires a stereo image during the second frame interval.

The disparity calculator 502 in the processor 470 receives stereo images FR2a and FR2b signal-processed by the image preprocessor 501, and performs stereo matching on the received stereo images FR2a and FR2b, thereby acquiring a disparity map 540.

In the figure, first to fourth lines 548a, 548b, 548c and 548d have corresponding disparity levels, and a construction area 542, a first preceding vehicle 544 and a second preceding vehicle 546 have corresponding disparity levels in the disparity map 540.

The segmentation unit 503, the object detector 504, and the object verification unit 505 perform segmentation, object detection and object verification for at least one of the stereo images FR2a and FR2b based on the disparity map 540.

The figure illustrates object detection and verification performed on the second stereo image FR2b using the disparity map 540.

That is, object detection and verification may be performed for the first to fourth lines 548a, 548b, 548c and 548d, construction area 552, first preceding vehicle 554, and second preceding vehicle 556 in the image 550.

The object-tracking unit 506 may track a verified object by comparing FIGS. 5A and 5B.

Specifically, the object-tracking unit 506 may track movement of an object based on motions or motion vectors of respective objects verified in FIGS. 5A and 5B. Thereby, lanes, a construction area, a first preceding vehicle, a second preceding vehicle and the like positioned around the vehicle may be tracked.

Figure 5C:
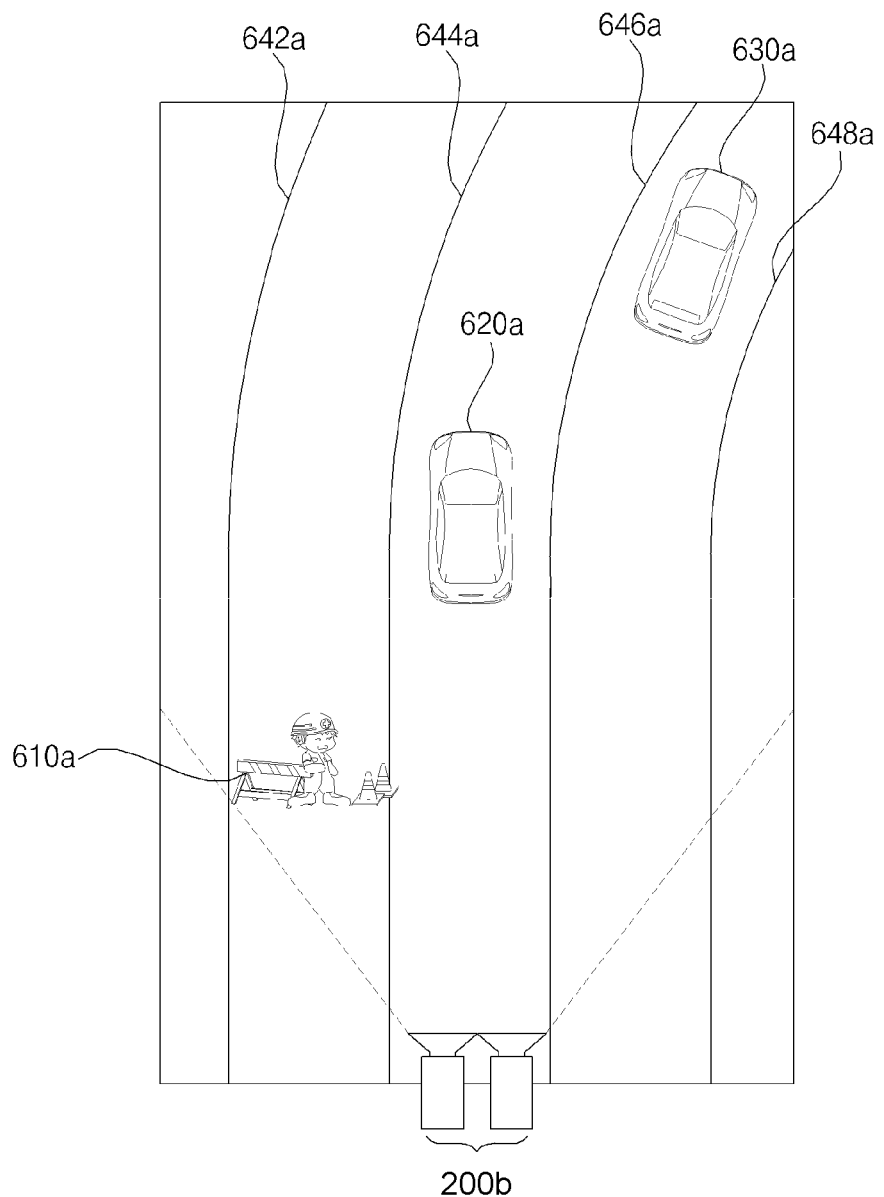
Figure 5D:
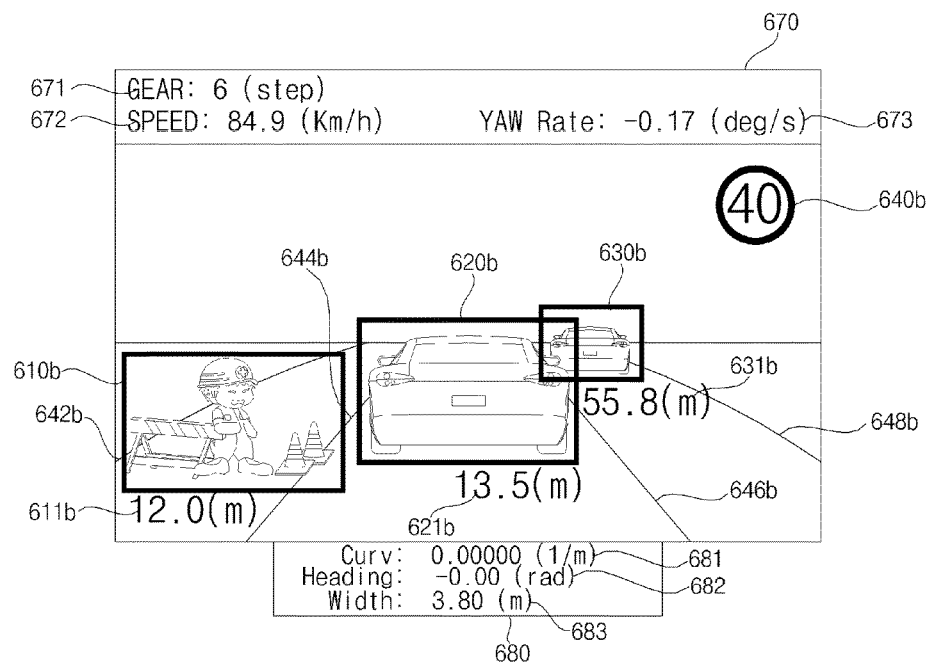

FIGS. 5C and 5D illustrate operation of a camera for vehicles.

FIG. 5C illustrates an exemplary front situation of the vehicle whose images are captured by the stereo camera 200b provided in the vehicle. In particular, the vehicle front situation is displayed as a bird's eye view image.

Referring to FIG. 5C, a first lane line 642a, a second lane line 644a, a third lane line 646a, and a fourth lane line 648a are positioned from left to right. A construction area 610a is positioned between the first lane line 642a and the second lane line 644a, a first preceding vehicle 620a is positioned between the second lane line 644a and the third lane line 646a, and a second preceding vehicle 630a is positioned between the third lane line 646a and the fourth lane line 648a.

FIG. 5D illustrates displaying a vehicle front situation recognized by the driver assistance apparatus along with various kinds of information. In particular, the image shown in FIG. 5D may be displayed on the display apparatus 141.

FIG. 5D illustrates displaying information based on images captured by the stereo camera 200, in contrast with the example of FIG. 5C.

Referring to FIG. 5D, a first lane line 642b, a second lane line 644b, a third lane line 646b, and a fourth lane line 648b are presented from the left to the right. A construction area 610b is positioned between the first lane line 644b and the second lane line 644b, a first preceding vehicle 620b is positioned between the second lane line 644b and the third lane line 646b, and a second preceding vehicle 630b is positioned within the third lane line 646b and the fourth lane line 648b.

The camera 200 for vehicles may perform signal processing based on the stereo images captured by the stereo camera 200b, thereby verifying objects corresponding to the construction area 610b, the first preceding vehicle 620b and the second preceding vehicle 630b. In addition, the driver assistance apparatus 100 may verify the first lane line 642b, the second lane line 644b, the third lane line 646b and the fourth lane line 648b.

In the figure, to indicate that the objects corresponding to the construction area 610b, the first preceding vehicle 620b and the second preceding vehicle 630b are verified, the objects are highlighted using edge lines.

The camera 200 may calculate distance information on the construction area 610b, the first preceding vehicle 620b and the second preceding vehicle 630b based on the stereo images captured by the stereo camera 200b.

In the figure, first calculated distance information 611b, second calculated distance information 620b and third calculated distance information 630b corresponding to the construction area 610b, the first preceding vehicle 620b and the second preceding vehicle 630b respectively are displayed.

The camera 200 may receive sensor information about the vehicle from the controller 170 or the internal sensing unit 125. In particular, the camera 200 may receive and display the vehicle speed information, gear information, yaw rate information indicating a variation rate of the yaw of the vehicle and orientation angle information about the vehicle.

In the figure, vehicle speed information 672, gear information 671 and yaw rate information 673 are displayed on the upper portion 670 of the vehicle front view image, and vehicle orientation angle information 682 is displayed on the lower portion 680 of the vehicle front view image. However, various examples other than the illustrated example are possible. Additionally, vehicle width information 683 and road curvature information 681 may be displayed along with the vehicle orientation angle information 682.

Figure 6:
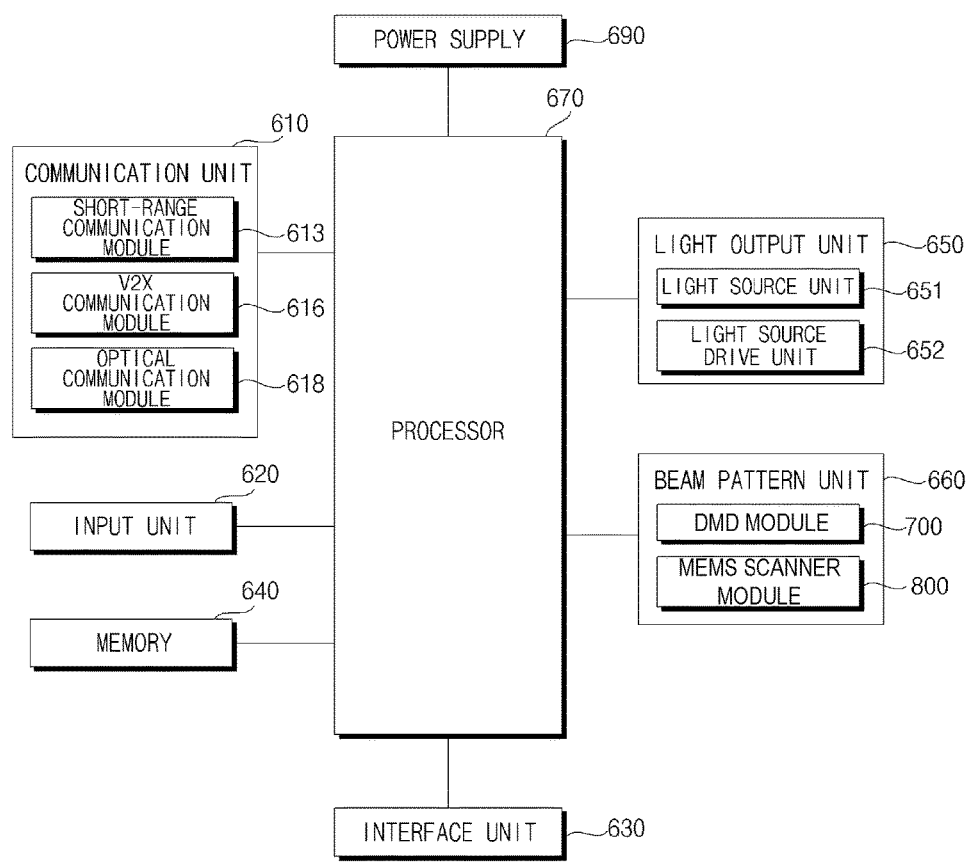
FIG. 6 is a block diagram illustrating an example of a lighting apparatus for vehicles according to an implementation.

FIG. 6 is a block diagram illustrating a lighting apparatus for vehicles according to an implementation.

Referring to FIG. 6, the lighting apparatus 600 may include a communication unit 610, an input unit 620, an interface unit 630, a memory 640, a light output unit 650, a beam pattern unit 660, a processor 670 and a power supply 690. According to an implementation, some of the elements shown in FIG. 6 may be omitted or a new element may be further provided.

The communication unit 610 may include one or more radio frequency (RF) circuits or devices for communication with other devices.

The communication unit 610 may include a short-range communication module 613, a V2X communication module 616, or an optical communication module 618.

The short-range communication module 613 may perform short-range communication with a mobile terminal carried by the user. The short-range communication module 613 may receive information, signals or data from the mobile terminal and provide the same to the processor 670.

The V2X communication module 616 may perform communication with an external server or other vehicles. The V2X communication module 616 may receive information, signals or data from the external server or other vehicles and provide the same to the processor 670.

The optical communication module 618 may include a light transmitter and a light receiver.

The light receiver may covert a light signal into an electrical signal to receive information. The light receiver may include a photodiode (PD) for receiving light. The PD may convert light into an electrical signal. For example, the light receiver may receive information on a preceding vehicle through light emitted from a light source included in the preceding vehicle.

The light transmitter may include at least one light emitting device for converting an electrical signal into a light signal. Preferably, the light emitting device is a light emitting diode (LED). The light transmitter converts an electrical signal into a light signal and transmits the light signal outside. For example, the light transmitter transmits a light signal by blinking a light emitting device at a predetermined frequency. According to some implementations, the light transmitter may include an array of a plurality of light emitting devices. According to some implementations, the light transmitter may be integrated with a lamp provided to the vehicle 100. For example, the light transmitter may be at least one of a headlight, a taillight, a stop lamp, a turn signal lamp and a sidelight. For example, the optical communication module 618 may exchange data with other vehicles through optical communication.

The input unit 620 may be provided with an input unit capable of receiving user input for controlling operation of the lighting apparatus 600. The input unit 620 may be provided in the vehicle 100. The input unit 620 may include a touch input unit or a mechanical input unit. The input unit 620 may receive user input for turning on or off the lighting apparatus 600. The input unit 620 may receive user input for controlling various operations of the lighting apparatus 600.

The interface unit 630 may exchange information, signals or data with the controller 170, the sensing unit 135, the vehicle drive unit 150 or the driver assistance system 400 of the vehicle 100.

The interface unit 630 may receive state information about the vehicle 100 from the internal sensing unit 125 and provide the same to the processor 670.

The interface unit 630 may receive, from the internal sensing unit 125, vehicle condition information, vehicle collision information vehicle direction information, vehicle location information (GPS information), vehicle orientation information, vehicle speed information, vehicle acceleration information, vehicle inclination information, vehicle drive/reverse information, battery information, fuel information, tire information, vehicle lamp information, vehicle interior temperature information, vehicle interior humidity information, and information about a steering wheel rotation angle, the luminance of the exterior of the vehicle, the pressure applied to the accelerator pedal, a pressure applied to the brake pedal, and the like.

The interface unit 630 may receive information about the situation outside the vehicle 100 from the external sensing unit 126 and provide the same to the processor 670.

The interface unit 630 may receive information about various objects positioned outside the vehicle 100.

The memory 640 may store basic data about respective units of the lighting apparatus 600, control data for controlling operations of the respective units, and data input to and output from the lighting apparatus 600.

The memory 640 may include various hardware storage devices such as a ROM, RAM, EPROM, flash drive, and hard drive.

The memory 640 may store various kinds of data for overall operations of the lighting apparatus 600 including a program for the processing operation or control operation of the processor 670.

The light output unit 650 may generate and output light. The light output unit 650 may include a light source unit 651 and a light source drive unit 652.

The light source unit 651 may generate light. The light source unit 651 may convert electrical energy into light energy.

The light source unit 651 may include a light emitting device. The light emitting device may include a light emitting diode (LED) or a laser diode.

According to an implementation, the light source unit 651 may include a plurality of light emitting devices. For example, the light source unit 651 may include a blue laser diode, a green laser diode and a red laser diode.

According to an implementation, the light source unit 651 may include a plurality of micro LEDs. The micro LEDs may be individually controlled according to the light source drive unit 652.

The light source unit 651 may be driven based on an electrical signal provided from the light source drive unit 652.

The light source drive unit 652 may provide the light source unit 651 with an electrical signal for driving light source unit 651. The electrical signal provided from the light source drive unit 652 may be generated according to control of the processor 670.

Figure 7:
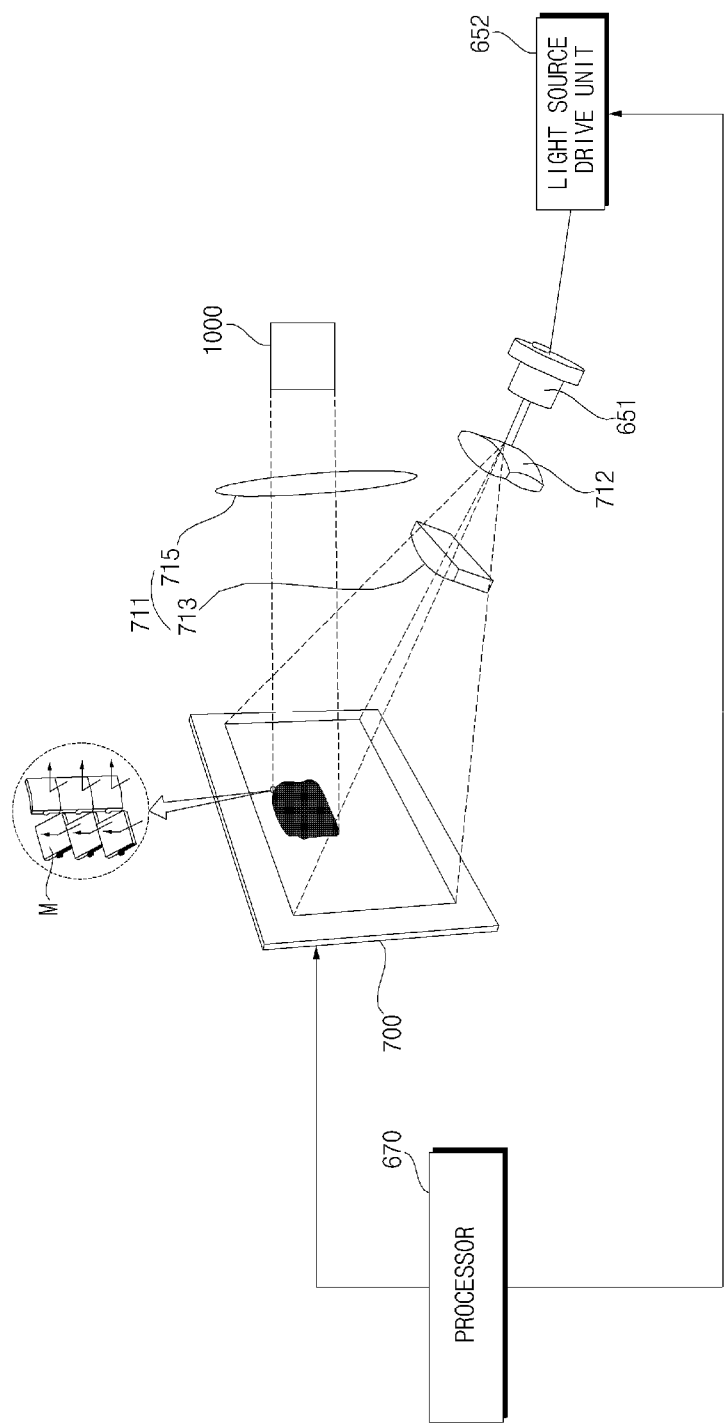
FIG. 7 is a diagram illustrating an example of operations of displaying a visual image using a DMD module according to an implementation.

According to an implementation, the light output unit 650 may further include a light converter (712 of FIG. 7) and an optical unit (713 and 715 of FIG. 7).

The beam pattern unit 660 may change the pattern of light generated by the light output unit 650. The beam pattern unit 660 may change the pattern of input light to display a visual image outside the vehicle 100. The beam pattern unit 660 may change the visual image displayed by the light output unit 650.

For example, the beam pattern unit 660 may change a display region for the visual image.

For example, the beam pattern unit 660 may change the shape, color, size or brightness of the visual image.

The beam pattern unit 660 may optionally include a digital micro mirror device (DMD) module 700 and a micro electromechanical system (MEMS) scanner module 800.

The DMD module 700 may change visual images by changing the position of each of the micro mirrors included in the DMD according to control of the processor 670. The DMD module 700 will be described in detail with reference to FIG. 7.

The MEMS scanner module 800 may change visual images by changing a scanning path generated through a scanner mirror and the pattern of light output on the scanning path, according to control of the processor 670. The MEMS scanner module 800 will be described in detail with reference to FIG. 8.

The processor 670 may be electrically connected to respective units in the lighting apparatus 600 to control overall operations of the respective units.

The processor 670 may perform a control operation to secure a clear view through light generated by the light output unit 650. The processor 670 may control the light output unit 650 or the beam pattern unit 660 based on the light generated from the light output unit 650 such that light for securing a clear view is output. In this case, the light generated by the light output unit 650 may be output forward or rearward of the vehicle, thereby assisting the driver in properly performing driving at night or in bad weather.

In addition, in some implementations, the processor 670 may receive first information via the interface unit 630.

The processor 670 may also receive the first information from another source, such as the sensing unit 135 or display apparatus 141.

The first information may be, for example, vehicle travel information. As specific examples, the first information may include at least one of travel speed information, information about an object positioned around the vehicle, navigation information, turn signal information and on-board diagnostics (OBD) information.

The processor 670 may control the light output unit 650 or beam pattern unit 660 such that a visual image corresponding to the first information is displayed using the light generated by the light output unit 650. Specifically, the processor 670 may output light for displaying a visual image within a range of light for securing a clear view.

As a visual image is displayed using light generated by the light output unit 650, the driver may recognize the first information through the visual image. In this case, the driver may recognize the first information while looking forward with a clear view secured. As the driver's gaze for driving coincides with the driver's gaze for acquisition of information, the possibility of an accident according to distraction of the driver may be lowered.

Based on the first information, the processor 670 may display the visual image by adjusting the display region for the visual image or the color of the visual image.

For example, the processor 670 may adjust the position of a display region for a visual image corresponding to the travel speed information about the vehicle 100 and display the visual image based on the travel speed information. Specifically, the processor 670 may adjust the position of the display region for the visual image within the field of the light for securing a clear view and display the visual image.

When the vehicle 100 travels at a high speed, the processor 670 may perform a control operation such that the visual image is displayed farther ahead than when the vehicle travels at a low speed. Since the driver gazes farther ahead when the vehicle travels at a high speed than when the vehicle travels at a low speed, this method may more securely deliver information to the driver according to the visual image. If the travel speed of the vehicle 100 is greater than or equal to a reference speed, the processor 670 may control the visual image to be displayed in a first color. Thereby, the driver may be alerted to the speed.

For example, the processor 670 may adjust the color of a visual image according to the travel speed information and display the visual image based on the travel speed information. For example, if the travel speed of the vehicle 100 is higher than or equal to a first reference speed, the processor 670 may display the visual image in a first color. By changing the color of the visual image when high-speed travel is performed as described above, the driver may be alerted to the speed and safe driving may be enhanced.

The processor 670 may display a visual image based on adjustment of the color and intensity of light generated by the light output unit 650.

For example, the processor 670 may display a visual image by adjusting the color of light for securing a clear view and the color of light for displaying a visual image differently.

For example, the processor 670 may display a visual image by adjusting the intensity of light for securing a clear view and the intensity of light for displaying a visual image differently.

The processor 670 may receive second information via the interface unit 630.

The processor 670 may receive the second information from the sensing unit 135.

The second information may be information about the situation around the vehicle or information about an environment around the vehicle. For example, the second information may include at least one of road information, external light information, and information about another vehicle positioned around the vehicle.

The processor 670 may control the light output unit 650 or beam pattern unit 660 such that visual images are changed based on the second information.

By changing a visual image to be displayed according to the situation or environment around the vehicle, the driver may be allowed to clearly see the visual image. Thereby, information corresponding to the visual image may be more securely delivered to the driver.

The processor 670 may change visual images through control of the beam pattern unit 660.

For example, if the beam pattern unit 660 includes the DMD module 700, the processor 670 may change visual images by controlling the position of each of the micro mirrors included in the DMD.

For example, when the beam pattern unit 660 includes the MEMS scanner module 800, the processor 670 may change visual images by controlling a scanning path generated through the scanner mirror and the pattern of light output on the scanning path.

If the light output unit 650 includes a plurality of micro LEDs, the processor 670 may change visual images by controlling each of the micro LEDs.

The processor 670 may receive vehicle position information from the sensing unit 135 via the interface unit 630. The processor 670 may change the display region for visual images, based on the received vehicle position information.

When the vehicle 100 travels on an uneven road, a region in which a visual image is displayed outside the vehicle 100 is changed according to vertical movement of the body of the vehicle. In this case, an accident is likely to happen since it takes a certain time for the driver to recognize the visual image or the driver is distracted by the visual image. In this case, the display region for the visual image may be changed according to the vehicle position information. Thereby, the visual image may be stably displayed without being affected by the conditions of the road surface.

In some implementations, the processor 670 may control the visual image to be displayed within the drive lane.

In some implementations, the processor 670 may control the visual image to be displayed within a range corresponding to the width of the vehicle.

If the visual image is displayed outside the drive lane, information may not be correctly delivered to the driver of the vehicle, the image may distract the driver of another vehicle, causing an accident. By causing the visual image to be displayed only within the drive lane or the range corresponding to the width of the vehicle, the information may be intensively delivered to the driver of the vehicle 100.

The processor 670 may perform a control operation to change the display region for the visual image based on the second information. In this case, the processor 670 may perform a control operation to gradually change the visual image according to the second information. Specifically, the processor 670 may perform a control operation such that the position of the display region is changed within the range of light for securing a clear view.

For example, the processor 670 may receive external light emission information as the second information. If the external light is emitted onto the display region for the visual image, the processor 670 may perform a control operation to display the visual image in a region other than the region onto which external light is emitted. Specifically, the processor 670 may control the visual image to be displayed outside the region of external light within the range of field of light for securing a clear view.

Alternatively, if the brightness of the external light is less than or equal to a reference value, the processor 670 may control the visual image to be displayed in the region onto which the external light is emitted.

Thereby, the driver may be allowed to accurately recognize the visual image even if external light is introduced into the display region for the visual image.

For example, the processor 670 may receive curved section information as the second information. The processor 670 may control the display region for the visual image to be changed according to the curved section information.

Specifically, the processor 670 may control the display region for the visual image to be changed along the curve.

For example, when the vehicle 100 travels along a curved section curved leftward with respect to the travel direction, the processor 670 may control the display region for the visual image to be changed leftward. In this case, the processor 670 may adjust the degree of change according to the curvature of the curve.

For example, when the vehicle 100 travels along a curved section curved rightward with respect to the travel direction, the processor 670 may control the display region for the visual image to be changed rightward. In this case, the processor 670 may adjust the degree of change according to the curvature of the curve.

Thereby, when the vehicle travels along a curved section, the visual image may be displayed in a region at which the driver looks. Thereby, the driver may be allowed to accurately recognize the visual image.

The processor 670 may perform a control operation based on the second information to change the shape, color, size or brightness of a visual image. In this case, the processor 670 may perform a control operation to gradually change the shape, color, size or brightness of the visual image according to the second information.

For example, the processor 670 may receive external light emission information as the second information. If external light is emitted onto the display region for the visual image, the processor 670 may control the visual image to be displayed with greater brightness than the external light. Alternatively, the processor 670 may control the visual image to be displayed in a color different from that of the external light.

Thereby, the driver may be allowed to accurately recognize the visual image even if external light is introduced into the display region for the visual image.

The processor 670 may receive information about another vehicle travelling near the vehicle 100 as the second information. The processor 670 may receive information indicating whether a vehicle is in a lane next to the drive lane of the vehicle 100 and approaches the vehicle 100 from behind.

If another vehicle is in a lane next to the drive lane of the vehicle 100 and approaches the vehicle 100 from behind, the processor 670 may perform a control operation to increase brightness of the displayed visual image. Alternatively, the processor 670 may perform a control operation to display the visual image in a color different from that of the external light.

The processor 670 may receive light intensity information about light output from the lighting apparatus of another vehicle. The camera 200 may acquire light intensity information by performing computer processing on a captured image (e.g., by analyzing brightness of the captured image). Alternatively, the light intensity information may be acquired through an illumination sensor included in the internal sensing unit 125.

The processor 670 may control brightness of the visual image according to the light intensity information. For example, the processor 670 may perform a control operation to increase brightness of the visual image in proportion to the light intensity.

Thereby, the driver may be allowed to accurately recognize the visual image even if external light is introduced into the display region for the visual image.

The processor 670 may receive information about the distance to a preceding vehicle as the second information. The information about the distance to a preceding vehicle may be acquired through the external sensing unit 126. Herein, the preceding vehicle may be a vehicle which travels ahead of the vehicle 100 in the drive lane of the vehicle 100.

The processor 670 may control the display region for the visual image to be changed according to the distance information.

If the distance between the vehicle 100 and another vehicle is within a first reference distance, the processor 670 may control the visual image to be displayed on the body of another vehicle.

Thereby, when the vehicle 100 and another vehicle are close to each other, the visual image may be displayed on the body of another vehicle rather than on the road surface. Thereby, the driver may be allowed to accurately recognize the visual image.

The processors 670 may receive object information acquired from the camera 200 through image processing or a control signal, which is based on the object information, via the interface unit 630.

The processor 670 may receive distorted display information about the visual image via the interface unit 630. The camera 200 may perform computer processing on a captured image and acquire distorted display information. If the visual image is distorted when it is displayed, the processor 670 may adjust the display position of the visual image on the body of another vehicle. Alternatively, if the displayed visual image is distorted, the processor 670 may adjust the size of the visual image displayed on the body of another vehicle.

Typically, the body of a vehicle has flat parts and non-flat parts due to design thereof. When the visual image is displayed on a non-flat part of another vehicle, the visual image may be distorted. In this case, the display position of the visual image may be adjusted to a flat part or the visual image may be reduced in size. Thereby, distortion of the displayed visual image may be prevented.

The processor 670 may receive information about flat parts of the body of another vehicle via the interface unit 630. The camera 200 may acquire information about the flat parts by performing computer processing on a captured image. The processor 670 may perform a control operation to display the visual image in a flat region.

When the visual image is displayed on the body of a preceding vehicle, the visual image may be displayed on a flat part. Thereby, distortion of the displayed visual image may be prevented.

The processor 670 may receive distorted display information about a visual image via the interface unit 630. The camera 200 may acquire distorted display information about the visual image by performing computer processing on a captured image.

The processor 670 may correct the visual image based on the distorted display information.

For example, when a visual image is displayed on an uneven road surface, the processor 670 may receive distorted display information about the visual image. In this case, the processor 670 may change the display region of the visual image such that the visual image is displayed on a flat surface.

The processor 670 may perform a control operation such that a first width corresponding to a first point of the visual image is less than a second width corresponding to a second point of the visual image on a longitudinal line of the visual image when the visual image is displayed. Herein, the distance between the vehicle 100 and the second point may be shorter than the distance between the vehicle 100 and the first point.

As the width of the visual image is determined according to distance to the vehicle 100 when the visual image is displayed as described above, unnaturalness of display of the visual image felt by the driver who is looking forward in the driver's seat may be minimized.

The processor 670 may determine the size of the visual image based on the distance between the vehicle 100 and the display region for the visual image.

The processor 670 may adjust the length and width of the visual image based on the distance between the vehicle 100 and the display region for the visual image.

As the distance between the visual image and the vehicle 100 decreases, the processor 670 may gradually increase the length and width of the visual image. As the distance between the visual image and the vehicle 100 increases, the processor 670 may gradually increase the length and width of the visual image.

The processors 670 may adjust the change rate of the length and width of the visual image based on the distance between the vehicle 100 and the display region for the visual image.

As the distance between the vehicle and the display region for the visual image increases, the processor 670 may adjust the change rate such that the change rate of the width of the lower part of the visual image is greater than the change rate of the width of the upper part of the visual image.

Thereby, the visual image may appear to be displayed on the road. Thereby, unnaturalness of display of the visual image felt by the driver may be minimized.

The processor 670 may receive information, signals or data via the communication unit 610. The processor 670 may change the visual image further based on the information received via the communication unit 610.

For example, the processor 670 may receive information about another vehicle via the V2X communication module 616 or the optical communication module 618. Herein, the information about another vehicle may include at least one of location information, speed information, travel direction information and destination information about another vehicle. The processor 670 may change the visual image based on the information about another vehicle.

The processor 670 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The power supply 690 may supply power necessary for operations of the respective units of the lighting apparatus 600 according to control of the processor 670. In particular, the power supply 690 may be supplied with power from, for example, a battery in the vehicle 100.

FIG. 7 illustrates an operation of displaying a visual image using a DMD module according to an implementation.

Referring to FIG. 7, the light output unit 650 may include a light source unit 651, a light source drive unit 652, a light converter 712 and optical units 713 and 715. In addition, the beam pattern unit 660 may include a DMD module 700.

A light emitting device included in the light source unit 651 may convert electrical energy into light. For example, the light source unit 651 may include a light emitting diode (LED) or a laser diode as the light emitting device. When the laser diode is used as a light source, brightness greater than that of the LED may be realized. In the following description, it is assumed that a laser diode is used as the light source 651.

The light source drive unit 652 may provide the light source unit 651 with an electrical signal for driving the light source unit 651. The electrical signal provided by the light source drive unit 652 may be generated by control of the processor 670.

The light converter 712 may convert a laser beam emitted from the light source 651 into a predetermined color. For example, a laser beam emitted from the light source 651 may be converted into light in various ranges of wavelengths through the light converter 712. The rays of light in various ranges of wavelengths may be synthesized and converted into visible light of a predetermined color (e.g., white color).

The light converter 712 may contain at least one kind of fluorescent material. For example, the light converter 712 may contain phosphorus.

The optical unit 711 may include a first lens 713 and a second lens 715.

The first lens 713 may refract visible light which is incident thereon through the light converter 712 and provide the same to the DMD module 700. The first lens 713 may refract visible light emitted from the light converter 712 such that the visual light is transmitted to the DMD module 700. For example, the first lens 713 may be a collimating lens. The incident light may be collimated through the first lens.

The DMD module 700 may change the pattern of incident visible light. The DMD module 700 may display a visual image by changing the pattern of visible light. The DMD module 700 may change the displayed visual image by changing the pattern of visible light.

The DMD module 700 may include a plurality of micro mirrors M. For example, the DMD module 700 may include hundreds of thousands of micro mirrors M.

The DMD module 700 may include a mirror layer including a plurality of micro mirrors, a driver layer including a plurality of yokes and a plurality of hinges which are formed to correspond to the respective micro mirrors, a metal layer serving as the seating part for the yokes and supporting the hinges, and a semiconductor memory (e.g., CMOS SRAM).

The yokes and hinges included in the drive layer may adjust the position of each of the micro mirrors according to a signal received from the semiconductor memory. For example, the yokes and hinges may or may not incline each of the micro mirrors according to a signal provided from the semiconductor memory.

The semiconductor memory may provide a signal for adjusting the positions of the micro mirrors according to control of the processor 670.

The processor 670 may individually control the tilt angle of each of the micro mirrors, thereby adjusting the projection angle and/or reflectance of visible light in units of pixels. For example, the tilt angle of each of the micro mirrors may be changed thousands of times per second by a magnetic field. The projection angle of at least one part of visible light emitted from the DMD module 700 may be changed according to change in the tilt angles. Thereby, at least one part of the visible light emitted from the DMD module 700 may be blocked from being projected forward of the vehicle 700.

The DMD module 700 may cause only at least one part of the visible light emitted from the first lens 713 to be projected forward of the vehicle 100 after being transmitted through the second lens 715. According to an implementation, the second lens 715 may be omitted.

The processor 670 may implement visible light in various patterns by controlling the positions of a part of the micro mirrors M. Through control of the positions of the micro mirrors M, the processor 670 may display a visual image corresponding to the first information outside of the vehicle 100. The processor 670 may change the displayed visual image according to the second information through control of the positions of the micro mirrors M.

The DMD module 700 of FIG. 7 may output both visible light for displaying a visible image and visible light for securing a clear view.

The processor 670 may output the visible light for displaying a visual image and the visible light for securing a clear view at different times, using the DMD module 700. The DMD module 700 may output the visible light for display of the visual image and the visible light for securing a clear view together by outputting the visible light for display of the visual image and the visible light for securing a clear view alternately at times which are close enough to each other for human eyes not to recognize the difference between the times.

According to an implementation, one or more reflectors may be further provided on a path along which light generated from the light source 651 is output.

Figure 8:
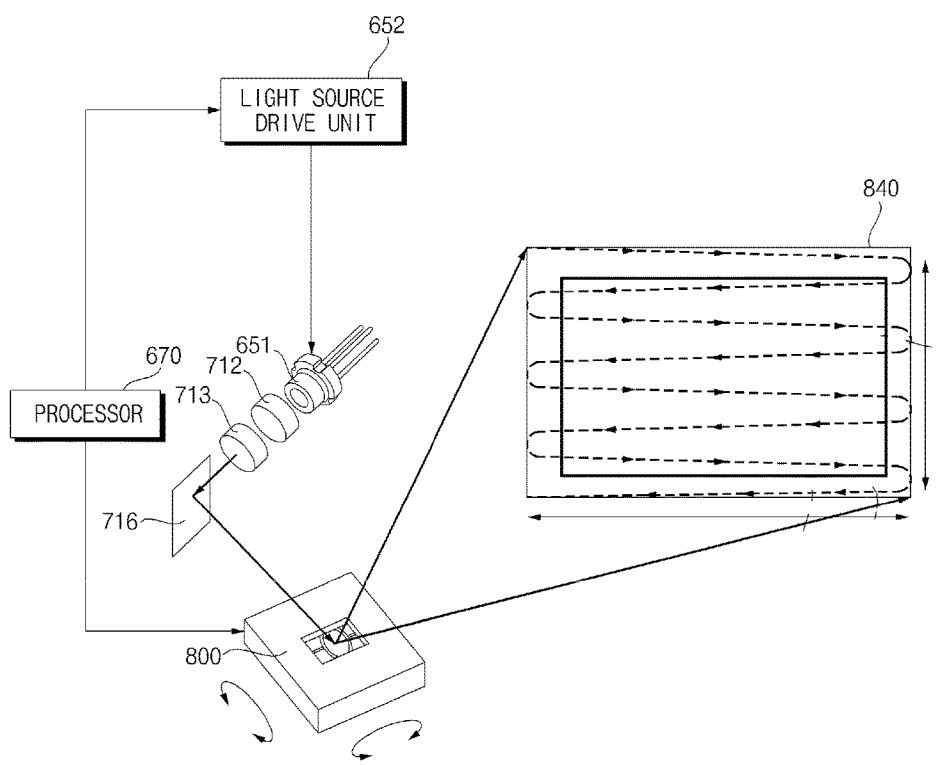
FIG. 8 is a diagram illustrating an example of operation of displaying a visual image using a MEMS scanner module according to an implementation.

FIG. 8 illustrates an operation of displaying a visual image using a MEMS scanner module according to an implementation.

Referring to FIG. 8, the light output unit 650 may include a light source unit 651, a light source drive unit 652, a light converter 712, an optical unit 713 and a reflector 716. In addition, the beam pattern unit 660 may include a MEMS scanner module 800.

A light emitting device included in the light source unit 651 may convert electrical energy into light. For example, the light source unit 651 may include a light emitting diode (LED) or a laser diode as the light emitting device. When the laser diode is used as a light source, brightness greater than that of the LED may be implemented. In the following description, it is assumed that a laser diode is used as the light source 651.

The light source drive unit 652 may provide the light source unit 651 with an electrical signal for driving the light source unit 651. The electrical signal provided by the light source drive unit 652 may be generated by control of the processor 670.

The light converter 712 may convert a laser beam emitted from the light source 651 into a predetermined color. For example, a laser beam emitted from the light source 651 may be converted into light in various ranges of wavelengths through the light converter 712. The rays of light in various ranges of wavelengths may be synthesized and converted into visible light of a predetermined color (e.g., white color).

The light converter 712 may contain at least one kind of fluorescent material. For example, the light converter 712 may contain phosphorus.

The optical unit 711 may include a first lens 713.

The first lens 713 may refract visible light incident through the light converter 712 and provide the same to the MEMS scanner module 800. The first lens 713 may refract visible light emitted from the light converter 712 such that the visual light is transmitted to the MEMS scanner module 800. For example, the first lens 713 may be a collimating lens. The incident light may be collimated through the first lens.

The reflector 716 may change the path of light. The reflector 716 may reflect light transmitted through the first lens 713 and transfer the same to the MEMS scanner module 800. According to an implementation, the reflector 716 may be omitted.

The MEMS scanner module 800 may include a scanner mirror, a structure to support the scanner mirror and a drive unit to drive the scanner mirror. For example, the drive unit may include a magnetic member. The drive unit may rotate the scanner mirror based on an electromagnetic wave generated by an applied current.

The drive unit may drive the scanner mirror according to control of the processor 670.

The scanner mirror may rotate according to control of the drive unit. As the scanner mirror rotates, the path of visible light incident on the scanner mirror may be persistently changed.

The MEMS scanner module 800 may generate a scanning path based on rotation of the scanner mirror. The scanning path may be a path along which the visible light is reflected and output.

For example, the MEMS scanner module 800 may receive visible light and sequentially and repeatedly perform external scanning in a first direction and a second direction.

As shown in the figure, the MEMS scanner module 800 may perform scanning of an external region 840 diagonally or horizontally from left to right and then from right to left. The MEMS scanner module 800 may repeat this scanning operation in the whole external region 840. Thereby, a projected image corresponding to the visible light may be displayed.

The processor 670 may implement visible light in various patterns by adjusting the scanning path through control of rotation of the scanner mirror. The processor 670 may display a visible image corresponding to the first information outside of the vehicle 100 through control of rotation of the scanner mirror. The processor 670 may change the displayed visual image according to the second information through control of rotation of the scanner mirror.

The MEMS scanner module 800 of FIG. 8 may output visible light for displaying a visible image and visible light for securing a clear view together.

The processor 670 may output the visible light for displaying a visual image and the visible light for securing a clear view at different times, using the MEMS scanner module 800. The MEMS scanner module 800 may output the visible light for display of the visual image and the visible light for securing a clear view together by outputting the visible light for display of the visual image and the visible light for securing a clear view alternately at times which are close enough to each other for human eyes not to recognize the difference between the times.

Figure 9:
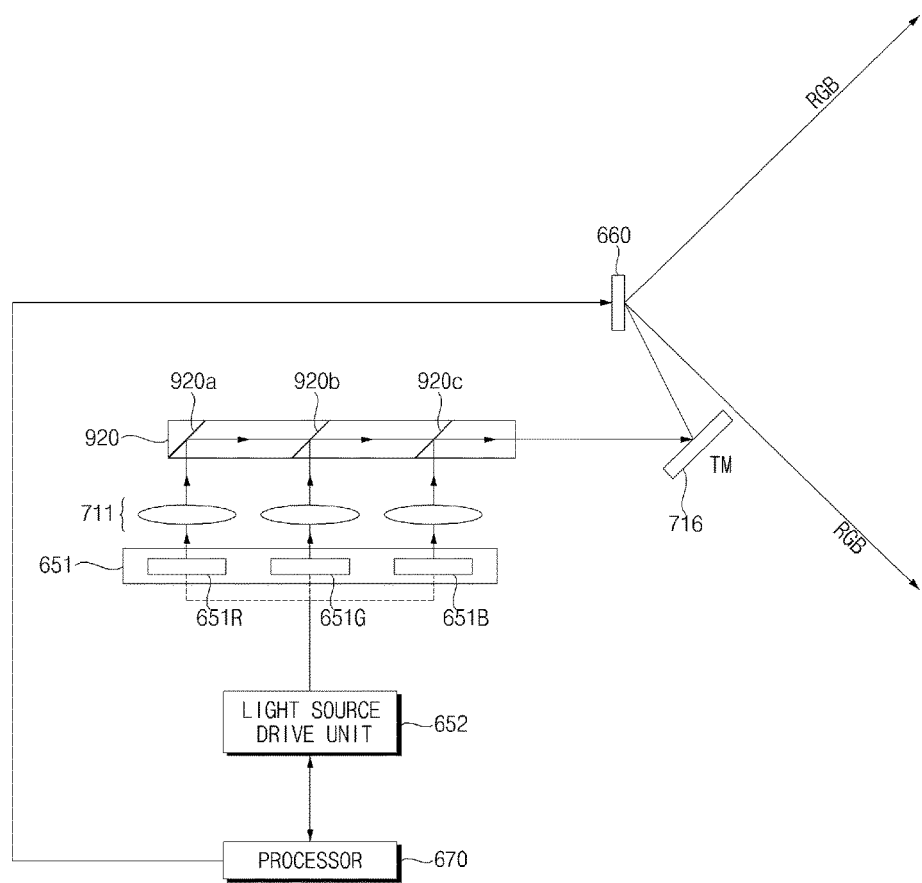
FIG. 9 is a diagram illustrating an example of a lighting apparatus for vehicles with a light output unit including a plurality of light sources according to an implementation.

FIG. 9 illustrates a lighting apparatus for vehicles with a light output unit including a plurality of light sources.

Referring to FIG. 9, the light output unit 650 may include a light source unit 651, a light source drive unit 652, an optical unit 713, a light synthesizer 920 and a reflector 716.

The light source unit 651 may include a plurality of light emitting devices 651R, 651G and 651B. For example, the light source unit 651 may include a red laser diode 651R, a green laser diode 651G and a blue laser diode 651B.

The light source drive unit 652 may provide the light source unit 651 with an electrical signal for driving the light source unit 651. The electrical signal provided by the light source drive unit 652 may be generated according to control of the processor 670.

The red light, green light and blue light output from the light source units 651R, 651G and 651B may be collimated through collimating lens in the optical unit 712.

The light synthesizer 920 synthesizes light output from the light source units 651R, 651G and 651B and outputs the same in one direction. To this end, the light synthesizer 920 may include three 2D MEMS mirrors 920a, 920b and 920c.

A first light synthesizer 920a, a second light synthesizer 920b, and a third light synthesizer 920c output red light from the red light source unit 651R, green light from the green light source unit 651G and blue light from the blue light source unit 651B toward the beam pattern unit 660, respectively.

The reflector 716 reflects the red light, green light and blue light transmitted through the light synthesizer 920 toward the beam pattern unit 660. The reflector 716 may reflect light of various wavelengths. To this end, the reflector 716 may be implemented as a total mirror (TM).

The beam pattern unit 660 may optionally include a digital micro mirror device (DMD) module 700 and a micro electromechanical system (MEMS) scanner module 800.

If the beam pattern unit 660 includes the DMD module 700, the processor 670 may display a visual image corresponding to the first information and change the displayed visual image according to the second information, as described above with reference to FIG. 7.

If the beam pattern unit 660 includes the MEMS scanner module 800, the processor 670 may display a visual image corresponding to the first information and change the displayed visual image according to the second information, as described with reference to FIG. 8.

Figure 10:
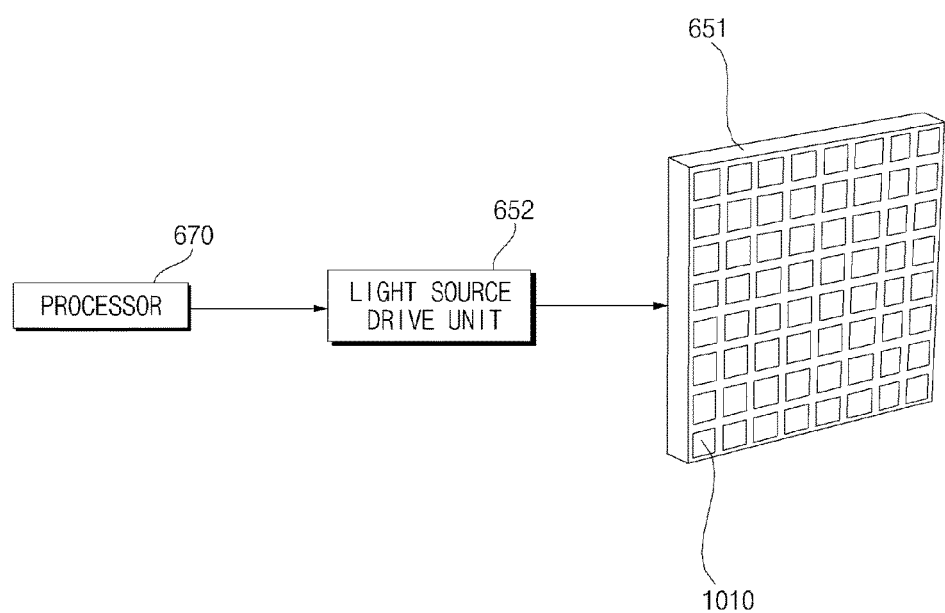
FIG. 10 is a diagram illustrating an example of a light source unit according to an implementation.

FIG. 10 illustrates a light source unit according to an implementation.

Referring to FIG. 10, the light source unit 651 may include a plurality of light emitting devices arranged in a predetermined form.

For example, the light source unit 651 may include a plurality of micro LEDs 1010 as the light emitting devices. Each of the micro LEDs 1010 may be individually turned on and off according to control of the processor 670. The color of light output from each of the micro LEDs 1010 may be individually adjusted according to control of the processor 670.

The processor 670 may output visible light for display of a visual image and visible light for securing a clear view together by driving the micro LEDs 1010 individually.

The processor 670 may group and control the micro LEDs 1010. For example, the processor 670 may control visible light for display of a visible image to be output through a first group of micro LEDs, and control visible light for securing a clear view to be output through a second group of micro LEDs.

Figure 11A:
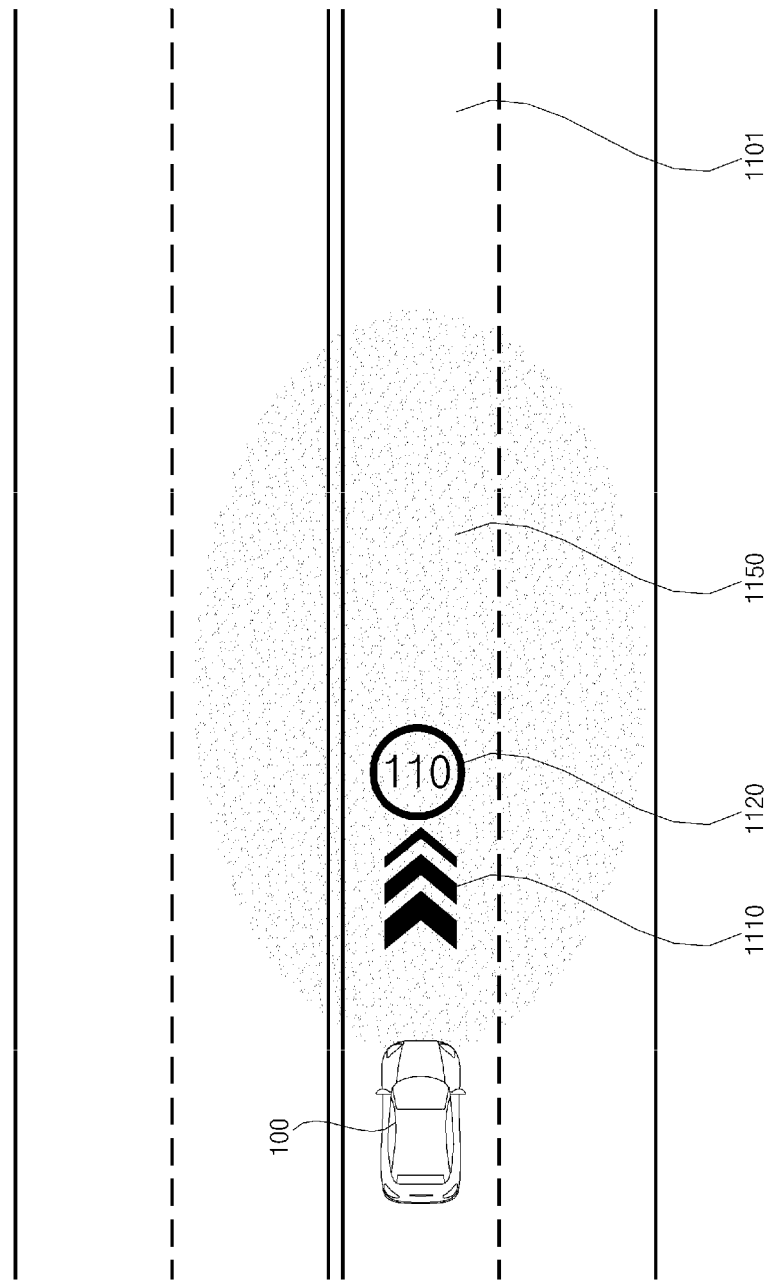
FIGS. 11A to 11C are diagrams illustrating examples of a visual image displayed on a road according to an implementation.
Figure 11B:
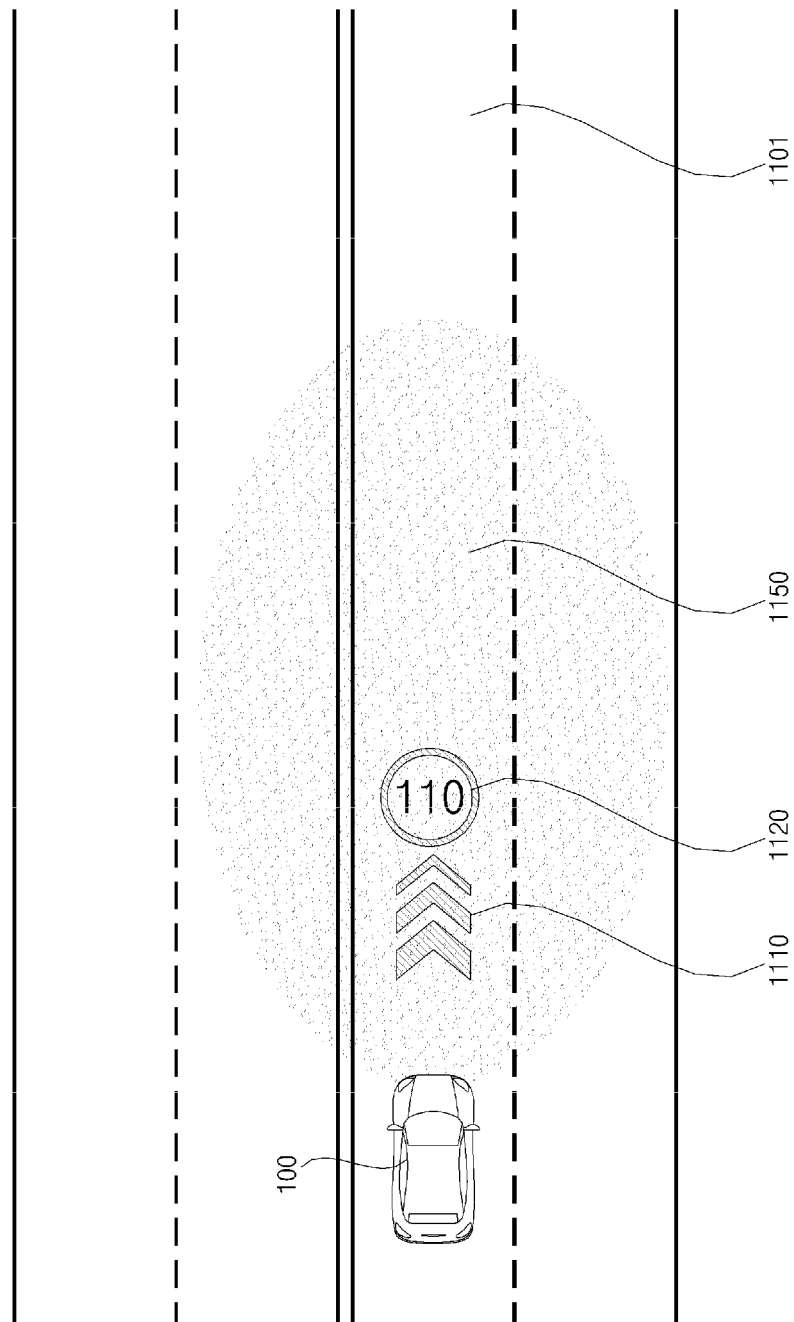
Figure 11C:
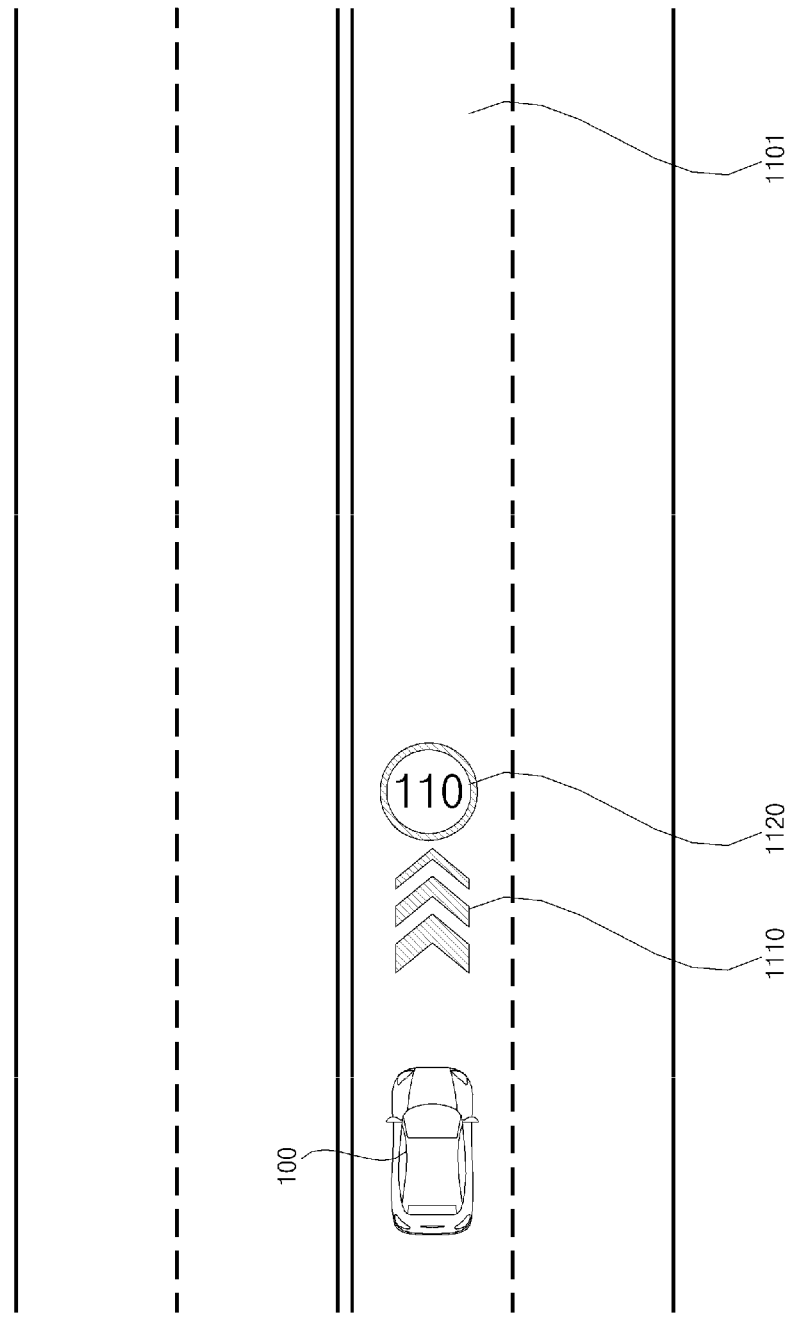

FIGS. 11A to 11C illustrate a visual image displayed on a road according to an implementation.

Referring to FIGS. 11A to 11C, the lighting apparatus 600 may display a visual image on the road. The lighting apparatus 600 may output light, thereby securing a clear view and displaying a visual image. To this end, the light output unit 650 and the beam pattern unit 660 described above with reference to FIGS. 7 to 10 may be used.

The visual image may be an image corresponding to the first information. The first information may be information sensed by the sensing unit 135. Specifically, the first information may be state information about the vehicle 100 sensed by the internal sensing unit 125 or information about the situation outside the vehicle 100 sensed by the external sensing unit 126.

The visual image may be implemented as a design or text.

The lighting apparatus 600 may change the displayed visual image based on second information. The second information may be information sensed by the sensing unit 135. Specifically, the second information may be information about the situation outside the vehicle 100 sensed by the external sensing unit 126.

The lighting apparatus 600 may change the display region for the visual image. The lighting apparatus 600 may change the shape, color, size or brightness of the visual image.

The processor 670 may output light 1150 for securing a clear view, based on light generated by the light output unit 650.

The processor 670 may output light for display of a visual image 1110 and 1120, based on light generated by the light output unit 650.

As illustrated in FIG. 11A, the processor 670 may display a visual image by adjusting the intensity of light 1150 and the light 1110 and 1120 differently.

For example, the processor 670 may adjust light such that the light 1110 and 1120 for display of a visual image is dimmer than the light 1150 for securing a clear view. According to an implementation, the processor 670 may output only the light 1150, and not output the light 1110 and 1120 in displaying a visual image.

The processor 670 may make the color of light 1150 different from the color of the light 1110 and 1120 in displaying the visual image.

For example, the processor 670 may output the light 1150 in a first color and the light 1110 and 1120 in a second color.

As shown in FIG. 11C, the processor 670 may not output the light 1150 for securing a clear view and may output only the light 1110 and 1120 for display a visual image.

Figure 12:
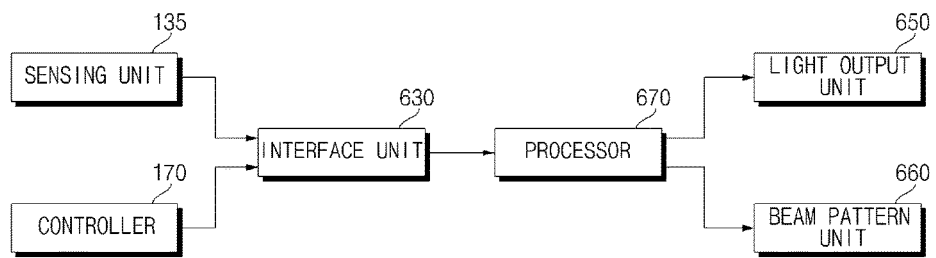
FIG. 12 is a diagram illustrating an example of acquiring first information and second information according to an implementation.

FIG. 12 is a diagram illustrating the procedure of acquiring first information and second information according to an implementation Referring to FIG. 12, the processor 670 may receive first information from the sensing unit 125 or controller 170 of the vehicle 100 via the interface unit 630.

For example, the first information may include at least one of travel speed information, information about an object positioned around the vehicle, navigation information, turn signal information and OBD information.

The object information may be information about another vehicle, a pedestrian or a traffic signal. The object information may include information indicating presence or absence of an object, location information about the object, information about the distance to the object and relative speed information about the object.

The navigation information may include designated destination information, route information, map information, expected destination arrival time information, expected remaining time information, and current location information about the vehicle.

Based on the travel speed information, the processor 670 may display the visual image by adjusting the display region for the visual image or the color of the visual image.

When the vehicle 100 travels at a high speed, the processor 670 may perform a control operation such that the visual image is displayed at a farther distance than when the vehicle travels at a low speed. Since the driver gazes farther ahead when the vehicle travels at a high speed than when the vehicle travels at a low speed, this method may more securely deliver information to the driver according to the visual image. If the travel speed of the vehicle 100 is greater than or equal to a reference speed, the processor 670 may control the visual image to be displayed in a first color.

If the travel speed of the vehicle 100 is higher than or equal to a first reference speed, the processor 670 may perform a control operation to display the visual image in a first color. Thereby, the driver may be alerted to the speed.

The processor 670 may receive second information from the sensing unit 125 or the controller 170 of the vehicle 100 via the interface unit 630.

For example, the second information may include at least one of road information, external light information, and information about another vehicle positioned around the vehicle.

The road information may include information about the type of the road (e.g., highway, city street, a driving road) along which the vehicle 100 is traveling, section information about the road (e.g., a straight section, an inclined section, a curved section), and speed limit information about the road.

The external light information may be sensed by the camera 200 or illumination sensor. The camera 200 may acquire the external light information by analyzing brightness of an acquired image. External light may be generated from the sun, streetlight or the lighting apparatus of another vehicle.

The information about another vehicle may include information indicating presence or absence of another vehicle, location information about the other vehicle, information about the distance to the other vehicle and relative speed information about the other vehicle. The other vehicle may be a vehicle traveling positioned ahead of, behind or to one side of the vehicle 100.

Figure 13A:
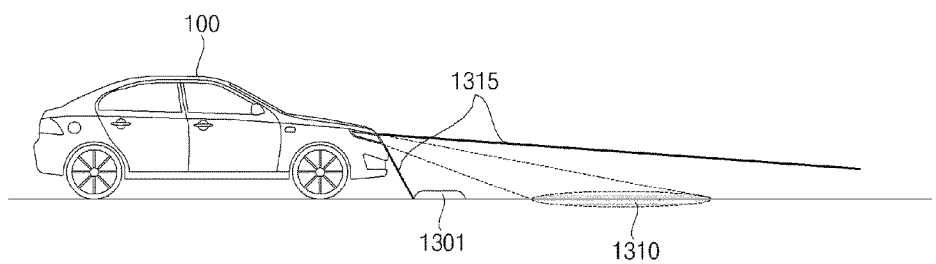
FIGS. 13A to 13C are diagrams illustrating examples of operations of changing a display region for a visual image based on vehicle position information according to an implementation.
Figure 13B:
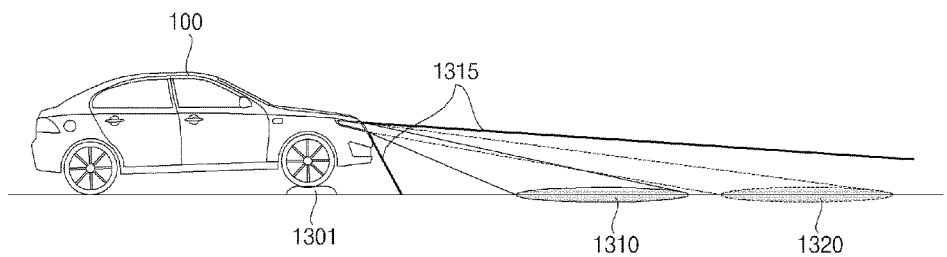
Figure 13C:
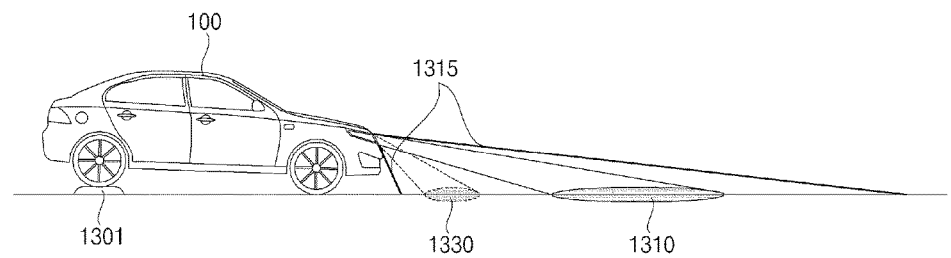

FIGS. 13A to 13C illustrate an operation of changing a display region for a visual image based on vehicle position information according to an implementation.

Referring to FIGS. 13A to 13C, the processor 670 may receive position information about the vehicle 100 from the sensing unit 135. The processor 670 may change the display region for a visual image based on the position information about the vehicle.

As illustrated in FIG. 13A, the vehicle may travel on an uneven road surface. An object affecting the position of the vehicle 100 may be located on the road surface. The object affecting the position of the vehicle 100 may include a speed bump 1301, a porthole, a stone, a damaged portion of a road, and a fallen object.

When the vehicle 100 moves over the object 1301, the vehicle 100 may fail to maintain a constant position thereof, and thus the pitch of the vehicle 100 may change.

The light output from the lighting apparatus of the vehicle 100 may vary according to change of the position of the vehicle 100. On the other hand, the driver may drive the vehicle 100, while gazing at a certain region irrespective of vertical movement of the vehicle 100. In this case, when the visual image changes according to change in position of the vehicle 100 on the road, the gaze of the driver may change, following the visual image. Thereby, driving may be interrupted.

The processor 670 may change the display region for a visual image within a range 1315 of light for securing a clear view, based on change in the pitch of the vehicle 100.

In addition, the processor 670 may change the range 1315 of light based on change in yaw or roll of the vehicle 100.

As illustrated in FIG. 13B, if the front end of the vehicle 100 rises, the processor 670 may perform a control operation according to the degree of rise such that the distance between the vehicle 100 and the visual image 1310 is shorter than the distance between the vehicle 100 and the visual image 1320 displayed when the front end of the vehicle 100 is not raised, within the range 1315 of light output to secure a clear view.

As illustrated in FIG. 13C, when the rear end of the vehicle 100 rises, the processor 670 may perform a control operation according to the degree of rise such that the distance between the vehicle 100 and the visual image 1310 is longer than the distance between the vehicle 100 and the visual image 1330 displayed when the rear end of the vehicle 100 is not raised, within the range 1315 of light output to secure a clear view.

Figure 14A:
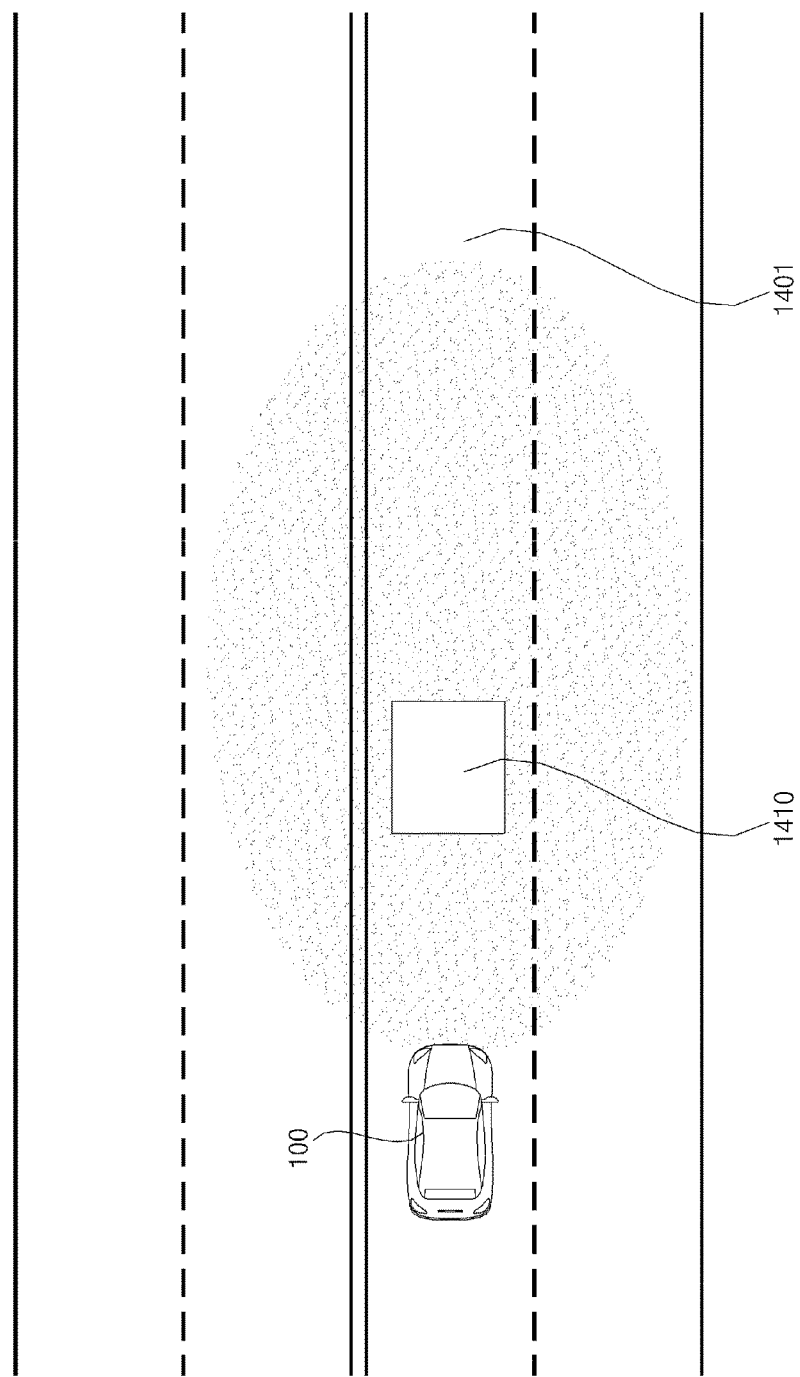
FIGS. 14A and 14B are diagrams illustrating examples of a display region for a visual image according to an implementation.
Figure 14B:
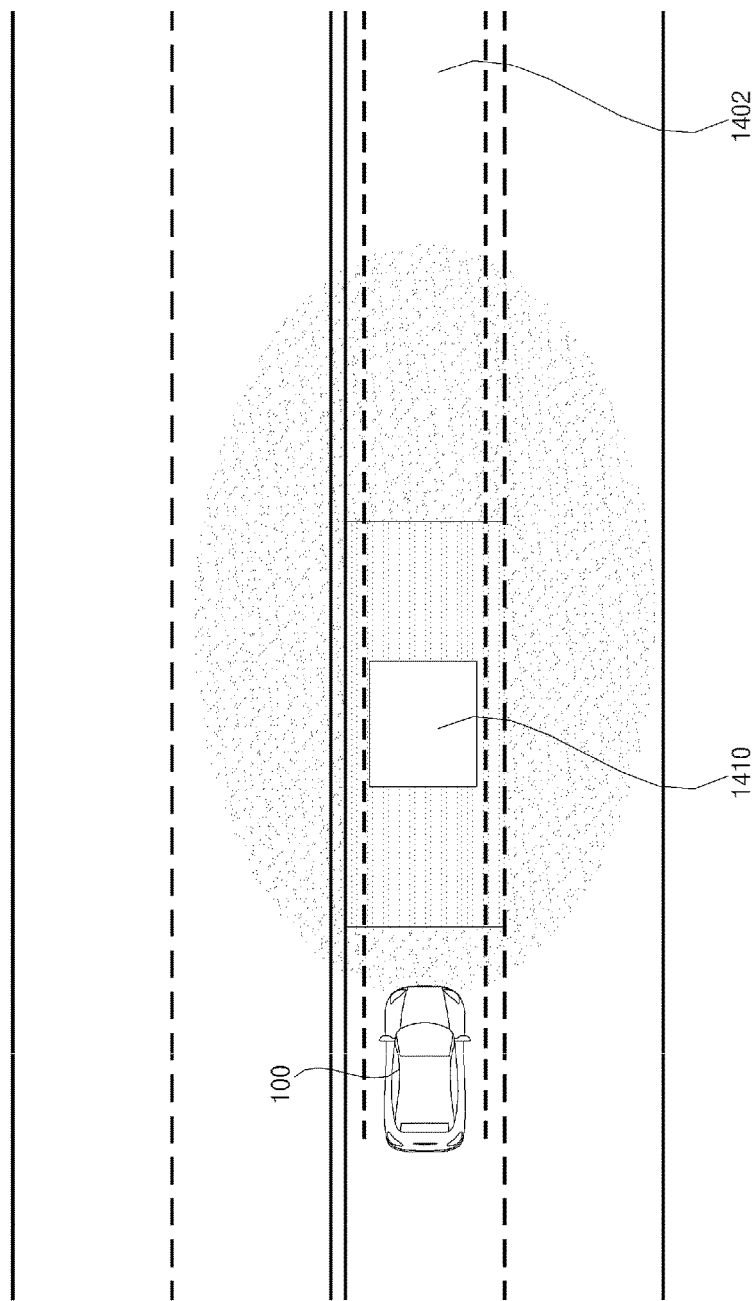

FIGS. 14A and 14B illustrate a display region for a visual image according to an implementation.

Referring to FIG. 14A, the processor 670 may control a visual image 1410 to be displayed within a drive lane 1401 of the vehicle 100.

The visual image 1410 is intended to transfer information to the driver of the vehicle 100. If the visual image 1410 is displayed outside the drive lane 1401 of the vehicle 100, the display may interrupt travel of another vehicle around the vehicle 100. Through this control, information may be directed to the driver without interrupting travel of other vehicles.

Referring to FIG. 14B, the processor 670 may control the visual image 1410 to be displayed within a range 1402 corresponding to the width of the vehicle 100.

The range 1402 corresponding to the width of the vehicle 100 may refer to an area between a pair of virtual lines extending forward from the left and right sides of the vehicle 100.

As the visual image is controlled to be displayed only within the range corresponding to the width of the vehicle, information may be intensively directed to the driver of the vehicle 100.

Figure 17:
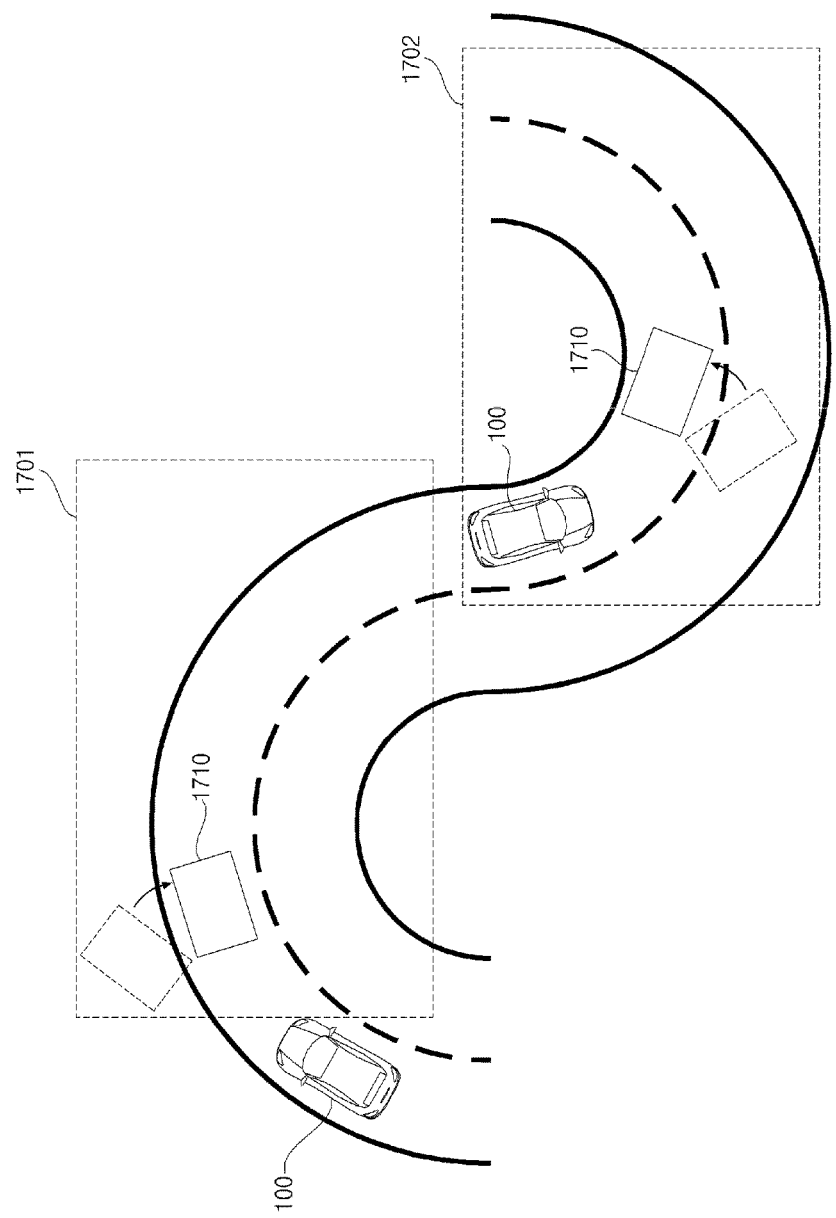

FIGS. 15 to 17 illustrate a control operation performed to change a display region for a visual image according to an implementation.

Referring to FIG. 15, the processor 670 may perform a control operation based on the second information to change the display region for a visual image 1510 within a range 1501 of light for securing a clear view. In this case, the processor 670 may control the visual image to gradually change according to the second information.

As illustrated in FIG. 16, if external light 1605 is emitted onto the display region for the visual image 1510, the processor 670 may control the visual image 1510 to be displayed in a region outside the region onto which external light 1605 is emitted, within the range of securing a clear view.

Alternatively, the processor 670 may control the visual image 1510 to be displayed in a region onto which the smallest amount of external light is emitted, within the range of light for securing a clear view.

Alternatively, the processor 670 may control the visual image to be displayed in a region in which brightness of external light is less than or equal to a reference value, within the range of light for securing a clear view.

Thereby, even if the external light 1605 is emitted, accuracy of information delivery may be enhanced by changing the display region for the visual image 1510 such that the driver accurately recognizes the visual image 1510.

As illustrated in FIG. 17, before the vehicle 100 enters a curved section or while the vehicle 100 travels along a curved section, the processor 670 may receive information about the curved section via the interface unit 630. The interface unit 630 may control the display region for the visual image 1710 to be changed according to the information about the curved section.

Specifically, the processor 670 may perform a control operation to change the display region for the visual image along a curve.

For example, when the vehicle 100 enters a curved section 1701 curved rightward with respect to the travel direction or travels along the curved section 1701, the processor 670 may control the display region for a visual image 1710 to be changed rightward. In this case, the processor 670 may adjust the degree of change according to the curvature of the curve.

For example, when the vehicle 100 enters a curved section 1702 curved leftward with respect to the travel direction or travels along the curved section 1702, the processor 670 may control the display region for the visual image 1710 to be changed leftward. In this case, the processor 670 may adjust the degree of change according to the curvature of the curve.

Thereby, when the vehicle travels along a curved section, the visual image may be displayed in a region at which the driver looks. Thereby, the driver may be allowed to accurately recognize the visual image.

Figure 18:
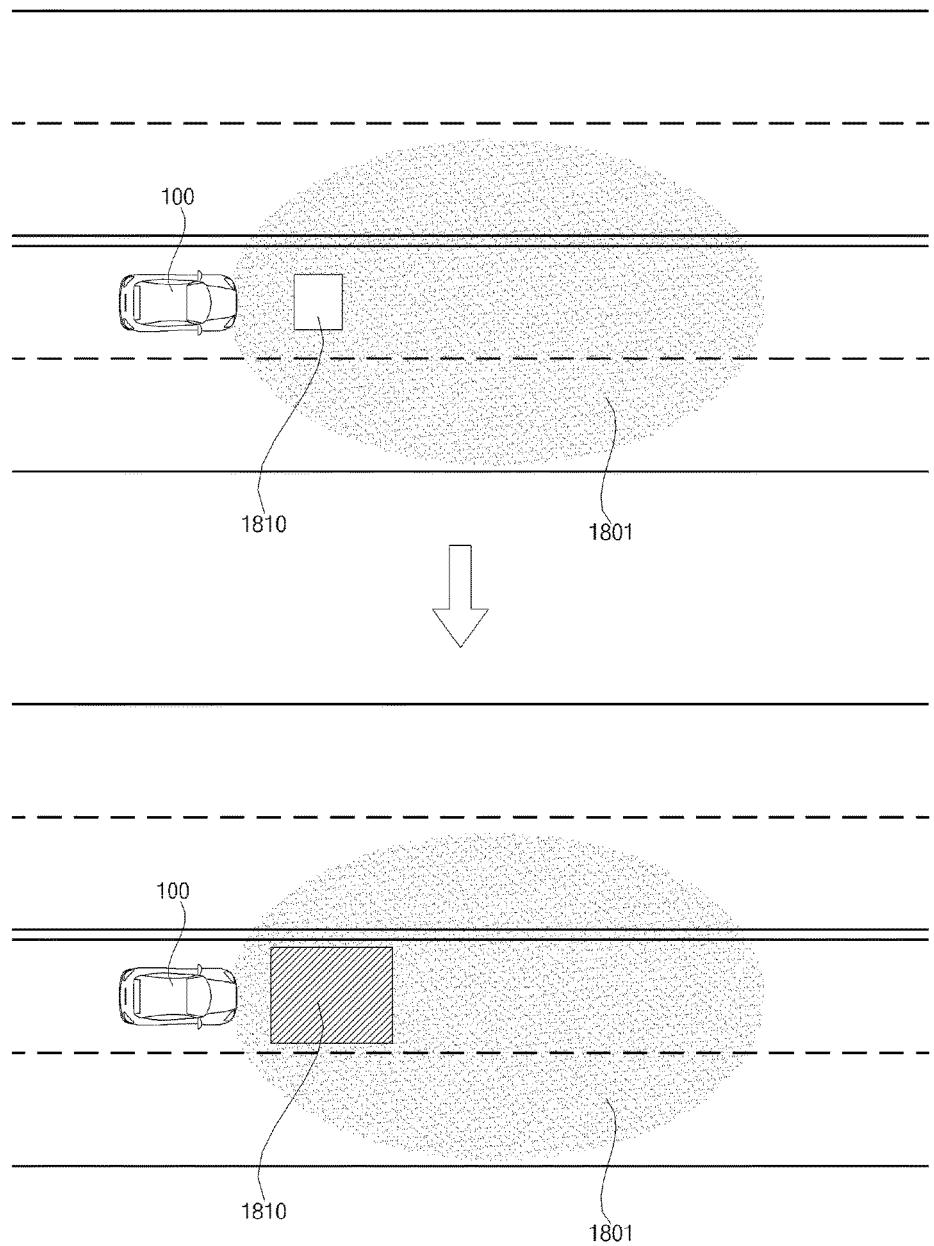
FIGS. 18 and 19 are diagrams illustrating examples of operations performed to change the shape, color, or brightness of a visual image according to some implementations.
Figure 19:
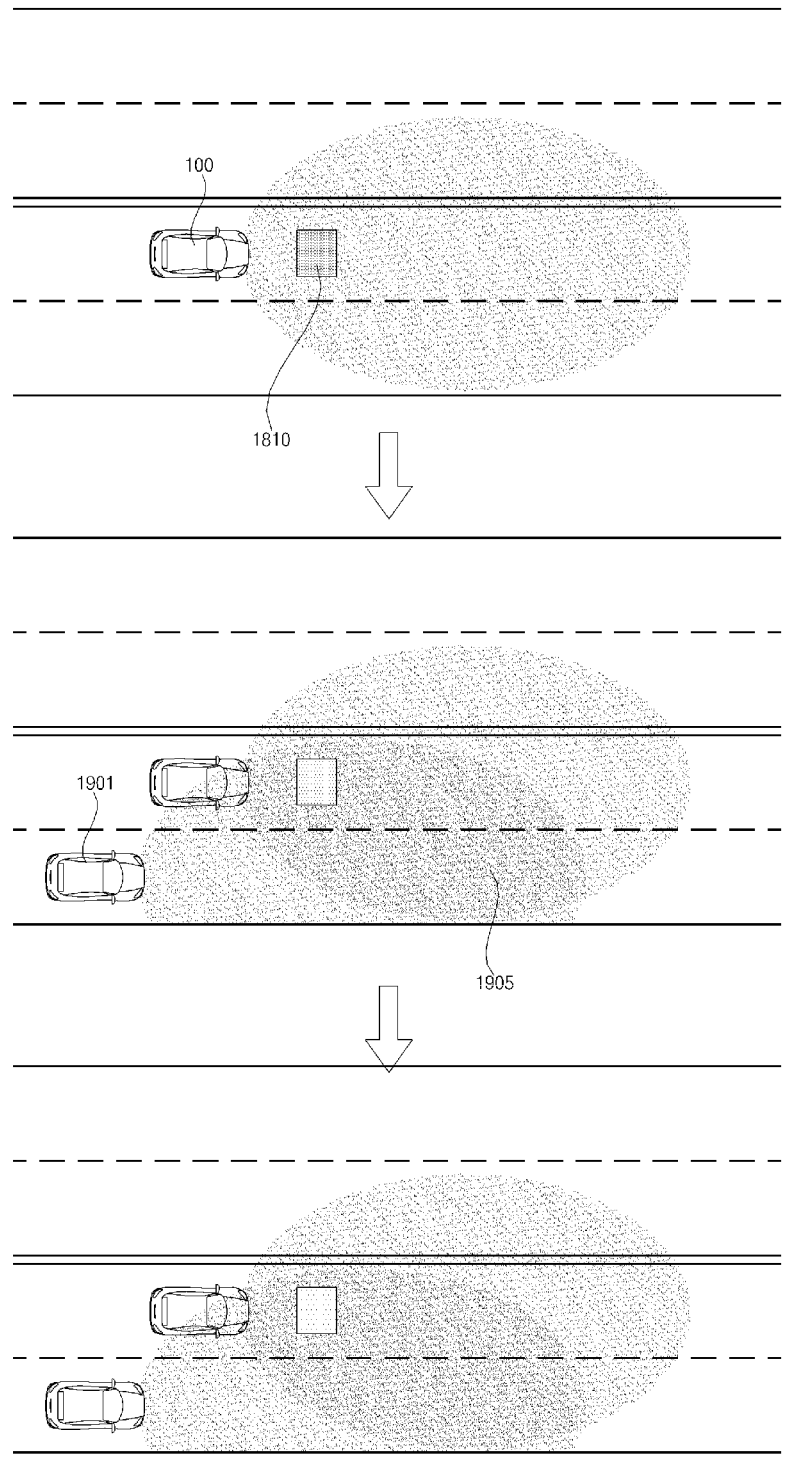

FIGS. 18 and 19 illustrate a control operation performed to change the shape, color or brightness of a visual image according to an implementation.

Referring to FIG. 18, the processor 670 may perform a control operation based on the second information to change the shape, color, size or brightness of a visual image 1810 within a range 1801 of light for securing a clear view. In this case, the processor 670 may control the visual image 1810 to gradually change according to the second information.

As illustrated in FIG. 19, if external light is emitted onto the display region for the visual image 1810, the processor 670 may control the visual image 1810 to be displayed with greater brightness than the external light. Alternatively, the processor 670 may control the visual image 1810 to be displayed in a color different from that of the external light.

For example, if a vehicle 1901 which is in a lane next to the drive lane of the vehicle 100 and is behind the vehicle 100 approaches the vehicle 100, external light 1905 from the lighting apparatus of the vehicle 1901 may be emitted onto the display region for the visual image 1810. In this case, the processor 670 may control the visual image 1810 to be displayed with greater brightness than the external light or to be displayed in a color different from that of the external light.

Thereby, the driver may be allowed to accurately recognize the visual image even if the external light 1905 is introduced into the display region for the visual image 1810.

The processor 670 may receive information about another vehicle 1905 travelling near the vehicle 100 as the second information. The processor 670 may receive information indicating whether the vehicle 1905 is in a lane next to the drive lane of the vehicle 100 and approaches the vehicle 100 from behind.

If the vehicle 1905 is in a lane next to the drive lane of the vehicle 100 and approaches the vehicle 100 from behind, the processor 670 may perform a control operation to increase brightness of the visual image 1810.

The processor 670 may receive light intensity information about light output from the lighting apparatus of another vehicle. The camera 200 may acquire light intensity information by performing computer processing on a captured image (e.g., by analyzing brightness of the captured image). Alternatively, the light intensity information may be acquired through an illumination sensor included in the internal sensing unit 125.

The processor 670 may control brightness of the visual image according to the light intensity information. For example, the processor 670 may perform a control operation to increase brightness of the visual image in proportion to the light intensity.

As change of the visual image 1810 is controlled according to approach of the vehicle 1901 which is behind the vehicle 100, the driver may be allowed to accurately recognize the visual image 1810 and thus delivery of the information may be insured. In addition, the driver may be allowed to recognize approach of the vehicle 1901 from behind the vehicle 100 through change of the visual image 1810.

Figure 20:
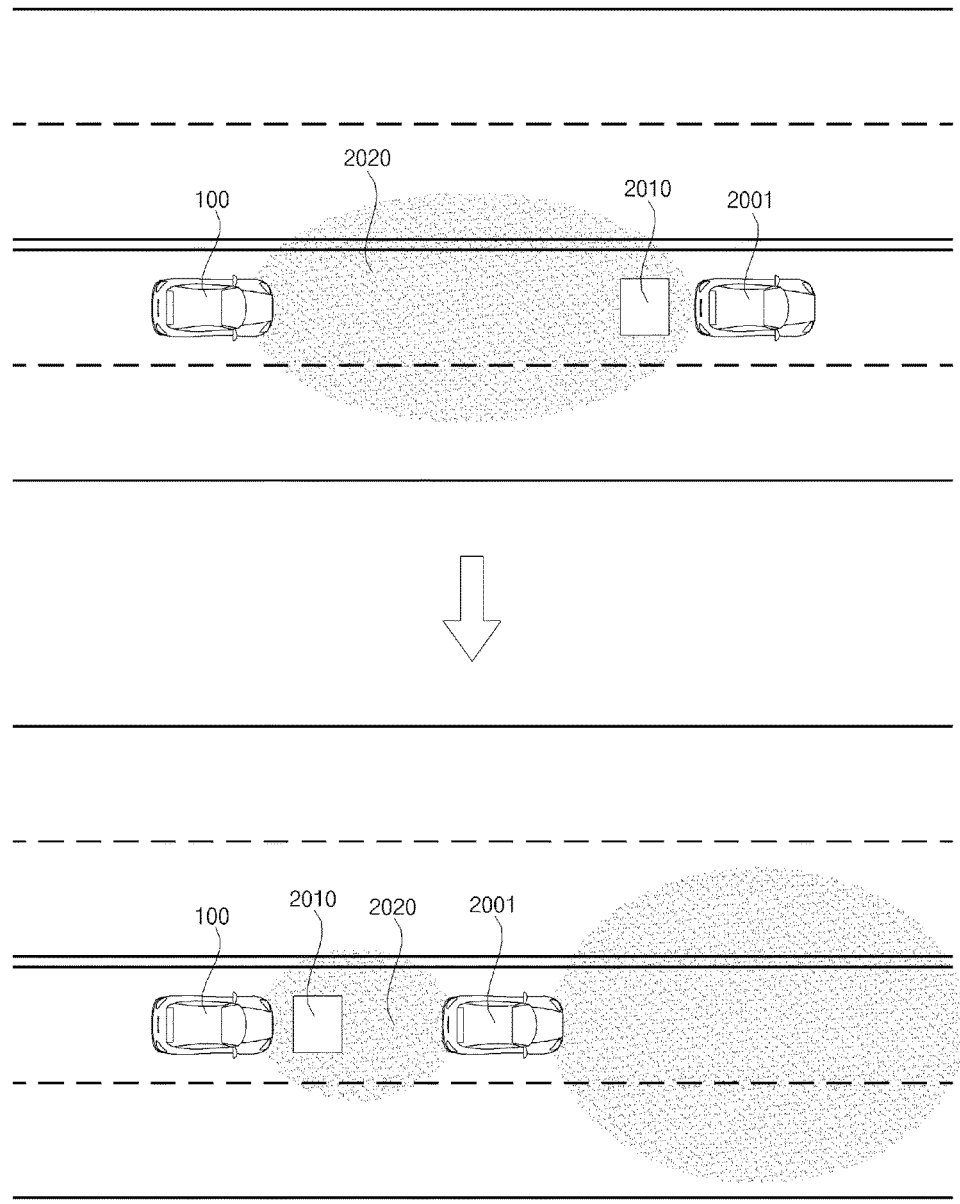
FIG. 20 is a diagram illustrating an example of changing a visual image corresponding to distance information about a preceding vehicle according to an implementation.

FIG. 20 illustrates an operation of changing a visual image corresponding to distance information about a preceding vehicle according to an implementation.

Referring to FIG. 20, the processor 670 may receive distance information about a preceding vehicle 2001 via the interface unit 630. The distance information may be acquired via the external sensing unit 126. The vehicle 2001 may be a vehicle which travels ahead of the vehicle 100 in the drive lane of the vehicle 100.

The processor 670 may perform a control operation based on the distance information to change the display region for the visual image 2010 within a range 2020 of field of light for securing a clear view.

As the distance to the preceding vehicle 2001 decreases, the space in which the visual image 2010 can be displayed may be narrowed. To correctly display the visual image 2010, as the distance to the preceding vehicle 2001 decreases, the processor 670 may perform a control operation such that the display region for the visual image 2010 gradually approaches the vehicle 100.

Figure 21:
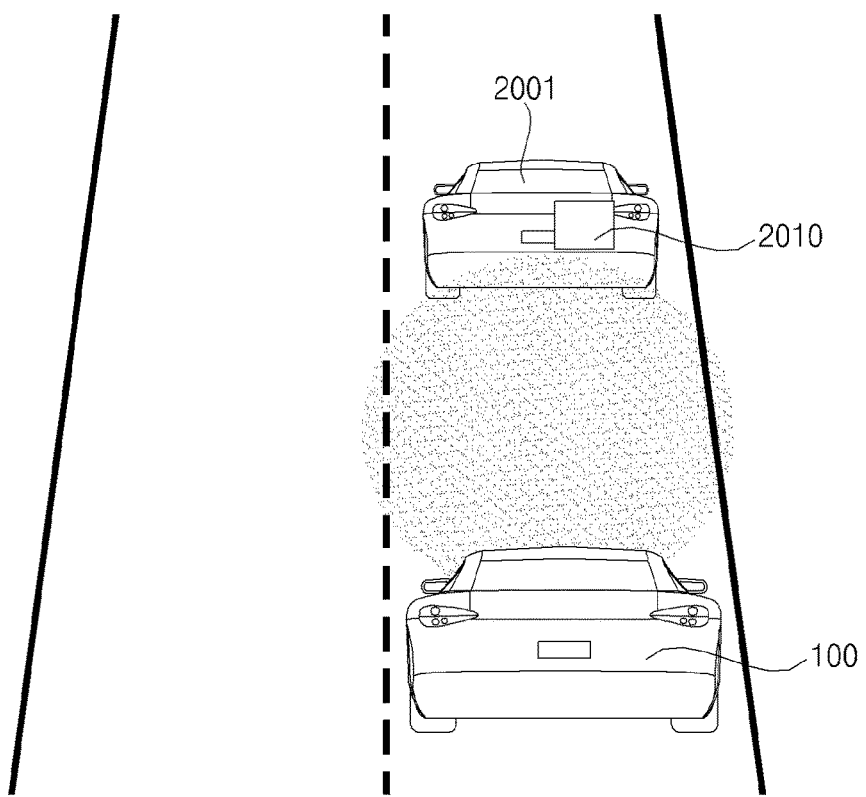
FIGS. 21 and 22 are diagrams illustrating examples of displaying visual image on the body of a preceding vehicle according to some implementations.
Figure 22:
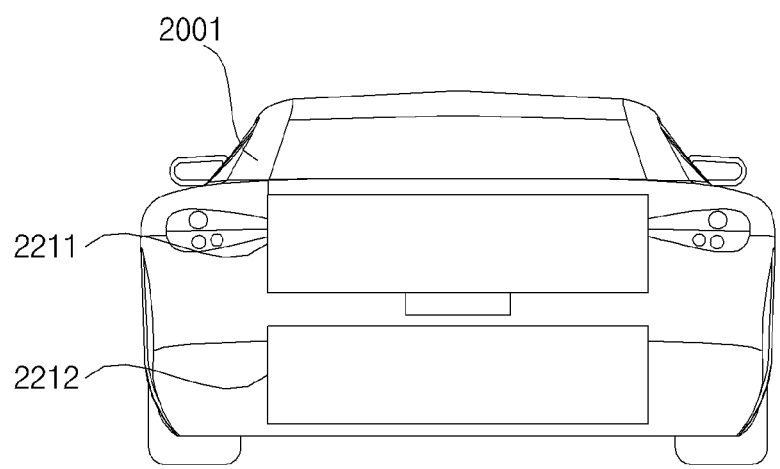

FIGS. 21 and 22 illustrate an operation of displaying visual image on the body of a preceding vehicle according to an implementation.

Referring to FIG. 21, if the distance between the vehicle 100 and the preceding vehicle 2001 is within a first reference distance, the processor 670 may control the visual images 2010 to be displayed on the body of the vehicle 2001. The body of the vehicle 2001 may be at least one of the trunk lid, rear bumper, rear window and tailgate of the vehicle 2001.

The first reference distance may be determined based on whether the visual image 2010 comes into sight of the driver when the visual image 2010 is displayed on a road.

When the visual image 2010 is displayed on the body of the vehicle 2001, the processor 670 may adjust the size or color of the visual image 2010.

For example, the processor 670 may reduce the size of the visual image 2010 such the entirety of the visual image 2010 is displayed on the body of the vehicle 2001. In this case, the size of the visual image 2010 may be determined by the distance between the vehicle 100 and the vehicle 2001.

For example, the processor 670 may adjust the color of the visual image 2010 such that the visual image 2010 is displayed in a color different from that of the body of the vehicle 2001. The color information about the body of the vehicle 2001 may be acquired by the camera 200 and received via the interface unit 630.

The processor 670 may receive image-processed object information from the camera 200 via the interface unit 630.

When the lighting apparatus 600 displays a visual image outside of the vehicle 100, the camera 200 may capture the visual image. The camera 200 may check whether the displayed visual image is distorted, by performing computer processing on the acquired image. For example, the camera 200 may check whether the displayed visual image is distorted, by comparing the visual image data provided from the lighting apparatus 600 with the visual image detected in the acquired image.

The processor 670 may receive distorted display information about the visual image through the interface unit 630.

If the visual image is distorted by the body of the vehicle 2001 when it is displayed, the processor 670 may adjust the display position of the visual image on the body of the vehicle 2001. Alternatively, the processor 670 may adjust the size of the visual image displayed on the body of the vehicle 2001. Alternatively, the processor 670 may correct the visual image and then display the same.

Referring to FIG. 22, the camera 200 may capture an image of the front view of the vehicle and detect a preceding vehicle 2001 in the image. The camera 200 may detect flat parts 2211 and 2212 of the body of the vehicle 2001 through, for example, an edge detector algorithm.

The processor 670 may receive information about the flat parts of the vehicle 2001 via the interface unit 630. The processor 670 may control the visual image to be displayed on the flat parts 2211 and 2212.

When the visual image is displayed on the body of the preceding vehicle 2001, the processor 670 may control the visual image to be displayed on the flat parts 2211 and 2212.

By displaying the visual image on the flat parts of the body of the preceding vehicle 2001, the visual image may be prevented from being distorted when it is displayed.

Figure 23:
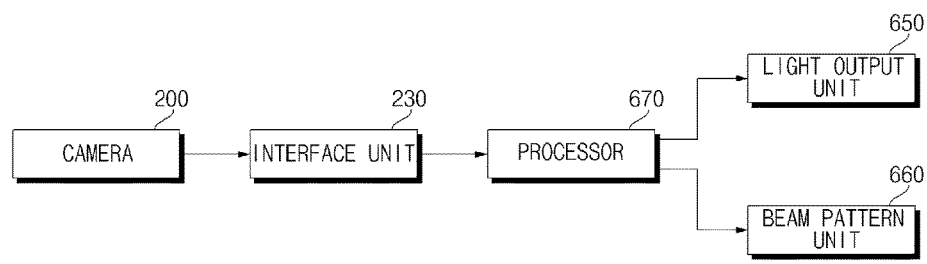
FIG. 23 is a diagram illustrating an example of operations of correcting distortion of a displayed visual image according to an implementation.

FIG. 23 is a diagram illustrating an operation of correcting distortion of a displayed visual image according to an implementation.

Referring to FIG. 23, the camera 200 may acquire an image of the surroundings of the vehicle. The camera 200 may perform computer processing on the acquired image. The camera 200 may detect, in the acquired image, a visual image displayed through the lighting apparatus 600.

The camera 200 may determine whether the visual image is distorted when it is displayed. For example, the camera 200 may check whether the displayed visual image is distorted, by comparing the visual image data provided from the lighting apparatus 600 with the visual image detected in the acquired image.

The processor 670 may receive distorted display information about the visual image via the interface unit 630.

Based on the distorted display information about the visual image, the processor 670 may control the light output unit 650 or the beam pattern unit 660 to correct and display the visual image.

Specifically, the processor 670 may control the display region for the visual image to be changed. Alternatively, the processor 670 may control the shape or size of the visual image to be changed.

Figure 24:
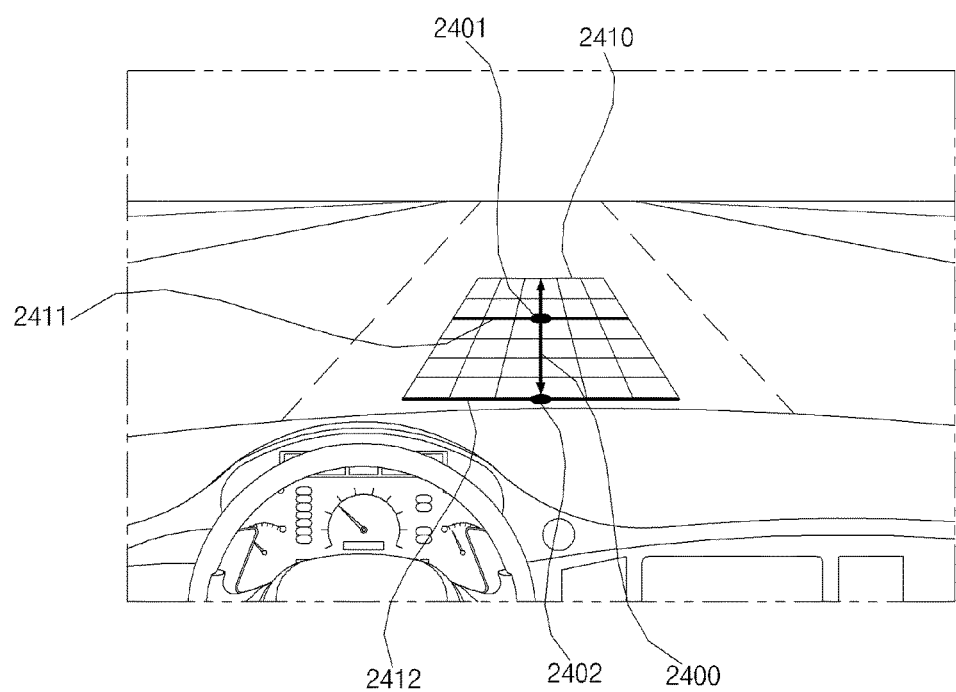
FIGS. 24 and 25 are diagrams illustrating examples of operations of displaying a visual image according to some implementations.
Figure 25:
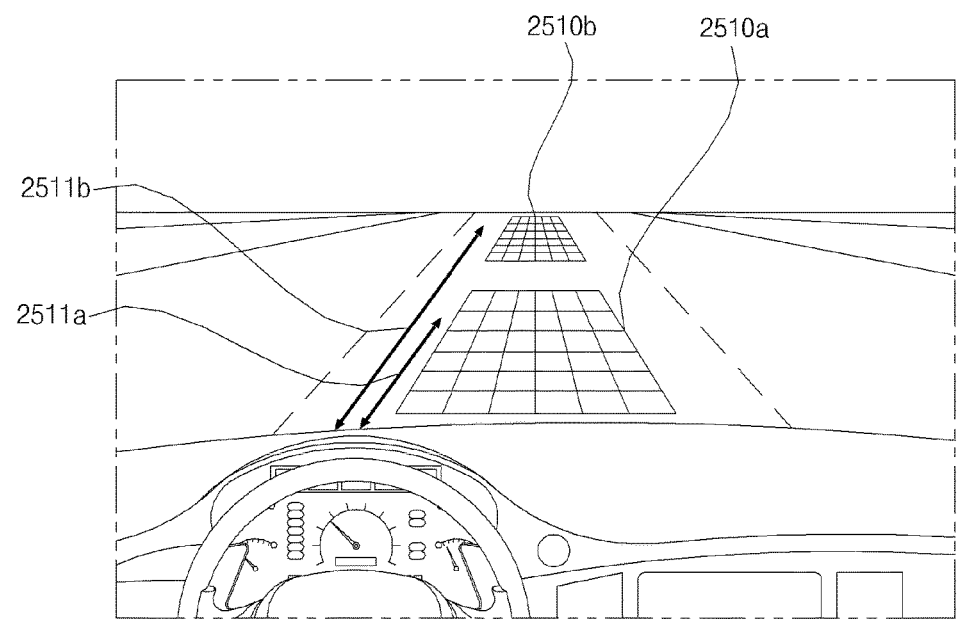

FIGS. 24 and 25 illustrate an operation of displaying a visual image according to an implementation.

Referring to FIG. 24, the processor 670 may control display of the visual image to give perspective to the visual image.

The processor 670 may perform a control operation such that a first width 2411 corresponding to a first point 2401 of a visual image 2410 is less than a second width 2412 corresponding to a second point 2402 of the visual image 2410 on a longitudinal line 2400 of the visual image 2410 when the visual image 2410 is displayed.

The distance between the vehicle 100 and the second point 2402 may be shorter than the distance between the vehicle 100 and the first point 2401.

The second point 2402 may be closer to the vehicle 100 than the first point 2401.

The longitudinal line 2400 of the visual image 2410 may be aligned with the overall-length direction.

Referring to FIG. 25, the processor 670 may determine the size of the visual image based on the distance between the vehicle 100 and the display region for the visual image. Specifically, the processor 670 may adjust the length and width of a visual image 2510a, 2510b based on the distance 2511a, 2511b between the vehicle 100 and the display region for the visual image 2510a, 2510b.

As illustrated in FIG. 25, when the display region for the visual image 2510b is at a second distance 2511b from the vehicle 100, and the display region for the visual image 2510a is at a first distance 2511a from the vehicle 100, the processor 670 may perform a control operation such that the length and width of the visual image 2510b are less than the length and width of the visual image 2510a. Herein, the second distance 2511b is lower than the first distance 2511a.

Figure 26:
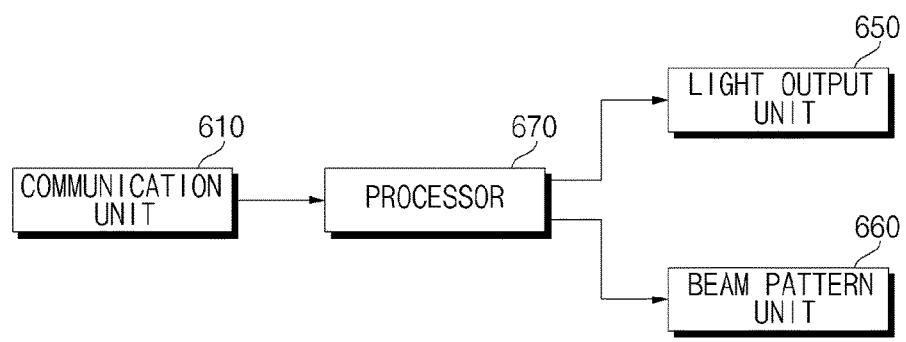
FIG. 26 is a diagram illustrating an example of operations of changing a visual image based on information received via a communication unit according to an implementation.

FIG. 26 is a diagram illustrating an operation of changing a visual image based on information received via a communication unit according to an implementation.

The processor 670 may receive information, signals or data via the communication unit 610. The processor 670 may change the visual image further based on the information received via the communication unit 610.

The processor 670 may receive information about another vehicle via the V2X communication module 616 or the optical communication module 618. For example, the information about another vehicle may include at least one of location information, speed information, travel direction information and destination information about another vehicle. The processor 670 may change the visual image based on the information about another vehicle.

For example, the processor 670 may receive location information, speed information and travel direction information about another vehicle via the communication unit 610. Herein, another vehicle may be a vehicle approaching the vehicle 100 from a lane next to the drive lane of the vehicle 100. The processor 670 may determine whether light generated by another vehicle interrupts display of a visual image, based on the location information, speed information, travel direction information and route information about another vehicle. If it is determined that light generated from another vehicle interrupts display of the visual image, the processor 670 may control the light output unit 650 or the beam pattern unit 660 to change the visual image.

FIGS. 27 to 45 illustrate an operation of displaying a visual image when a headlamp is implemented as a lighting apparatus for vehicles according to an implementation.

Figure 27:
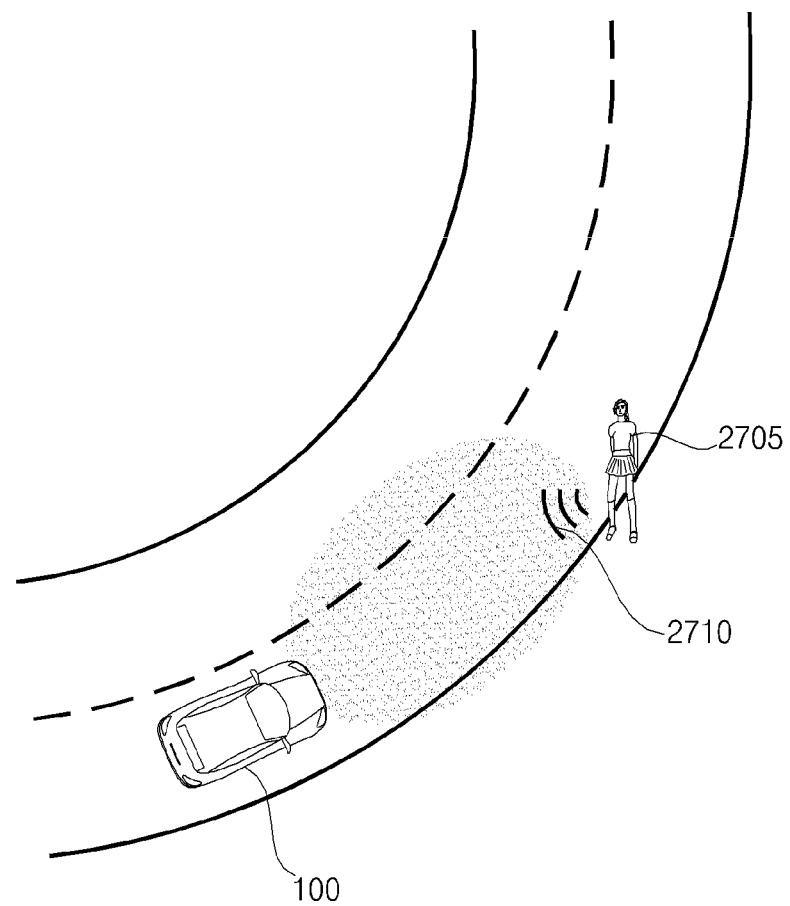
FIGS. 27 to 45 are diagrams illustrating examples of operations of displaying a visual image when a headlamp is implemented as a lighting apparatus for vehicles according to some implementations.

FIG. 27 illustrates an operation of displaying and changing a visual image corresponding to object warning an implementation.

Referring to FIG. 27, the processor 670 may receive information about an object 2705 around the vehicle via the interface unit 630. The information about the object 2705 may include at least one of information indicating presence or absence of the object 2705, location information about the object 2705, information about the distance between the vehicle 100 and the object 2705, and travel direction information about the object 2705.

The object 2705 may be an object such as a pedestrian, bicycle and motorcycle which are possible to collide with the vehicle 100 and needs to be watched out by the driver. The external sensing unit 126 of the vehicle 100 may detect the object 2705 around the vehicle. The external sensing unit 126 of the vehicle 100 may acquire location information about the object. The external sensing unit 126 of the vehicle 100 may acquire distance information about the object 2705. The external sensing unit 126 of the vehicle 100 may acquire travel direction information about the object 2705.

The processor 670 may control the light output unit 650 or the beam pattern unit 660 to display a visual image 2710 based on the received information about the object 2705. Herein, the visual image 2710 may be displaced around the object 2805.

The processor 670 may control the light output unit 650 or the beam pattern unit 660 to change the visual image 2710 based on the second information.

Figure 28:
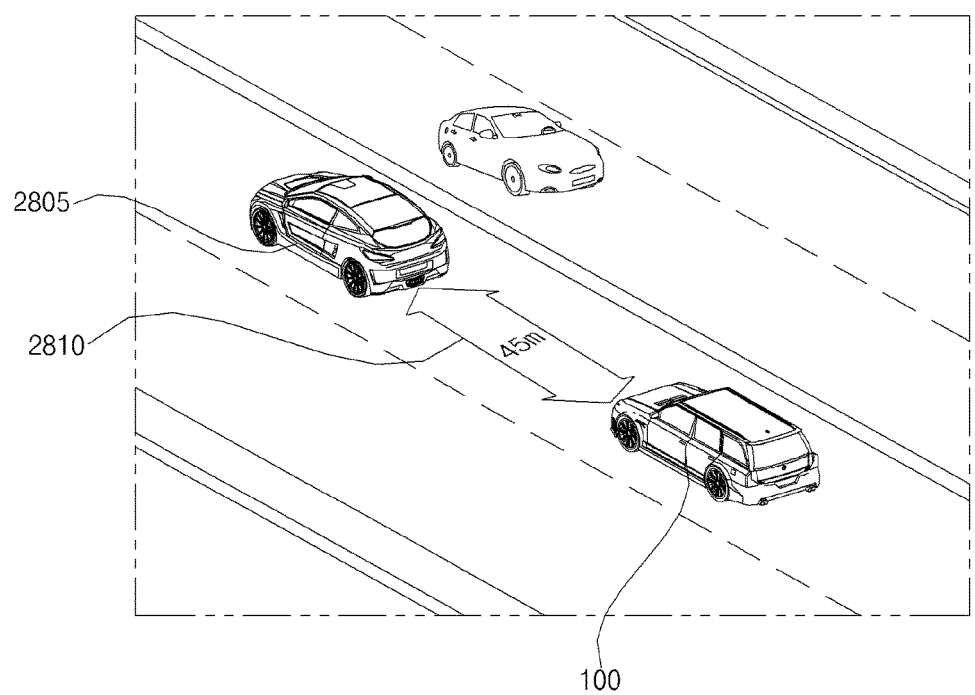

FIG. 28 illustrates an operation of displaying and changing a visual image corresponding to the distance to a preceding vehicle or following vehicle an implementation.

Referring to FIG. 28, the processor 670 may receive information about the distance between the vehicle 100 and an object 2805 in front of the vehicle 100 via the interface unit 630. The external sensing unit 126 of the vehicle 100 may acquire information about the distance between the vehicle 100 and the object 2805.

The processor 670 may control the light output unit 650 or the beam pattern unit 660 to display a visual image 2810 based on the received information about the distance to the object 2805. Herein, the visual image 2810 may be displayed in a space between the vehicle 100 and the object 2805.

The processor 670 may control the light output unit 650 or the beam pattern unit 660 to change the visual image 2810 based on the second implementation.

Figure 29:
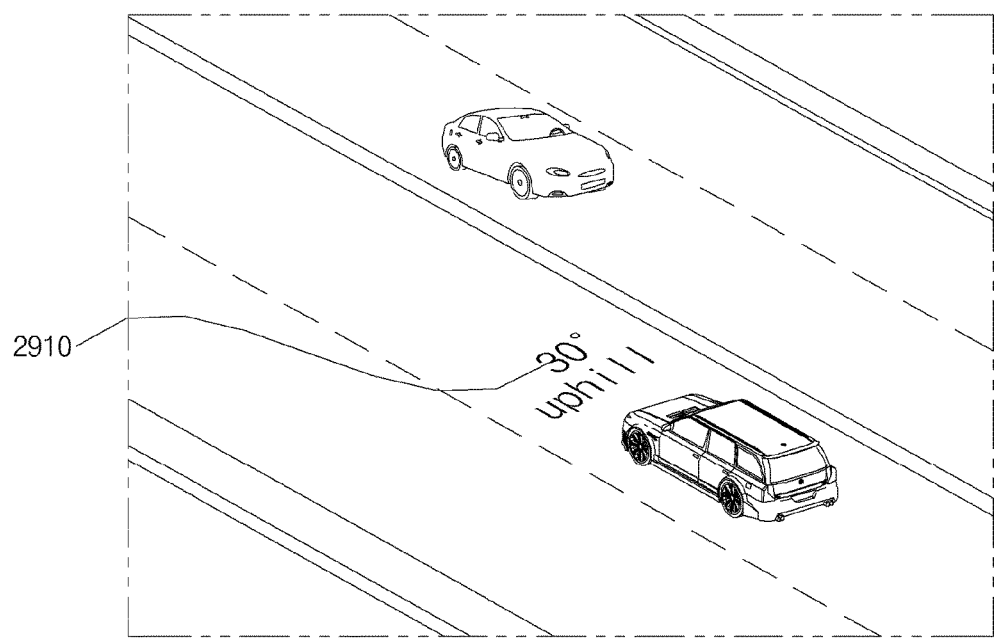
Figure 30:
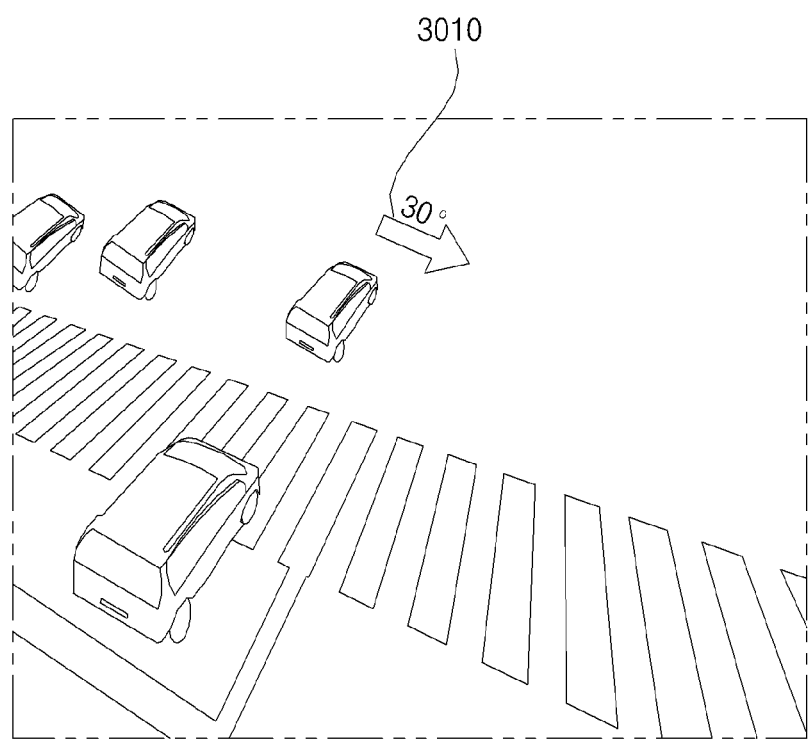

FIGS. 29 and 30 illustrate an operation of displaying and changing a visual image corresponding to road information according to an implementation.

Referring to FIG. 29, the processor 670 may receive information about inclination of a road via the interface unit 630. Herein, the information about inclination of a road may be inclination information acquired from a tilt sensor included in the internal sensing unit 125 of the vehicle.

The inclination information about the road may be inclination information acquired by performing depth map processing on the stereo image of the front view of the vehicle in the camera 200.

The camera 200 may create a depth map based on a stereo image of the front view of the vehicle, detect an ascent or descent ahead of the road on which the vehicle is travelling, based on the created depth map. Thereby, the camera 200 may detect inclination of the ascent or descent.

The camera 200 may detect a road surface in the stereo image or depth map, detect an ascent or descent placed ahead of the road based on the detected road surface, and detect inclination of the ascent or descent.

The camera 200 may detect a lane in the stereo image or depth map, detect an ascent or descent ahead of the road based on the shape of the detected lane, and detect inclination of the ascent or descent.

The camera 200 may detect an ascent or descent ahead of the road based on the vanishing point displayed in the stereo image or depth map, and detect inclination of the ascent or descent.

The camera 200 may detect an ascent or dissent based on a plurality of fixed objects, for example, street trees or streetlights around the road displayed in the stereo image or depth map, and detect inclination of the ascent or descent.

The processor 670 may control the light output unit 650 or the beam pattern unit 660 to display a visual image 2910 corresponding to inclination information.

The processor 670 may control the light output unit 650 or the beam pattern unit 660 to change the visual image 2910 based on the second information.

Referring to FIG. 30, the processor 670 may receive curvature information about a road via the interface unit 630. Herein, the curvature information about the road may be information detected based on the rotation angle of the steering wheel acquired from a steering sensor included in the internal sensing unit 125 of the vehicle.

Alternatively, the curvature information about a road may be information about a curve acquired by the camera 200 based on an image of the front view of the vehicle.

The camera 200 may detect a lane in the image of the front view of the vehicle, and created information about the curve of the road through the detected lane. The camera 200 may detect a lane based on sidelines of the road on which the vehicle is travelling, and create information about the curve. Alternatively, the camera 200 may detect a lane and generate information about the curve, based on the center lane. For example, the camera 200 may detect a lane through Hough transformation, and generate information on the curve of the road. Herein, the information about the curve may include curvature.

The processor 670 of the lighting apparatus may control the light output unit 650 or the beam pattern unit 660 to display a visual image 3010 corresponding to the curvature information.

The processor 670 may control the light output unit 650 or the beam pattern unit 660 to change the visual image 3010 based on the second information.

Figure 31:
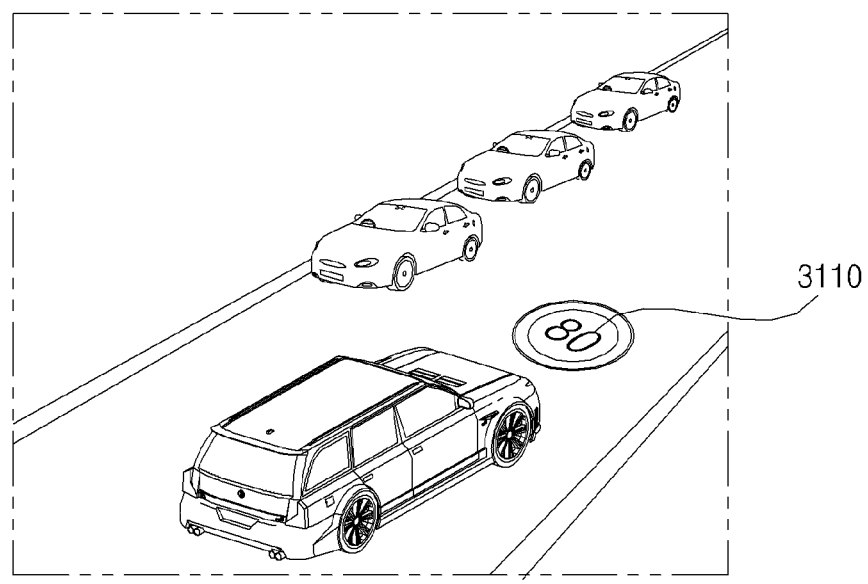

FIG. 31 illustrates an operation of displaying and changing a visual image corresponding to traffic sign recognition information according to an implementation.

Referring to FIG. 31, the processor 670 may receive detected traffic sign recognition (TSR) information via the interface unit 630. Herein the TSR information may be information acquired by performing computer processing on an image of the front view of the vehicle.

The detected TSR information may include traffic signboard detection information, traffic light detection information, and road surface detection information.

The camera 200 may detect a traffic signboard in the acquired image of the front view of the vehicle. The camera 200 may detect a design or a text on the detected traffic signboard. The detected design or text information may be delivered to the lighting apparatus 600.

The camera 200 may detect a traffic light in the acquired image of the front view of the vehicle. The camera 200 may detect a signal output from the detected traffic light. The detected signal information may be delivered to the lighting apparatus 600.

The camera 200 may detect a road surface from the acquired image of the front view of the vehicle. The camera 200 may detect a design or a text on the detected road surface. The detected design or text information may be delivered to the lighting apparatus 600.

The processor 670 may control the light output unit 650 or the beam pattern unit 660 to display a visual image 3110 corresponding to the TSR information.

The processor 670 may control the light output unit 650 or the beam pattern unit 660 to change the visual image 3110 based on the second information.

Figure 32:
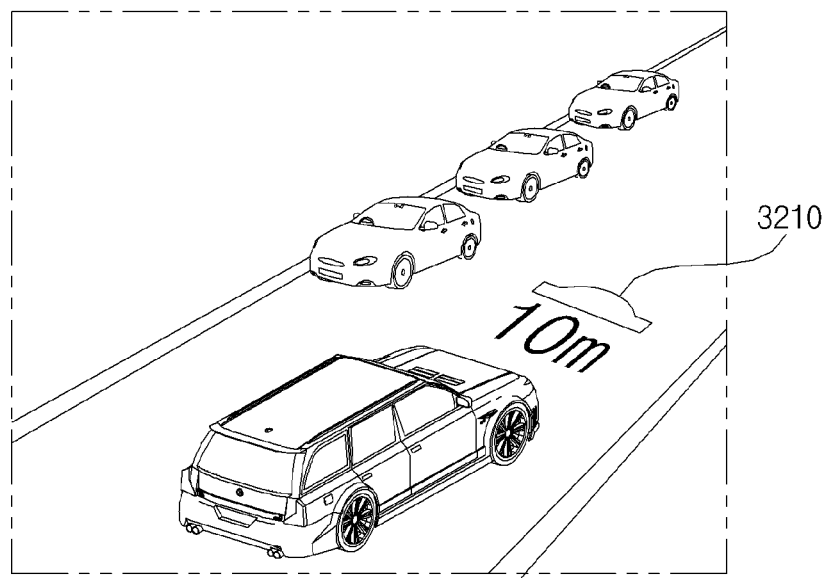

FIG. 32 illustrates an operation of displaying and changing a visual image corresponding to speed bump detection information an implementation.

Referring to FIG. 32, the processor 670 may receive detected speed bump information via the interface unit 630. Herein, the speed bump information may be detected based on an image of the front view of the vehicle acquired by the camera 200.

The camera 200 may detect a road surface in the acquired image of the front view of the vehicle. The camera 200 may detect a speed bump based on the color or shape of the detected road surface. The detected speed bump information may be delivered to the lighting apparatus 600.

The processor 670 may control the light output unit 650 or the beam pattern unit 660 to display a visual image 3210 corresponding to the speed bump information on a projection surface.

The processor 670 may control the light output unit 650 or the beam pattern unit 660 to change the visual image 3210 based on the second information.

Figure 33:
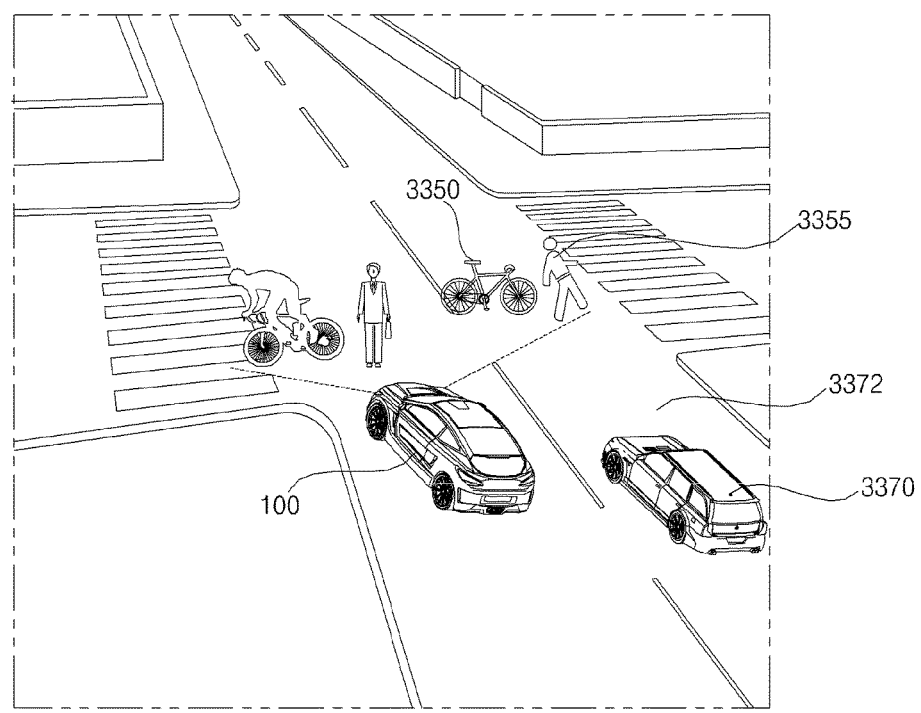
Figure 34:
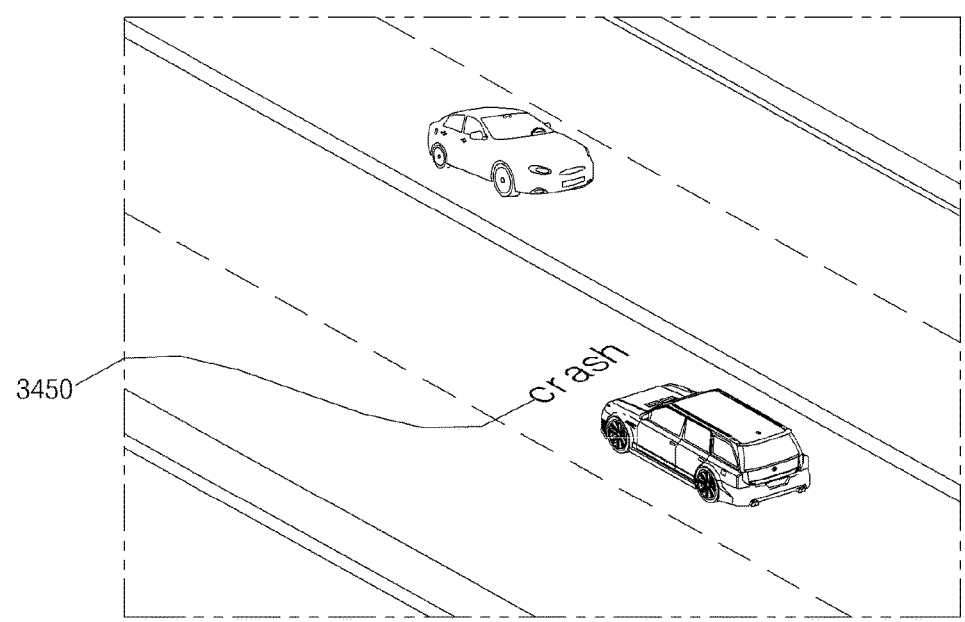
Figure 35:
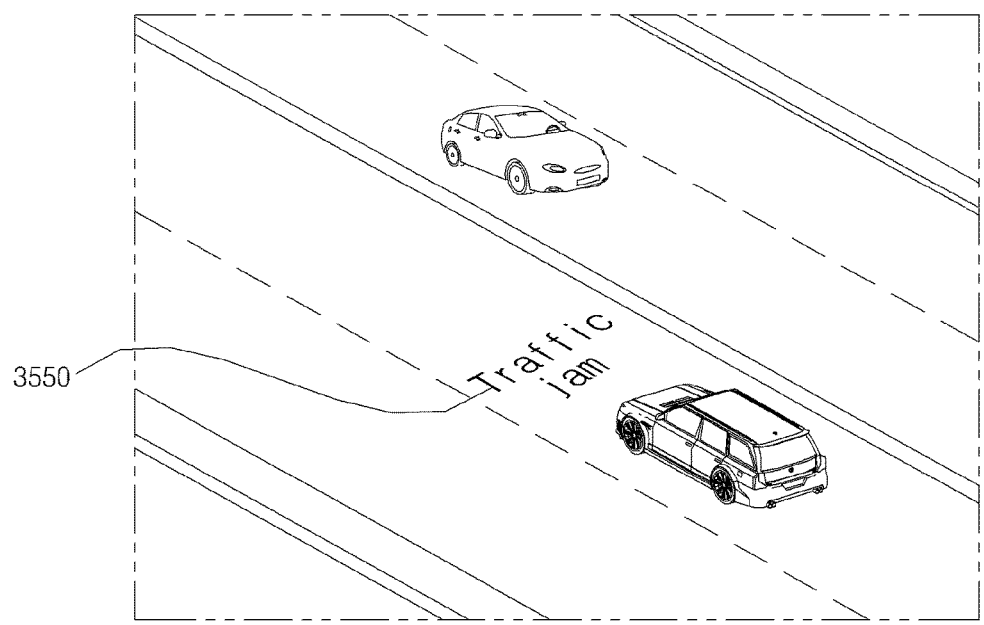

FIGS. 33 to 35 illustrate an operation of displaying and changing obstacle detection information an implementation.

Referring to FIGS. 33 to 35, the processor 670 may receive obstacle information via the interface unit 630. Herein, the obstacle information may include other-vehicle information, two-wheeled vehicle information, pedestrian information, traffic accident information, construction information or road congestion information.

The obstacle information may be detected through the camera 200. The camera 200 may detect another vehicle, a two-wheeled vehicle, or a pedestrian based on an acquired image of the front view of the vehicle. The camera 200 may detect another vehicle, a two-wheeled vehicle, or a pedestrian by comparing the shape of a detected object with shapes stored in the memory 440. Information about the detected vehicle, two-wheeled vehicle, or pedestrian may be delivered to the lighting apparatus 600.

According to an implementation, the obstacle information may be received through the communication unit 110 of the vehicle 100. The vehicle 100 may receive traffic accident information, construction information and road congestion information from another vehicle, a mobile terminal, or an external server via the communication unit 110.

Referring to FIG. 33, the processor 670 may receive two-wheeled vehicle information or pedestrian information via the interface unit 630.

The processor 670 may control the light output unit 650 or the beam pattern unit 660 to display a visual image corresponding to the two-wheeled vehicle information or pedestrian information.

The processor 670 of the lighting apparatus 600 may receive, via the interface unit 630, detection information about a following vehicle 3370 traveling in a lane next to the drive lane of the vehicle 100. The vehicle 3370 may be detected by the camera 200.

If two-wheeled vehicle or pedestrian detection information is received with the detection information about the vehicle 3370 received, the processor 670 may display a visual image 3350 corresponding to the two-wheeled vehicle or a visual image 3355 corresponding to the pedestrian the drive lane 3372 of the vehicle 3370. When an obstacle is not seen due to the vehicle 100, the driver of the vehicle 3370 cannot verify the obstacle. In this case, the lighting apparatus 600 may prevent an accident by displaying the obstacle information on the lane of a nearby vehicle.

The processor 670 may control the light output unit 650 or the beam pattern unit 660 to change visual images 3350 and 3355 based on the second information.

Referring to FIG. 34, the processor 670 may receive traffic accident information through the interface unit 630.

The processor 670 may control the light output unit 650 or the beam pattern unit 660 to display a visual image 3450 corresponding to the traffic accident information.

The processor 670 may control the light output unit 650 or the beam pattern unit 660 to change the visual image 3350 based on the second information.

Referring to FIG. 35, the processor 670 may receive road congestion information through the interface unit 630.

The processor 670 may control the light output unit 650 or the beam pattern unit 660 to display a visual image 3550 corresponding to the road congestion information.

The processor 670 may control the light output unit 650 or the beam pattern unit 660 to change the visual image 3550 based on the second information.

Figure 36:
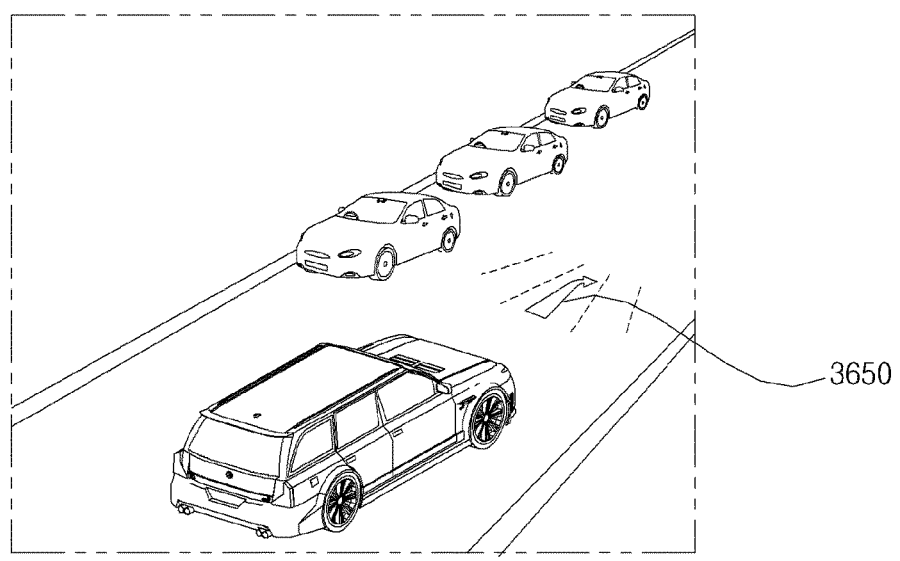
Figure 37:
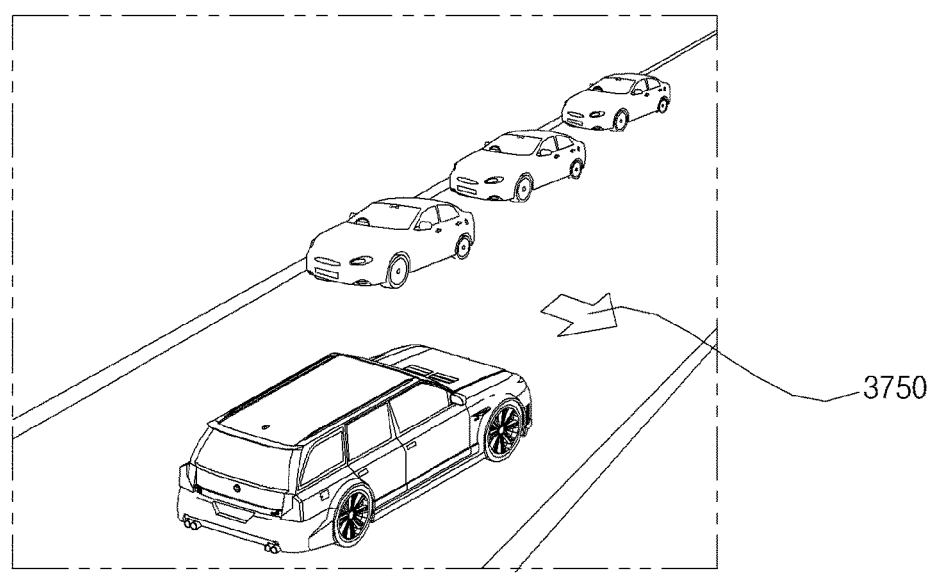

FIGS. 36 and 37 illustrate an operation of displaying and changing a visual image corresponding to navigation information according to an implementation.

Referring to FIG. 36, the processor 670 may receive navigation information through the interface unit 630. The navigation information may be provided by the display apparatus 141 or a separate navigation system.

The navigation information may include driving route information, predetermined destination information, remaining distance information, driving area information, driving road information, and speed camera information.

The processor 670 may control the light output unit 650 or the beam pattern unit 660 to display a visual image 3650 corresponding to the navigation information.

The processor 670 may control the light output unit 650 or the beam pattern unit 660 to change the visual image 3650 based on the second information.

Referring to FIG. 37, the processor 670 of a lighting apparatus for vehicles may control the light output unit 650 or the beam pattern unit 660 to display a TBT (turn-by-turn) image 3750 corresponding to the driving route information.

The processor 670 may control the light output unit 650 or the beam pattern unit 660 to change the visual image 3750 based on the second information.

The processor 670 may receive detection information about another vehicle which travels along a lane next to the drive lane of the vehicle 100 and is behind the vehicle 100, through the interface unit 630.

If navigation information is received after the detection information about another vehicle is received, the processor 670 may display a TBT image corresponding to the navigation information on the lane of another vehicle. Herein, the TBT image may be a straight arrow, a left turn arrow, a right turn arrow or a U-turn arrow corresponding to the driving route.

Figure 38:
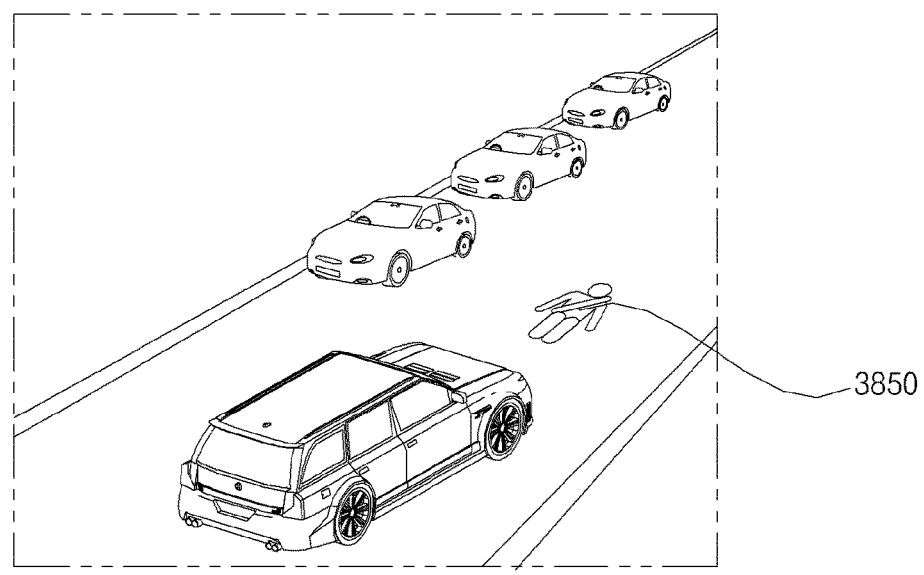

FIG. 38 illustrates an operation of displaying and changing a visual image corresponding to vehicle state information according to an implementation.

Referring to FIG. 38, the processor 670 of the lamp 200 may receive vehicle state information through the interface unit 630. Herein, vehicle state information may be OBD information. The vehicle state information may include parking brake state information, high beam on/off information, washer liquid level information, engine oil level information, power source temperature information, remaining energy information, tire pressure information, brake oil state information or door opening information.

The processor 670 of the lighting apparatus 600 may receive the OBD information from the controller 170 or the sensing unit 135 of the vehicle.

The processor 670 may control the light output unit 650 or the beam pattern unit 660 to display an image 3850 corresponding to the OBD information.

The processor 670 may control the light output unit 650 or the beam pattern unit 660 to change the visual image 3850 based on the second information.

Figure 39:
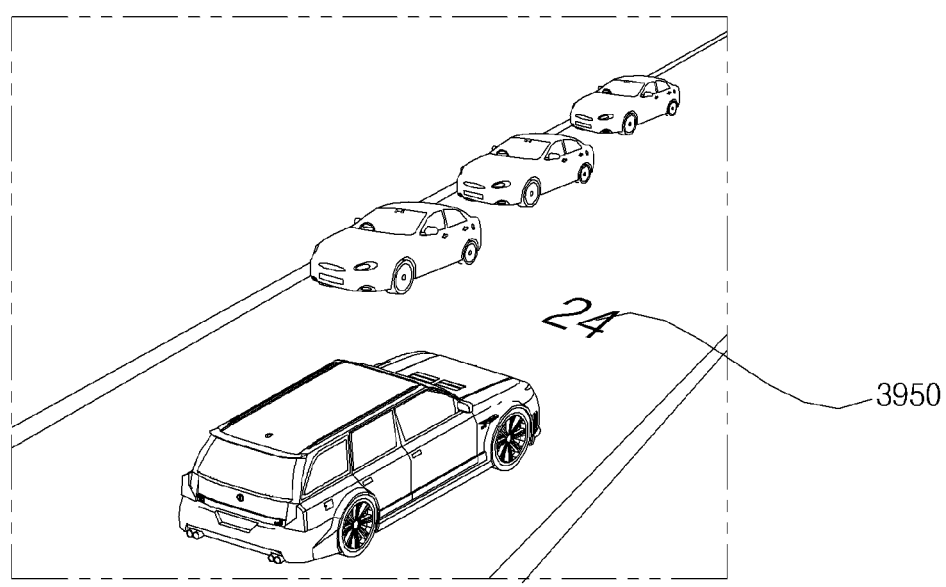
Figure 40:
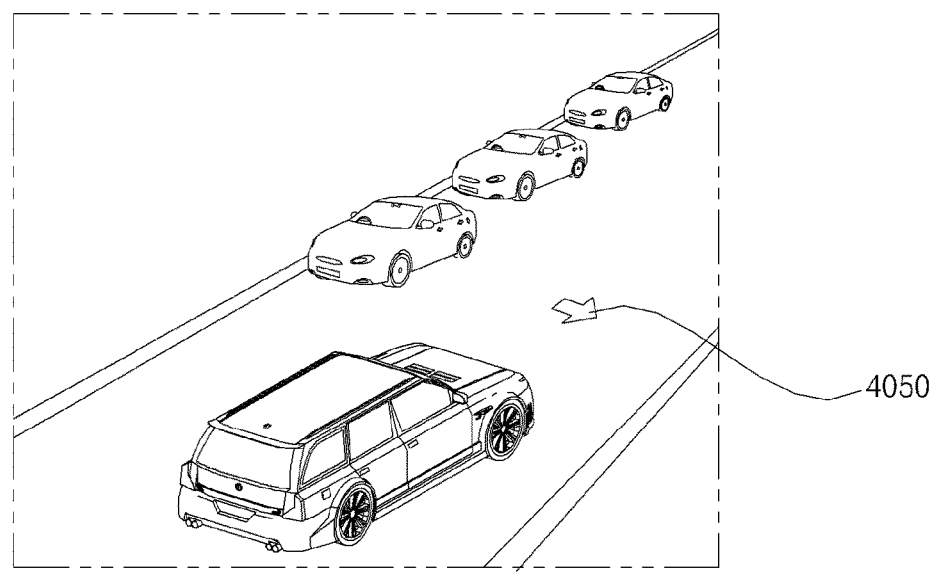

FIGS. 39 and 40 illustrate an operation of displaying and changing a visual image corresponding to vehicle driving information according to an implementation.

Referring to FIGS. 39 and 40, the processor 670 may receive vehicle driving information through the interface unit 630. Herein, the vehicle driving information may include driving speed information, gearshift information or turn signal information delivered to the turn signal lamp.

The processor 670 may receive the vehicle driving information from the controller 170 or the sensing unit 135 of the vehicle 100.

Referring to FIG. 39, the processor 670 may receive driving speed information through the interface unit 630.

The processor 670 may control the light output unit 650 or the beam pattern unit 660 to display a visual image 3950 corresponding to the driving speed information about the vehicle.

The processor 670 may control the light output unit 650 or the beam pattern unit 660 to change the visual image 3950 based on the second information.

Referring to FIG. 40, the processor 670 the processor 670 may receive turn signal information through the interface unit 630.

The processor 670 may control the light output unit 650 or the beam pattern unit 660 to display a visual image 4050 corresponding to the turn signal information.

The processor 670 may control the light output unit 650 or the beam pattern unit 660 to change the visual image 4050 based on the second information.

Figure 41:
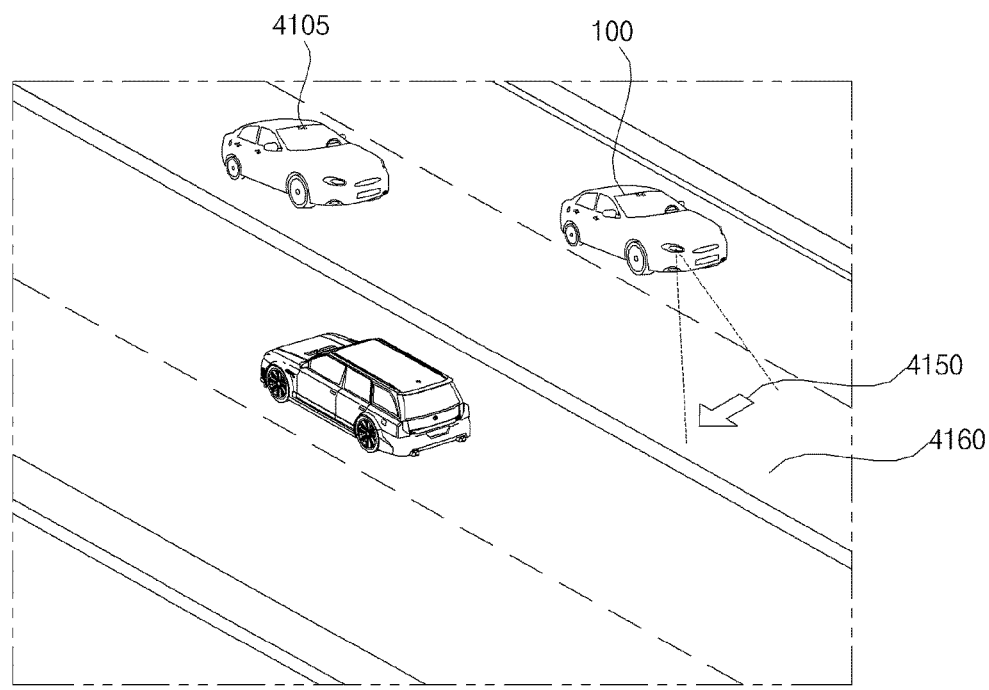

FIG. 41 illustrates an operation of displaying and changing information on a lane other than the drive lane of the vehicle, according to an implementation.

The processor 670 may receive detection information about another vehicle 4105 through the interface unit 630. Herein, the vehicle 4105 may be a vehicle which travels along a lane 4160 next to the drive lane of the vehicle 100.

If the turn signal information is received after the detection information about the vehicle 4105 is received, the processor 670 may display a visual image 4150 corresponding to the turn signal information 2450 on the drive lane 4160 of the vehicle 4105.

The processor 670 may control the light output unit 650 or the beam pattern unit 660 to change the visual image 4150 based on the second information.

As the visual image 4150 corresponding to the turn signal information is displayed on the drive lane 4160 of the vehicle 4105, a signal having good visibility may be provided to the driver of the vehicle 4105, thereby preventing an accident which may occur in changing the drive lanes.

Figure 42:
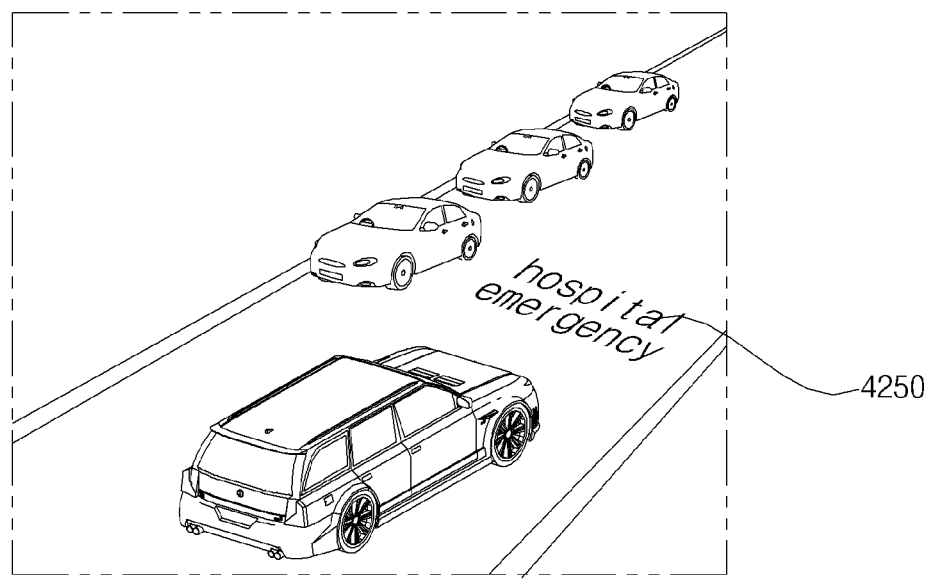

FIG. 42 illustrates an operation of displaying and changing a visual image corresponding to in-vehicle situation information according to an implementation.

Referring to FIG. 42, the processor 670 may receive in-vehicle situation information through the interface unit 630. Herein, the in-vehicle situation information may be patient evacuation situation information, emergency aid request information, infant-on-board information or inexperienced driver information. The in-vehicle situation information may be generated through the input unit 120 of the vehicle 100 according to user input.

The processor 670 of a lighting apparatus for vehicles may control the light output unit 650 or the beam pattern unit 660 to display a visual image 4250 corresponding to the in-vehicle situation information.

The processor 670 may control the light output unit 650 or the beam pattern unit 660 to change the visual image 4250 based on the second information.

Figure 43:
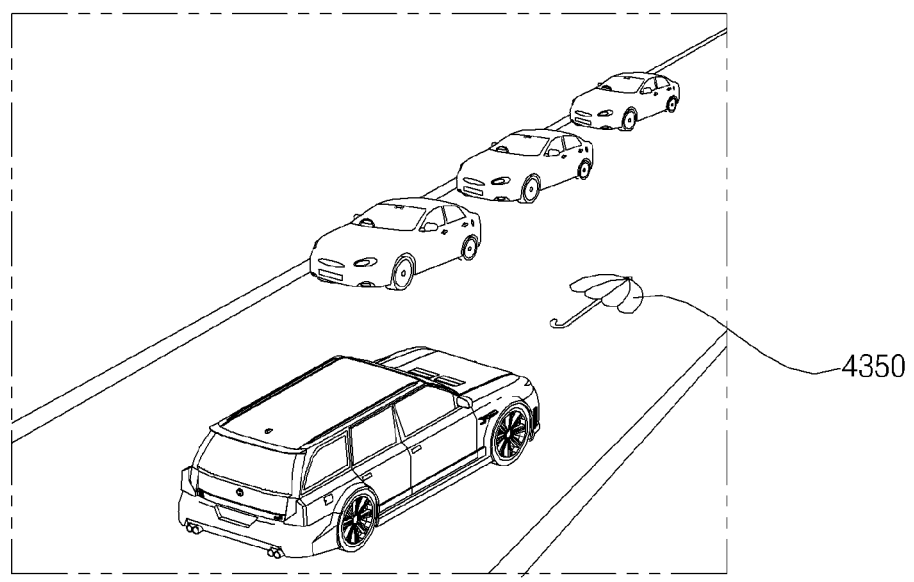
Figure 44:
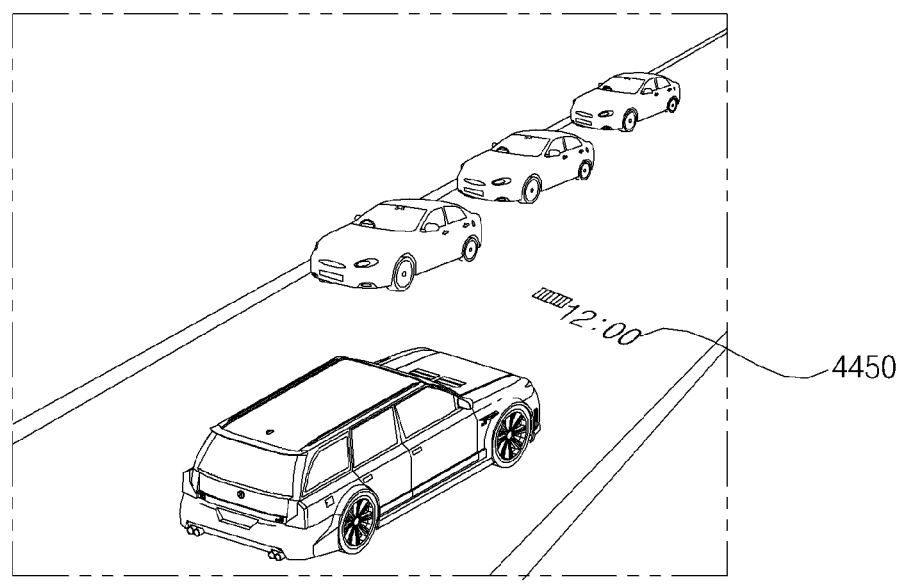

FIGS. 43 and 44 illustrate and operation of displaying and changing driving environment information according to an implementation.

Referring to FIGS. 43 and 44, may receive driving environment information through the interface unit 630. Herein, the driving environment information may include weather information or time information for driving.

Referring to FIG. 43, the processor 670 may control the light output unit 650 or the beam pattern unit 660 to display a visual image 4350 corresponding to the weather information. Herein, the weather information may be received from a mobile terminal, another vehicle or an external server through the communication unit 110 of the vehicle 100.

The processor 670 may control the light output unit 650 or the beam pattern unit 660 to change the visual image 4350 based on the second information.

Referring to FIG. 44, the processor 670 may control the light output unit 650 or the beam pattern unit 660 to display a visual image 4450 corresponding to the time information. Herein, the time information may be stored in the memory 130 of the vehicle 100. Alternatively, the time information may be received from a mobile terminal, another vehicle or external server through the communication unit 110 of the vehicle 100.

The processor 670 may control the light output unit 650 or the beam pattern unit 660 to change the visual image 4450 based on the second information.

Figure 45:
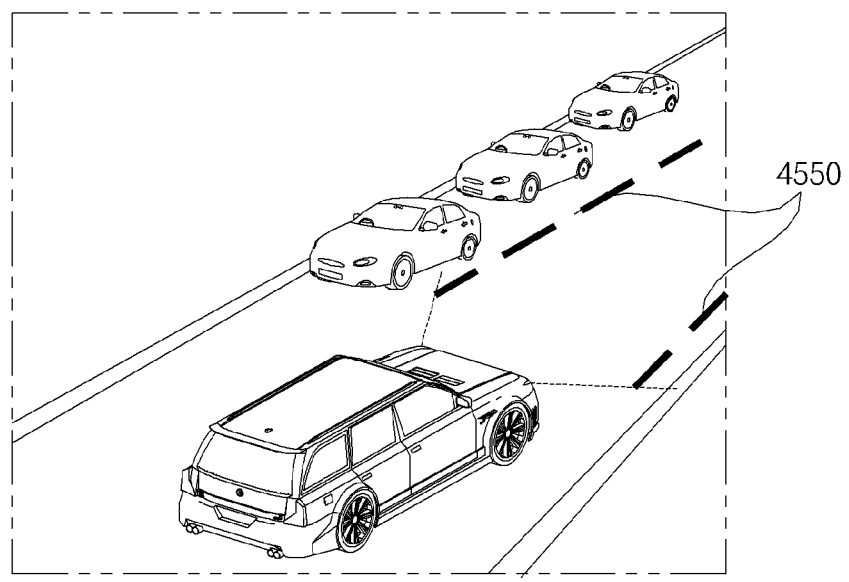

FIG. 45 illustrates an operation of displaying and changing a drive lane according to an implementation.

Referring to FIG. 45 the processor 670 may receive drive lane information. The external sensing unit 126 of the vehicle 100 may detect a drive lane. For example, the camera 200 may detect a drive lane by performing computer processing on an acquired image.

The processor 670 may control the light output unit 650 or the beam pattern unit 660 to display visual image 2710 based on the received drive lane information. Herein, the visual image 2710 may be a drive lane image. The drive lane image 4550 may fully or partially overlap the drive lane when it is displayed.

The camera 200 may detect a preceding vehicle. In particular, the camera 200 may detect the taillight or stop lamp of the preceding vehicle at night.

The processor 670 may control the light output unit 650 or the beam pattern unit 660 to display a visual image 4550 based on the received preceding vehicle information.

The processor 670 may control the light output unit 650 or the beam pattern unit 660 to change the visual image 4550 based on the second information.

When the driver is driving the vehicle at night or in bad weather, the drive lane may be temporarily unidentified. In this case, safe driving may be ensured by displaying a virtual lane on the road surface based on the pre-received drive lane information or preceding vehicle information.

FIGS. 46 to 51 illustrate an operation of displaying a visual image when a real combination lamp is implemented as a lighting apparatus for vehicles according to an implementation.

Figure 46:
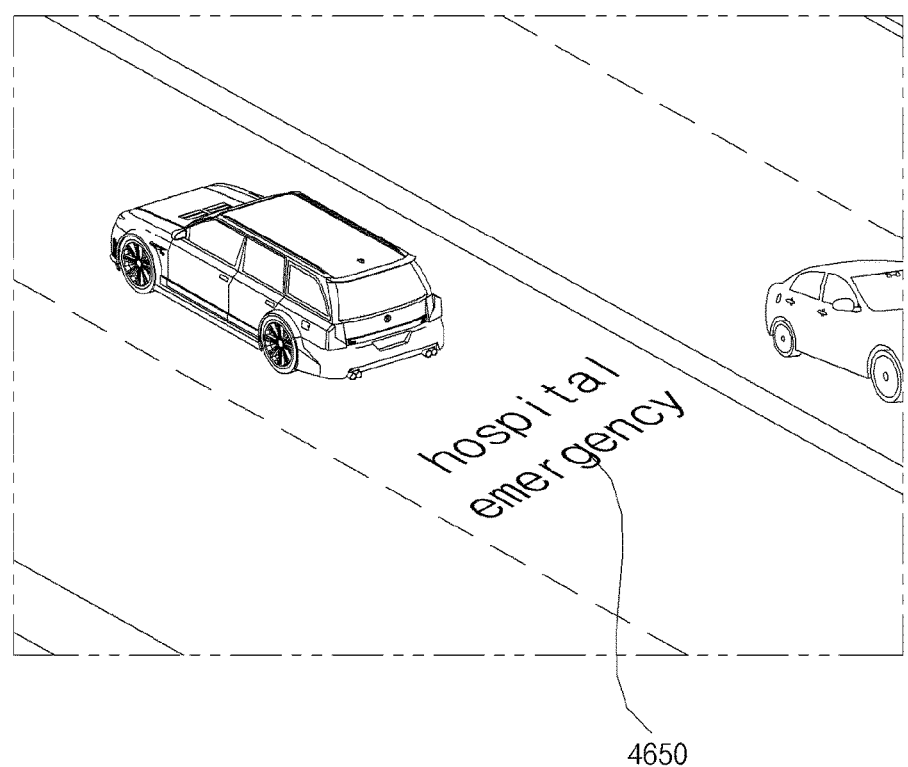
FIGS. 46 to 51 are diagrams illustrating examples of operations of displaying a visual image when a rear combination lamp is implemented as a lighting apparatus for vehicles according to some implementations.

FIG. 46 illustrates an operation of displaying and changing a visual image corresponding to in-vehicle situation information according to an implementation.

The processor 670 may receive in-vehicle situation information through the interface unit 630. Herein, the in-vehicle situation information may be patient evacuation situation information, emergency aid request information, infant-on-board information or inexperienced driver information. The in-vehicle situation information may be generated through the input unit 120 of the vehicle 100 according to user input.

The processor 670 of a lighting apparatus for vehicles may control the light output unit 650 or the beam pattern unit 660 to display a visual image 4650 corresponding to the in-vehicle situation information.

The processor 670 may control the light output unit 650 or the beam pattern unit 660 to change the visual image 4650 based on the second information.

In this case, the in-vehicle situation information may be delivered to a following vehicle.

Figure 47:
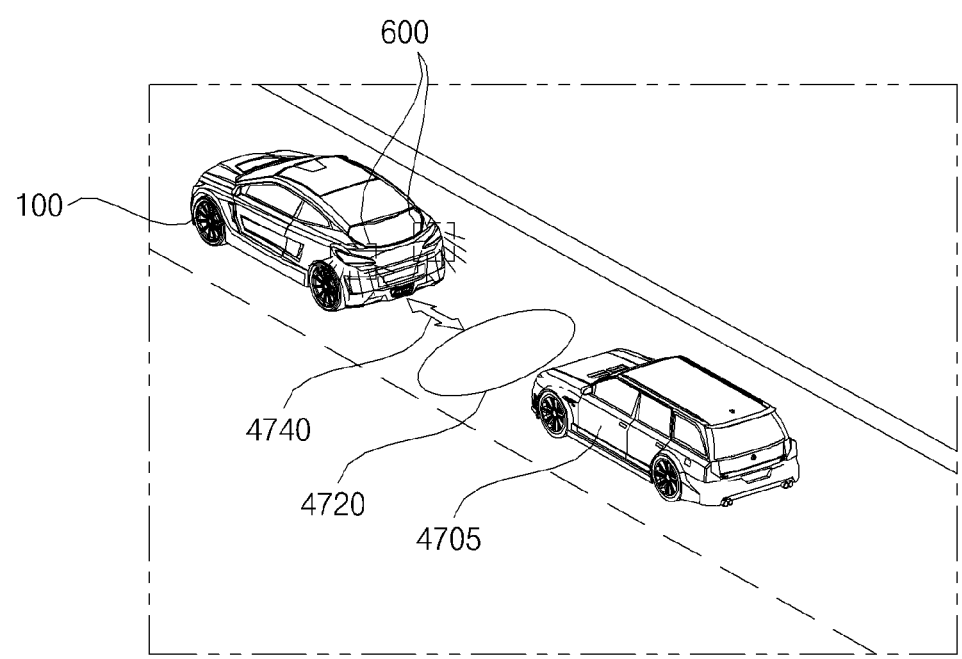
Figure 48:
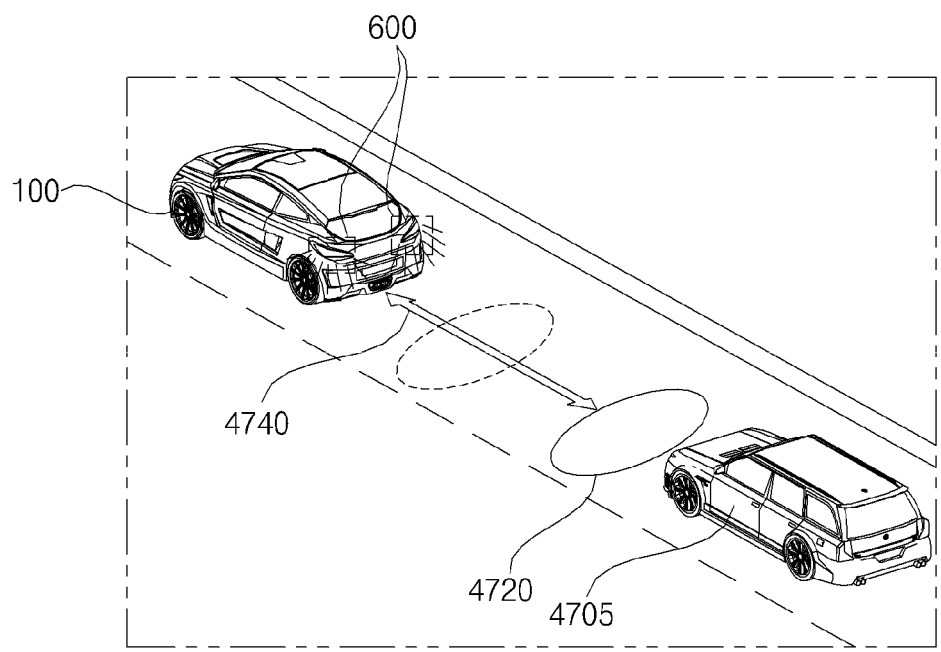

FIGS. 47 and 48 illustrate an operation of changing a visual image according to a relative distance to a following vehicle, according to an implementation.

Referring to FIGS. 47 and 48, the processor 670 may receive information about an object 4705 behind the vehicle through the interface unit 630. Herein, the object 4705 may be a following vehicle. The processor 670 may receive information about a relative distance to the following vehicle.

The camera 200 may acquire an image of the rear view of the vehicle. The camera 200 may detect a following vehicle 4705 in the image of the rear view of the vehicle. The camera 200 may compute the information about the relative distance to the following vehicle 4705 based on the information about change in size of the following vehicle 4705 according to disparity information or time. The information about the following vehicle 4705 including the relative distance information may be delivered to the lighting apparatus 600.

The processor 670 may perform a control operation such that a distance 4740 between a visual image display region 4720 and the lighting apparatus 600 is adjusted according to the information about the relative distance to the following vehicle 4705.

The processor 670 may control the light output unit 650 or the beam pattern unit 660 to adjust the distance 4720.

Meanwhile, the processor 670 may adjust the intensity of light emitted outward from the lighting apparatus 600 according to the information about the distance to the following vehicle 4705.

Figure 49:
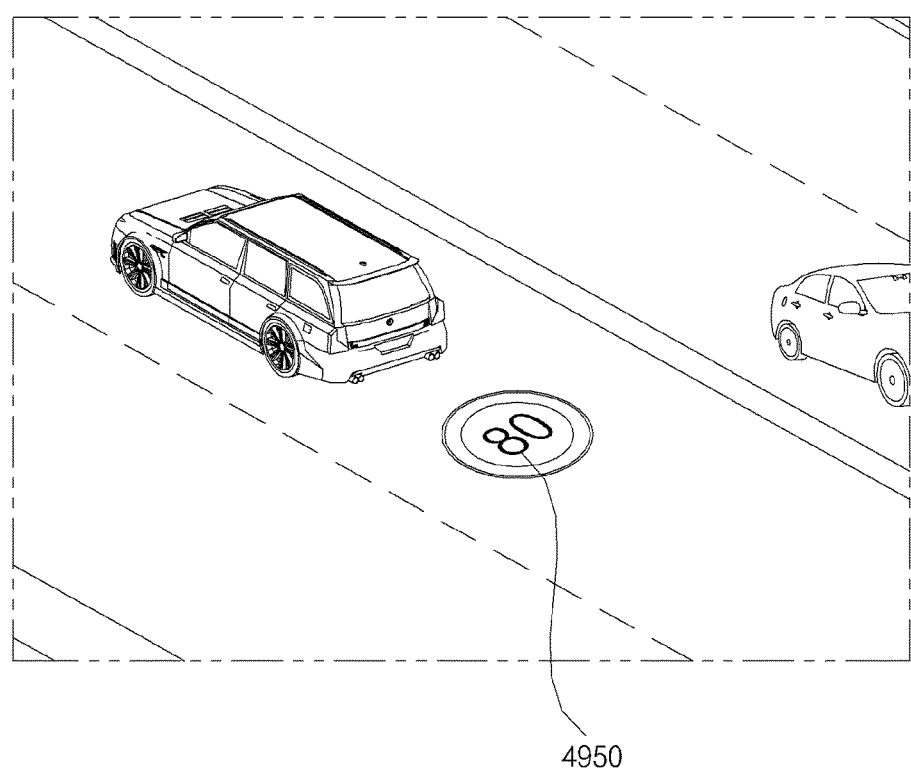

FIG. 49 illustrates an operation of displaying and changing a visual image corresponding to TSR information according to an implementation.

Referring to FIG. 49, the processor 670 may receive detected TSR information through the interface unit 630. Herein, the TSR information may be detected based on an image of the front view of the vehicle acquired by the camera 200.

The detected TSR information may include traffic signboard detection information, traffic light detection information, and road surface detection information.

The camera 200 may detect a traffic signboard in the acquired image of the front view of the vehicle. The camera 200 may detect a design or a text on the detected traffic signboard. The detected design or text information may be delivered to the lighting apparatus 600.

The camera 200 may detect a traffic light in the acquired image of the front view of the vehicle. The camera 200 may detect a signal output from the detected traffic light. The detected signal information may be delivered to the lighting apparatus 600.

The camera 200 may detect a road surface in the acquired image of the front view of the vehicle. The camera 200 may detect a design or a text on the detected road surface. The detected design or text information may be delivered to the lighting apparatus 600.

The processor 670 may control the light output unit 650 or the beam pattern unit 660 to display a visual image 4950 corresponding to the TSR information.

The processor 670 may control the light output unit 650 or the beam pattern unit 660 to change the visual image 4950 based on the second information.

In this case, the detected TSR information may be delivered to the following vehicle.

Figure 50:
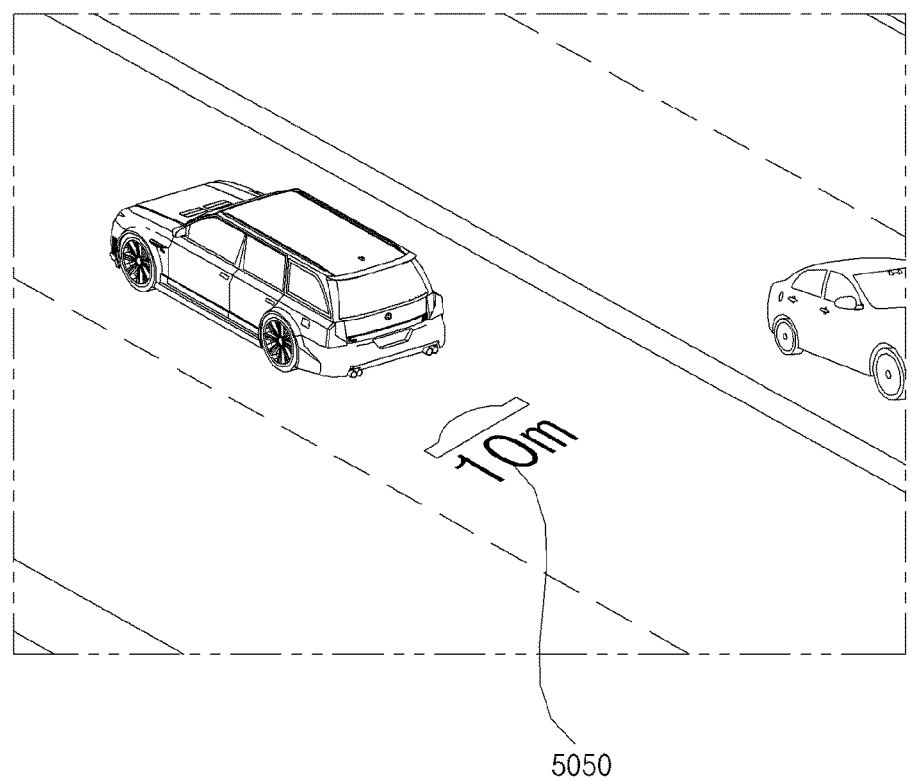

FIG. 50 illustrates an operation of displaying speed bump detection information according to an implementation.

Referring to FIG. 50, the processor 670 may receive detected speed bump information through the interface unit 630. Herein, the speed bump information may be detected based on an image of the front view of the vehicle acquired by the camera 200.

The camera 200 may detect a road surface in the acquired image of the front view of the vehicle. The camera 200 may detect a speed bump based on the color or shape on the detected road surface. The detected speed bump information may be delivered to the lighting apparatus 600.

The processor 670 may control the light output unit 650 or the beam pattern unit 660 to display a visual image 5050 corresponding to the speed bump information.

The processor 670 may control the light output unit 650 or the beam pattern unit 660 to change the visual image 5050 based on the second information.

In this case, the speed bump information may be delivered to a following vehicle.

Figure 51:
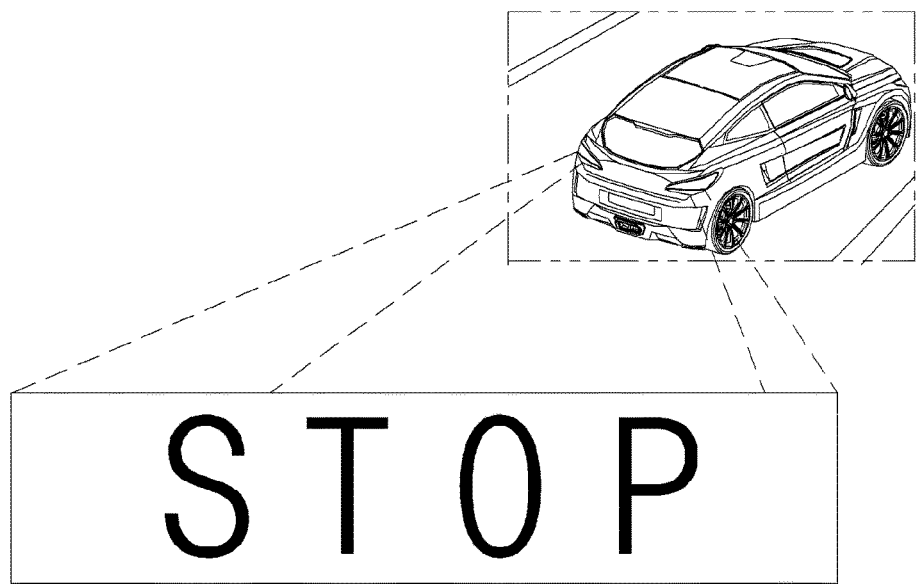

FIG. 51 illustrates an operation of displaying and changing information about fog employed as a projection surface, according to an implementation.

The camera 200 may detect a foggy state based on an image of the front view of the vehicle or an image of the surroundings of the vehicle. The communication unit 110 of the vehicle may receive foggy state information about a current location. Herein, the information about the current location may be detected by the location information module 114 or may be received from the display apparatus 141 or a navigation system.

When the vehicle 100 is traveling in a foggy space, the processor 670 of a lighting apparatus for vehicles may control the light output unit 650 or the beam pattern unit 660 to display predetermined information in the foggy space.

As information is delivered to a following vehicle using the fog as a projection surface, safe driving of the following vehicle may be ensured based on the delivered information.

As is apparent from the above description, implementations may have at least one of the following effects.

First, as a visual image corresponding to first information is displayed outside of a vehicle using light, the driver may recognize the first information while looking forward.

Second, a graphic object is adaptively changed and displayed according to the situation around the vehicle by changing the visual image according to the second information. Thereby, the driver may accurately recognize the first information.

Third, whether there is distortion in displayed visual images is checked and any distortion of a visual image is corrected. Thereby, the visual image may be correctly displayed.

Other effects which are not mentioned above will become apparent to those having ordinary skill in the art from the claims.

Implementations described above may be implemented as computer-readable code on a program-recorded medium. The computer-readable medium may include one or more recording devices in which data readable by a computer system may be stored. Examples of the computer-readable medium include a hard disk drive (HDD), solid-state disk (SSD), silicon disk drive (SDD), ROM, RAM, CD-ROM, magnetic tape, floppy disk, and optical data storage. Alternatively, implementations may be implemented in the form of a carrier wave (e.g., transmission over the Internet). In addition, the computer may include the processor 270 or the controller 170. Although some implementations have been disclosed for illustrative purposes, various modifications, additions and substitutions are possible, without departing from the scope and spirit of the invention as disclosed in the accompanying claims.

What is claimed is:

1. A lighting apparatus for a vehicle comprising:
   a light output unit;
   an interface unit; and
   at least one processor configured to:
      control the light output unit to generate light that illuminates an exterior of the vehicle;
      receive first information via the interface unit;
      control the light output unit to display, via the light that illuminates the exterior of the vehicle, a visual image corresponding to the received first information;
      receive second information via the interface unit; and
      control the light output unit based on the received second information to change the visual image displayed by the light that illuminates the exterior of the vehicle,
   wherein the at least one processor is further configured to control the light output unit based on the second information to change a shape, a color, a size, or a brightness of the visual image, and
   wherein the at least one processor is further configured to:
      determine whether external light is emitted onto a display region for the visual image; and
      based on a determination that the external light is emitted onto the display region for the visual image, control the light that illuminates the exterior of the vehicle to display the visual image with greater brightness or in a color different from a color of the external light.

2. The lighting apparatus according to claim 1, further comprising:
   a beam pattern unit configured to change a pattern of the light that illuminates the exterior of the vehicle,
   wherein the at least one processor is further configured to control the beam pattern unit to change the visual image displayed by the light that illuminates the exterior of the vehicle.

3. The lighting apparatus according to claim 2, wherein the beam pattern unit comprises a Digital Micro-mirror Device (DMD) or a Micro Electro Mechanical System (MEMS) scanner.

4. The lighting apparatus according to claim 3, wherein the DMD comprises a plurality of micro-mirrors, and
   the at least one processor is further configured to change the visual image displayed by the light that illuminates the exterior of the vehicle by controlling a position of each of the plurality of micro-mirrors in the DMD.

5. The lighting apparatus according to claim 3, wherein the MEMS scanner is configured to create a scanning path, and
   the at least one processor is further configured to:
      generate a pattern of the light that is output onto the scanning path; and
      change the visual image displayed by the light that illuminates the exterior of the vehicle by controlling the scanning path created through the MEMS scanner and the pattern of the light output onto the scanning path.

6. The lighting apparatus according to claim 1, wherein the light output unit comprises a plurality of micro light emitting diodes (LEDs),
   wherein the at least one processor is configured to change the visual image displayed by the light that illuminates the exterior of the vehicle by controlling the plurality of the micro LEDs.

7. The lighting apparatus according to claim 1, wherein the at least one processor is configured to display the visual image by adjusting a color or an intensity of the light that illuminates the exterior of the vehicle.

8. The lighting apparatus according to claim 1, wherein the first information comprises at least one of travel speed information of the vehicle, detected object information, navigation information, turn signal information, or on-board diagnostics (OBD) information.

9. The lighting apparatus according to claim 8, wherein the at least one processor is further configured to, based on the travel speed information of the vehicle, adjust a display region for the visual image or a color of the visual image.

10. The lighting apparatus according to claim 1, wherein the second information comprises at least one of road information, external light information, or information about another vehicle located around the vehicle.

11. The lighting apparatus according to claim 1, wherein the at least one processor is further configured to:
    receive vehicle position information via the interface unit; and
    change a display region for the visual image further based on the vehicle position information received via the interface unit.

12. The lighting apparatus according to claim 1, wherein the at least one processor is further configured to:
    determine a lane in which the vehicle travels; and
    control the light that illuminates the exterior of the vehicle to display the visual image outside the vehicle within the lane in which the vehicle travels.

13. The lighting apparatus according to claim 1, wherein the at least one processor is further configured to control the light that illuminates the exterior of the vehicle to display the visual image outside the vehicle within a region corresponding to a width of the vehicle.

14. The lighting apparatus according to claim 1, wherein the at least one processor is further configured to control the light output unit based on the second information to change the shape, the color, the size, or the brightness of the visual image in a gradual manner.

15. The lighting apparatus according to claim 1, wherein the at least one processor is further configured to:
receive, via the interface unit, information about other vehicles around the vehicle;
determine, based on the received information about other vehicles around the vehicle, whether another vehicle is travelling in a lane next to a lane in which the vehicle travels and approaches the vehicle from behind; and
based on a determination that another vehicle is travelling in the lane next to the lane in which the vehicle travels and approaches the vehicle from behind, control the light that illuminates the exterior of the vehicle to display the visual image with greater brightness or in a color different from the color of the external light.

16. The lighting apparatus according to claim 15, wherein the at least one processor is further configured to:
receive, via the interface unit, light intensity information regarding light that is output from a lighting apparatus of the another vehicle; and
control a brightness of the visual image according to the received light intensity information.

17. The lighting apparatus according to claim 1, wherein the at least one processor is further configured to:
receive, via the interface unit, distance information regarding another vehicle that is ahead of the vehicle; and
control the light that illuminates the exterior of the vehicle to change a display region for the visual image according to the received distance information.

18. The lighting apparatus according to claim 17, wherein the at least one processor is further configured to:
determine whether a distance between the vehicle and the another vehicle is within a first threshold distance; and
based on a determination that the distance between the vehicle and the another vehicle is within the first threshold distance, control the light that illuminates the exterior of the vehicle to display the visual image on a body of the another vehicle.

19. The lighting apparatus according to claim 18, wherein the at least one processor is further configured to:
receive distorted display information regarding the visual image via the interface unit;
determine, based on the distorted display information, whether the visual image is distorted and displayed; and
based on a determination that the visual image is distorted and displayed, adjust a display position or size of the visual image on the body of the another vehicle.

20. The lighting apparatus according to claim 18, wherein the at least one processor is further configured to:
receive information regarding a flat region of the body of the another vehicle via the interface unit; and
based on the received information regarding the flat region of the body of the another vehicle, control the light that illuminates the exterior of the vehicle to display the visual image in the flat region.

21. The lighting apparatus according to claim 1, wherein the at least one processor is further to configured to:
receive distorted display information regarding the visual image via the interface unit; and
perform a control operation based on the received distorted display information to correct the visual image that is displayed by the light that illuminates the exterior of the vehicle.

22. The lighting apparatus according to claim 1, wherein the at least one processor is further configured to control the light that illuminates the exterior of the vehicle such that a first width corresponding to a first point of the visual image is less than a second width corresponding to a second point of the visual image on a longitudinal line of the visual image.

23. The lighting apparatus according to claim 1, wherein the at least one processor is further configured to control the light that illuminates the exterior of the vehicle to adjust a length and a width of the visual image based on a distance between the vehicle and a display region for the visual image.

24. The lighting apparatus according to claim 1, further comprising:
a communication unit,
wherein the at least one processor is further configured to control the light that illuminates the exterior of the vehicle to change the visual image further based on information received via the communication unit.

25. A vehicle comprising,
a sensing unit configured acquire first information and second information; and
a lighting apparatus that comprises:
an interface unit; and
at least one processor configured to:
generate light that illuminates an exterior of the vehicle;
control the light that illuminates the exterior of the vehicle to display a visual image corresponding to the first information received via the interface unit; and
control the light that illuminates the exterior of the vehicle to change the displayed visual image based on the second information received via the interface unit,
wherein the at least one processor is further configured to control the light output unit based on the second information to change a shape, a color, a size, or a brightness of the visual image, and
wherein the at least one processor is further configured to:
determine whether external light is emitted onto a display region for the visual image; and
based on a determination that the external light is emitted onto the display region for the visual image, control the light that illuminates the exterior of the vehicle to display the visual image with greater brightness or in a color different from a color of the external light.

\* \* \* \* \*